United States Patent

Ishii

[11] Patent Number: 6,135,577
[45] Date of Patent: Oct. 24, 2000

[54] PUMP OPERATION CONTROL APPARATUS FOR HYDRAULIC BRAKE BOOSTING SYSTEM

[75] Inventor: Tomoyuki Ishii, Saitama, Japan

[73] Assignee: Jidosha Kiki Co., Ltd., Tokyo, Japan

[21] Appl. No.: 09/103,938

[22] Filed: Jun. 25, 1998

[30] Foreign Application Priority Data

Jul. 23, 1997 [JP] Japan ................................. 9-197120

[51] Int. Cl.[7] ............................................ B06T 8/44
[52] U.S. Cl. ........................... 303/114.1; 303/122.12; 303/10
[58] Field of Search .................. 303/10, 114.1, 303/116.1, 122.12, 122.13, 122.14, 113.4, 155; 188/358

[56] References Cited

U.S. PATENT DOCUMENTS

| | | | |
|---|---|---|---|
| 4,993,780 | 2/1991 | Tanaka et al. | 303/3 |
| 5,373,454 | 12/1994 | Kanda et al. | 303/116.1 |
| 5,433,512 | 7/1995 | Aoki et al. | 303/3 |
| 5,560,690 | 10/1996 | Hattori et al. | 303/116.2 |
| 5,779,327 | 7/1998 | Nakashima et al. | 303/122.12 |
| 5,791,745 | 8/1998 | Sakakibara | 303/11 |
| 5,797,663 | 8/1998 | Kawaguchi et al. | 303/146 |
| 5,951,116 | 9/1999 | Nagasaka et al. | 303/14 |

FOREIGN PATENT DOCUMENTS

| | | |
|---|---|---|
| 3-213701 | 9/1991 | Japan. |
| 4-151364 | 5/1992 | Japan. |
| 8-58562 | 3/1996 | Japan. |

Primary Examiner—Robert J. Oberleitner
Assistant Examiner—Devon Kramer
Attorney, Agent, or Firm—Sughrue, Mion, Zinn, Macpeak & Seas, PLLC

[57] ABSTRACT

In a pump operation control apparatus for a hydraulic brake boosting system, an ECU 13 is provided with a timer 16 to which an output signal from a brake switch 12 is supplied and a pump-operation-control-signal generating means 17 for transmitting a signal for operating and controlling a motor 9 in response to an output signal from the timer 16. When the brake switch 12 has been switched on, the operation of the pump is started. After predetermined time T has elapsed from a moment at which the brake switch 12 has been switched on, the operation of the pump is interrupted. If the brake switch 12 is continuously switched on after the predetermined time T has elapsed, the pump is operated for time elongated from the predetermined time T until the brake switch 12 is switched off. If the brake switch 12 is again switched on before the predetermined time T elapses, the pump is operated until the predetermined time T elapses from the moment at which the brake switch 12 has again been switched on.

20 Claims, 44 Drawing Sheets

PUMP OPERATION CONTROL APPARATUS FOR HYDRAULIC BRAKE BOOSTING SYSTEM

BACKGROUND OF THE INVENTION

1. Field of the Invention

The present invention relates to a technical field for a hydraulic brake boosting system for boosting the force for depressing a brake pedal of, for example, an automobile, with power realized by hydraulic pressure of operating fluid so that braking force is enlarged. More particularly, the present invention relates to a technical field for a pump operation control apparatus for a hydraulic brake boosting system for controlling the operation of a pump for generating the hydraulic pressure of the operating fluid.

2. Description of the Related Art

Brake boosting systems for vehicles, for example, automobiles, include a hydraulic brake boosting system which incorporates a hydraulic brake boosting apparatus for boosting the force for depressing a brake pedal so as to enlarge the braking force. The hydraulic brake boosting system enables great braking force which cannot be obtained from only the depressing force which is applied to the brake pedal. Moreover, the force for depressing the pedal can be reduced.

An hydraulic brake boosting system of the foregoing type incorporates a pump which is operated by a motor so as to generate hydraulic pressure of the operating fluid and an accumulator for accumulating the generated hydraulic pressure. When the brake pedal has been depressed, the hydraulic pressure accumulated in the accumulator is introduced into the hydraulic brake boosting apparatus. Thus, the hydraulic brake boosting apparatus produces an output obtained by boosting the depressing force applied to the pedal in accordance with the depressing force. The thus-produced output causes a master cylinder to be operated.

The above-mentioned brake boosting system has a necessity that hydraulic pressure of a predetermined level can assuredly be introduced into the hydraulic brake boosting apparatus when the brake is operated. Therefore, the operation of the pump must be controlled in such a manner that predetermined hydraulic pressure is always accumulated in the accumulator.

As a conventional pump operation control apparatus for controlling the operation of the pump as described above, pump operation control apparatuses have been disclosed in Japanese Patent Laid-Open No. 4-151364 and Japanese Patent Laid-Open No. 3-213701. According to the disclosure, a pump-operating pressure sensor (or a pressure sensor which is hereinafter and representatively called a "pressure sensor") is employed to hydraulic pressure accumulated in the accumulator. When the hydraulic pressure accumulated in the accumulator has been raised to a level with which the pump must be operated, the pump is operated to raise the hydraulic pressure accumulated in the accumulator. Moreover, an alarm-issuing pressure sensor is employed to detect and issue an alarm when the hydraulic pressure accumulated in the accumulator has abnormally been reduced. Moreover, each of the pump operation control apparatuses disclosed as described above has a structure that when a failure of the pump-operating pressure sensor has occurred, the alarm-issuing pressure sensor controls the operation of the pump.

The pump operation control apparatuses disclosed as described above enable predetermined hydraulic pressure to always be accumulated in the accumulator. Even if a failure of the pump-operating pressure sensor has occurred, hydraulic pressure having at least a minimum level required to operate the brake can furthermore reliably be accumulated in the accumulator.

As another conventional pump operation control apparatus, a pump operation control apparatus has been disclosed in Japanese Patent Laid-Open No. 8-58562. According to the foregoing disclosure, depression of a brake pedal is detected by a brake switch. Moreover, time for which the brake pedal is depressed is integrated. When the integrated time has reached a predetermined value, the pump is operated so that hydraulic pressure is accumulated in the accumulator. The pump operation control apparatus disclosed as described above does not require a pump-operating pressure sensor. When a brake switch provided for operating a brake lamp or the like is simply used, the operation of the pump can be controlled to accumulate hydraulic pressure in the accumulator. Thus, the structure of the brake boosting system can be simplified.

However, the above-mentioned pump operation control apparatus disclosed in Japanese Patent Laid-Open No. 4-151364 has the structure that the pump is operated in only a period until the alarm-issuing pressure sensor is turned off at which the alarm-issuing pressure sensor does not transmit the alarm signal if the pump is operated by the alarm-issuing pressure sensor because of a failure of the pump-operating pressure sensor. Therefore, hydraulic pressure cannot sufficiently be accumulated in the accumulator.

If the characteristics of the pump-operating pressure sensor deteriorates, the pressure at which the pump is interrupted is undesirably changed. Thus, the pressure accumulated in the accumulator becomes insufficient, causing the braking force to be reduced excessively. As an alternative to this, the hydraulic pressure accumulated in the accumulator is raised excessively, thus causing the loads which must be borne by the pump, the motor, the accumulator and the like to be enlarged excessively. As a result, there is apprehension that the durability of the above-mentioned elements deteriorates.

The above-mentioned pump operation control apparatus disclosed in Japanese Patent Laid-Open No. 3-213701 has the structure that the pump is operated for predetermined time from a moment at which the alarm-issuing pressure sensor has been turned on in a case where the operation of the pump is controlled by the alarm-issuing pressure sensor because of a failure of the pump-operating pressure sensor. Therefore, if a pressure at which the sensor is turned on is changed because of deterioration of the alarm-issuing pressure sensor or the like, hydraulic pressure cannot sufficiently be accumulated in the accumulator.

The above-mentioned pump operation control apparatus disclosed in Japanese Patent Laid-Open No. 8-58562 has the structure that the time obtained by integrating the time for which the brake pedal is depressed is employed as a parameter for controlling the operation of the pump. Therefore, if the pressure accumulated in the accumulator is reduced in a case where depression of the brake pedal is not performed for a long time because, for example, the vehicle has been allowed to stand for a long time, the pump is not operated. Thus, there is apprehension that the braking force becomes too small.

As described above, both of the pump operation control apparatus disclosed as described above have a problem in that hydraulic pressure cannot always, sufficiently and reliably be accumulated in the accumulator.

SUMMARY OF THE INVENTION

In view of the foregoing, an object of the present invention is to provide a pump operation control apparatus for a hydraulic brake boosting system having an arrangement that the operation of the pump is controlled in such a manner that hydraulic pressure can sufficiently and reliably be accumulated in an accumulator.

To solve the above-mentioned problem, a first aspect of the present invention is characterized in that the operation of a pump is started in response to an operation signal generated by a brake operating member and the operation of the pump is interrupted after predetermined time has elapsed from the operation of the brake operating member.

A second aspect of the present invention is characterized in that when input of the operation signal generated by the brake operating member has been continued in a case where the predetermined time has elapsed from the operation of the brake operating member, the pump-operation-signal generating means transmits the operation signal of the pump regardless of the predetermined time until input of the operation signal generated by the brake operating member is interrupted, and transmits a signal for interrupting the operation of the pump when input of the operation signal generated by the brake operating member has been interrupted.

A third aspect of the present invention is characterized in that the timer is arranged such that when the operation signal generated by the brake operating member has been again supplied before the predetermined time has elapsed after the operation of the brake operating member, the timer temporarily clears the measured time, and again measures time from a point of time when the operation signal has been supplied.

A fourth aspect of the present invention is characterized in that the predetermined time is set in such a manner as to be changed in accordance with the deceleration of a vehicle which is obtained when antiskid control is performed.

A fifth aspect of the present invention is characterized by further comprising a relief valve for relieving hydraulic pressure accumulated in the accumulator when hydraulic pressure has been accumulated in the accumulator to a level not lower than relief pressure, wherein the predetermined time is determined in such a manner as to be sufficiently long for the relief valve to be operated.

A sixth aspect of the present invention is characterized in that the operation of the pump is controlled such that the operation of the pump is interrupted when the relief valve has been operated.

A seventh aspect of the present invention is characterized in that the operation of the pump is controlled such that when the motor current is higher than the predetermined level, the operation of the pump is interrupted.

An eighth aspect of the present invention is characterized in that the operation of the pump is controlled such that when the number of revolutions of the motor is smaller than the predetermined value, the operation of the pump is interrupted.

A ninth aspect of the present invention is characterized in that the operation of the pump is controlled such that when the pulsating frequency is lower than the predetermined value, the operation of the pump is interrupted.

A tenth aspect of the present invention is characterized in that the pulsating frequency is a pulsating frequency of a motor current which is generated in the motor for operating the pump or a pressure pulsating frequency generated in the hydraulic pressure accumulated in the accumulator.

An eleventh aspect of the present invention is characterized by further comprising a predetermined-value correction means for changing the predetermined value in accordance with the voltage of the motor.

A twelfth aspect of the present invention is characterized in that the pump-operation-signal generating means transmits an operation signal of the pump in response to an operation signal generated by the brake operating member.

A thirteenth aspect of the present invention is characterized by further comprising a timer for measuring time when an ON signal has been supplied from an ignition switch and transmitting a signal at predetermined time intervals, wherein the pump-operation-signal generating means transmits an operation signal of the pump in response to the output signal from the timer.

A fourteenth aspect of the present invention is characterized by further comprising a pump-operating-pressure sensor for detecting pressure accumulated in the accumulator and pressure-sensor-failure detecting means for detecting a failure of the pump-operating-pressure sensor, wherein when the pump-operating-pressure sensor is in a normal state, the operation of the pump is controlled in response to an output signal from the pump-operating-pressure sensor, and when the pump-operating-pressure sensor is broken down, the operation of the pump is controlled by the pump operation control apparatus in response to an output signal from the pressure-sensor-failure detecting means.

A fifteenth aspect of the present invention is characterized in that the pump-operation-signal generating means transmits an operation-control signal for the pump in response to the output signal from the pump-operating pressure sensor when the pump-operating pressure sensor is in a normal state, and when a failure of the pump-operating pressure sensor has occurred, the pump-operation-signal generating means transmits an operation signal of the pump in response to an ON signal of the backup sensor and transmits an interruption signal of the pump for time elongated from an OFF signal of the backup sensor and corresponding to time learned and stored in the storage means.

A sixteenth aspect of the present invention is characterized in that when a braking operation has been performed during learning and storage of time performed by the timer and the storage means, the operation for learning and storing the time is interrupted.

A seventeenth aspect of the present invention is characterized in that when a braking operation has been performed during the operation of the pump, the learned and stored time is elongated.

An eighteenth aspect of the present invention is characterized in that when the pump-operating pressure sensor is in a normal state, the pump-operation-signal generating means transmits an operation control signal for the pump in response to an output signal from the pump-operating pressure sensor, and when a failure of the pump-operating pressure sensor has occurred, the pump-operation-signal generating means transmits an operation signal of the pump in response to an ON signal of the backup sensor and transmits an interruption signal of the pump to interrupt the operation of the pump when the relief valve has been operated.

A nineteenth aspect of the present invention is characterized in that the pump-operation-signal generating means transmits an operation control signal for the pump in response to an output signal from the pump-operating pressure sensor when the pump-operating pressure sensor is in a normal state, and when a failure of the pump-operating pressure sensor has occurred, the pump-operation-signal generating means transmits an operation signal of the pump in response to an ON signal of the backup sensor and transmits an interruption signal of the pump to interrupt the operation of the pump when the motor current has been raised to a level not lower than the predetermined value.

A twentieth aspect of the present invention is characterized in that the pump-operation-signal generating means transmits an operation control signal for the pump in response to an output signal from the pump-operating pressure sensor when the pump-operating pressure sensor is in a normal state, and when a failure of the pump-operating pressure sensor has occurred, the pump-operation-signal generating means transmits an operation signal of the pump in response to an ON signal of the backup sensor and transmits an interruption signal of the pump to interrupt the operation of the pump when the number of revolutions of the motor is smaller than the predetermined value.

The first to fifth aspects of the present invention having the above-mentioned structures are arranged such that the pump is operated whenever the brake operating member is operated to perform a braking operation. After the predetermined times has elapsed or the brake operating member has been released, the operation of the pump is interrupted. As a result, hydraulic pressure can always adequately be accumulated in the accumulator to a predetermined pressure.

According to the sixth aspect of the present invention, the operation of the pump is interrupted when the relief valve has been operated. According to the seventeenth aspect of the invention, the operation of the pump is interrupted when the electric current of the motor for operating the pump has been raised to a level not lower than a predetermined level. According to the eighth aspect of the invention, the operation of the pump is interrupted when the number of revolutions of the motor for operating the pump has been made to be a value not larger than a predetermined value. According to the nineth to eleventh aspects of the invention, the operation of the pump is interrupted when the pulsating frequency has been made to be a value not higher than a predetermined level. As a result, the operation of the pump is automatically interrupted when the hydraulic pressure has been accumulated in the accumulator to a predetermined level.

According to the twelfth aspect of the present invention, the pump is operated in response to the operation signal generated by the brake operating member. According to the aspect of the present invention claimed in claim 13, the pump is operated at predetermined time intervals when the ignition switch has been turned on. As a result, hydraulic pressure can always automatically be accumulated in the accumulator to a predetermined level.

According to the fourteenth aspect of the present invention, the operation of the pump is controlled in response to an operation signal from the pump-operating pressure sensor when the pump-operating pressure sensor is in a normal state. If a failure of the pump-operating pressure sensor occurs, the operation of the pump is controlled by the pump operation control apparatus according to any one of the first to thirteenth aspects of the invention. As a result, the pump operation control apparatus according to any one of the first to thirteenth aspects of the invention serves as a conventional backup unit which is operated when a failure of the pump-operating pressure sensor has occurred. As a result, hydraulic pressure can furthermore reliably be accumulated in the accumulator.

According to the fifteenth aspect of the present invention, the operation of the pump is controlled in response to an operation signal from the pump-operating pressure sensor when the pump-operating pressure sensor is in a normal state. If a failure of the pump-operating pressure sensor occurs, the pump is operated in response to an ON signal of the backup sensor. The operation of the pump is controlled for time elongated from an OFF signal of the backup sensor and corresponding to time learned and stored in the storage means.

According to the sixteenth aspect of the present invention, if a braking operation is performed during learning and storage of the time, learning and storage of the time is interrupted.

According to the seventeenth aspect of the present invention, if a braking operation is performed during the operation of the pump, the learned and stored time is elongated.

According to the eighteenth aspect of the present invention, the operation of the pump is controlled in response to an operation signal from the pump-operating pressure sensor when the pump-operating pressure sensor is in a normal state. If a failure of the pump-operating pressure sensor occurs, the pump is operated in response to an ON signal of the backup sensor. When the relief valve has been operated, the operation of the pump is interrupted.

According to the nineteenth aspect of the present invention, the operation of the pump is controlled in response to an operation signal from the pump-operating pressure sensor when the pump-operating pressure sensor is in a normal state. If a failure of the pump-operating pressure sensor occurs, the pump is operated in response to an ON signal of the backup sensor. When an electric current of the motor is made to be a value not lower than a predetermined level, the-operation of the pump is interrupted.

According to the twentieth aspect of the present invention, the operation of the pump is controlled in response to an operation signal from the pump-operating pressure sensor when the pump-operating pressure sensor is in a normal state. If a failure of the pump-operating pressure sensor occurs, the pump is operated in response to an ON signal of the backup sensor. When the number of revolutions of the motor is made to be a value not larger than a predetermined value, the operation of the pump is interrupted.

As described above, the present invention enables hydraulic pressure to reliably and adequately accumulated in the accumulator without the pump-operating pressure sensor.

Since elements for use in the conventional apparatus can be used, the cost of the pump operation control apparatus can be reduced and the structure of the same can be simplified.

Even if the pump-operating pressure sensor is employed as has been employed in the conventional structure, the pump operation control apparatus according to the pump is able to serve as a backup sensor unit if a failure of the pump-operating pressure sensor occurs. Therefore, accumulation in the accumulator can furthermore reliably be performed.

DETAILED DESCRIPTION OF THE PREFERRED EMBODIMENTS

Figure 1:
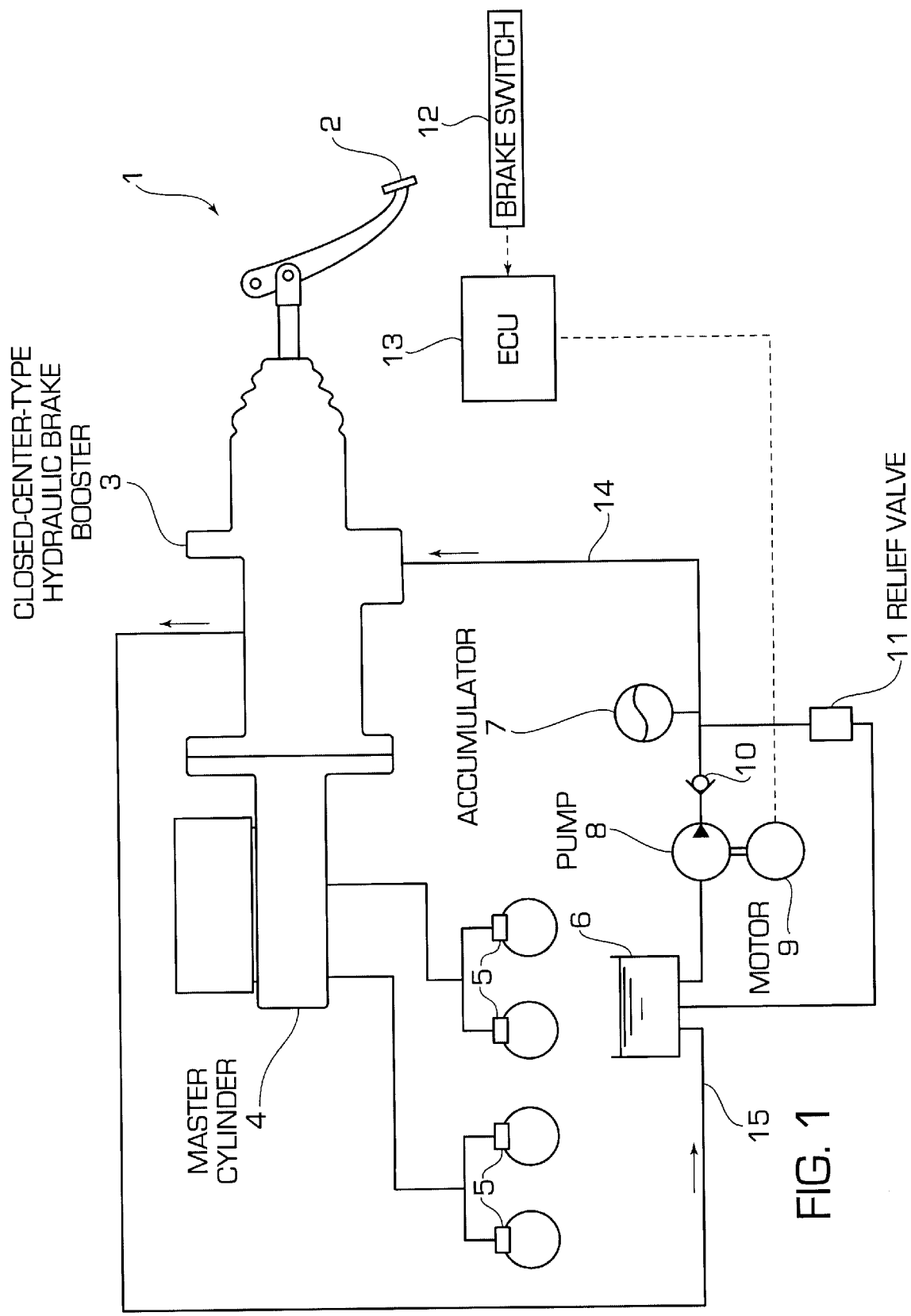
FIG. 1 is a diagram showing a hydraulic brake boosting system to which a pump operation control apparatus according to the present invention is applied.

Referring to the drawings, embodiments of the present invention will now be described.

FIG. 1 is a diagram showing a first embodiment of a pump operation control apparatus according to the present invention.

As shown in FIG. 1, a hydraulic brake boosting system 1 incorporates a brake pedal 2; a closed-center-type hydraulic brake booster (hereinafter simply called a "booster") 3 arranged to be operated by the brake pedal 2 and capable of boosting depressing force applied to the brake pedal 2 so as to produce an output; a tandem type master cylinder 4 arranged to be operated in response to the output from the booster 3 and capable of generating pressure of brake solution; a wheel cylinder 5 arranged to be operated with the pressure of the brake solution supplied from the master cylinder 4 and capable of generating braking force which must be applied to each wheel; a reservoir 6 for reserving operating fluid; an accumulator 7 for accumulating hydraulic pressure; a pump 8 arranged to suck the operating fluid supplied from the reservoir 6 to discharge the operating fluid to the accumulator 7 so as to accumulate the hydraulic pressure in the accumulator 7; a motor 9 for operating the pump 8; a check valve 10 for preventing leakage of the accumulated hydraulic pressure in the accumulator 7 to the pump 8; a relief valve 11 for relieving the accumulated hydraulic pressure to the reservoir 6 so as to reduce loads which must be borne by the accumulator 7, the pump 8, the motor 9 and the like when the accumulated hydraulic pressure in the accumulator 7 has been raised to a level not lower than a relieving pressure; a brake switch 12 for detecting depression of the brake pedal 2; and an electronic control unit (ECU) 13 to which a brake operation detection signal is supplied and capable of controlling the operation of the motor 9 in response to the supplied signal. Since the above-mentioned elements of the hydraulic brake boosting system 1 are known elements, they are omitted from detailed description.

The hydraulic brake boosting system 1 having the above-mentioned structure has an arrangement similar to the conventional hydraulic brake boosting system and formed such that the ECU 13 operates and controls the motor 9. When the motor 9 has been operated, the pump 10 is operated so that operating fluid in the reservoir 6 is supplied to the accumulator 7 and thus hydraulic pressure is accumulated in the accumulator 7. When the hydraulic pressure accumulated in the accumulator 7 has been raised to a relieving pressure set for the relief valve 11, the relief valve 11 is operated so that the hydraulic pressure accumulated in the accumulator 7 is relieved to the reservoir 6. As a result, hydraulic pressure having a predetermined level is accumulated in the accumulator 7.

When the brake pedal 2 has been depressed in the above-mentioned state, the hydraulic pressure in the accumulator 7 is, through a passage 14, introduced into an operating chamber in the booster 3. The booster 3 boosts the depressing force applied to the brake pedal 2 and produces an output. In accordance with the output, the master cylinder 4 is operated so that braking pressure is generated. The braking pressure generated by the master cylinder 4 is supplied to each wheel cylinder 5. Thus, each wheel cylinder 5 brakes each wheel.

When the brake pedal 2 has been released, the operating fluid introduced into the operating chamber in the booster 3 is discharged to the reservoir 6 through a passage 15. Therefore, the booster 3, the master cylinder 4 and each wheel cylinder 5 are deactivated, causing braking of each wheel to be suspended.

Figure 2:
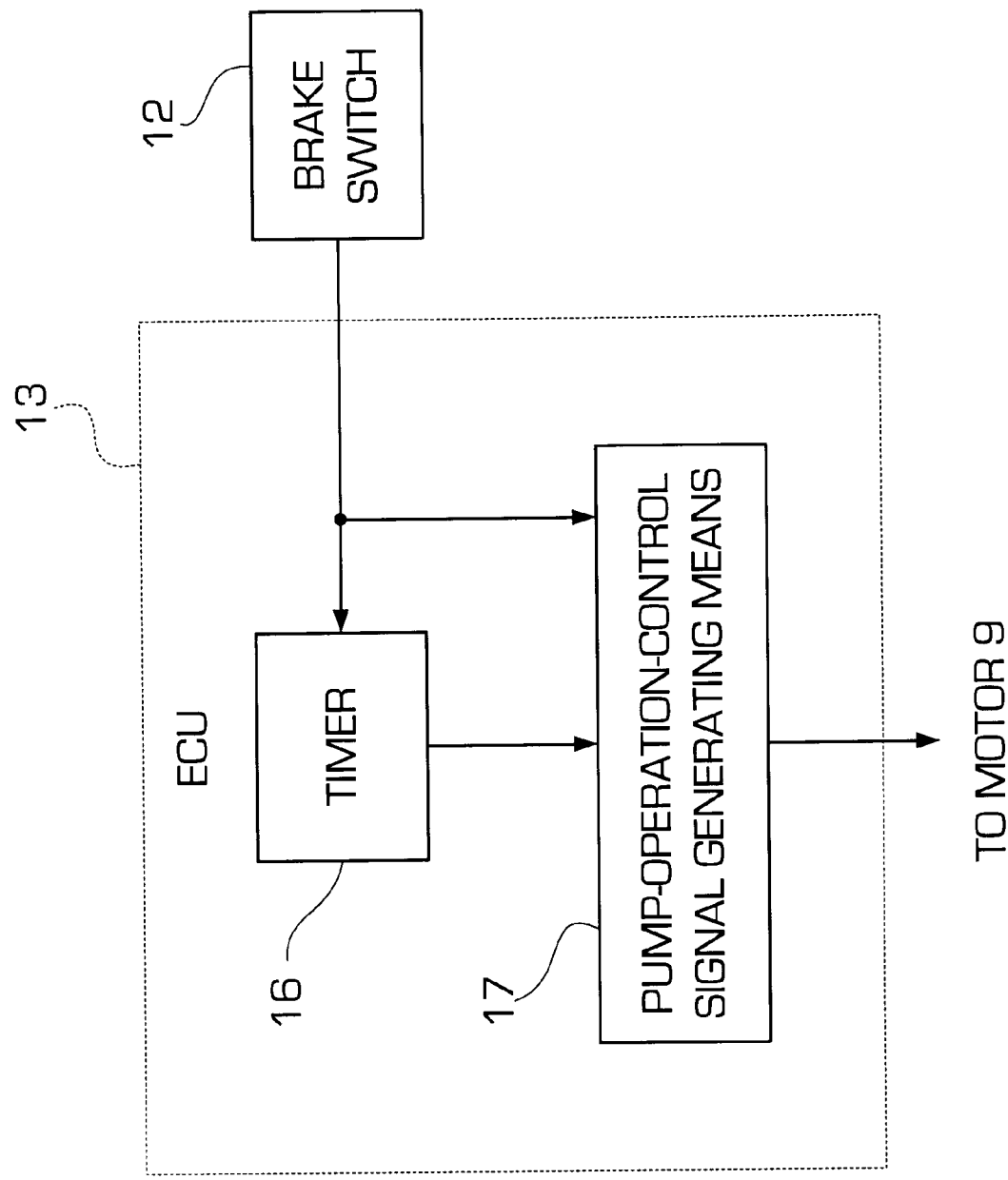
FIG. 2 is a diagram showing a first embodiment of the present invention.

FIG. 2 is a schematic view showing the electronic control unit 13 provided for the hydraulic brake boosting system 1 according to the first embodiment and capable of operating and controlling the pump 8.

As shown in FIG. 2, the ECU 13 according to the first embodiment includes a timer 16 arranged to be supplied with an output signal from the brake switch 12 and a pump-operation-control-signal generating means 17 for transmitting a signal for operating and controlling the motor 9 in response to the output signal from the timer 16.

The operation of the pump 8 is started when the brake pedal 2 has been depressed (that is, when the brake switch has been switched on). Moreover, interruption of the operation of the pump 8 is performed after predetermined time has elapsed from depression of the brake pedal 2.

The operation and control of the brake pedal 2 according to the first embodiment will specifically be described. A predetermined time serving as a reference for operation time for the pump 8 is previously set to the timer 13. The predetermined time is adequately set to be a time that is sufficiently long for the relief valve to be operated. Note that change of the predetermined value may be permitted in accordance with a deceleration of the vehicle which is obtained when an antiskid brake control (ABS control) is performed to adjust the braking force to eliminate the locking tendency realized during a braking operation. If the ECU for the ABS control and the ECU for operating and controlling the brake pedal 2 are formed individually, the deceleration of the vehicle is extracted from the ECU for the ABS control to the ECU for operating and controlling the brake pedal 2 according to the present invention by serial communication.

Figure 3:
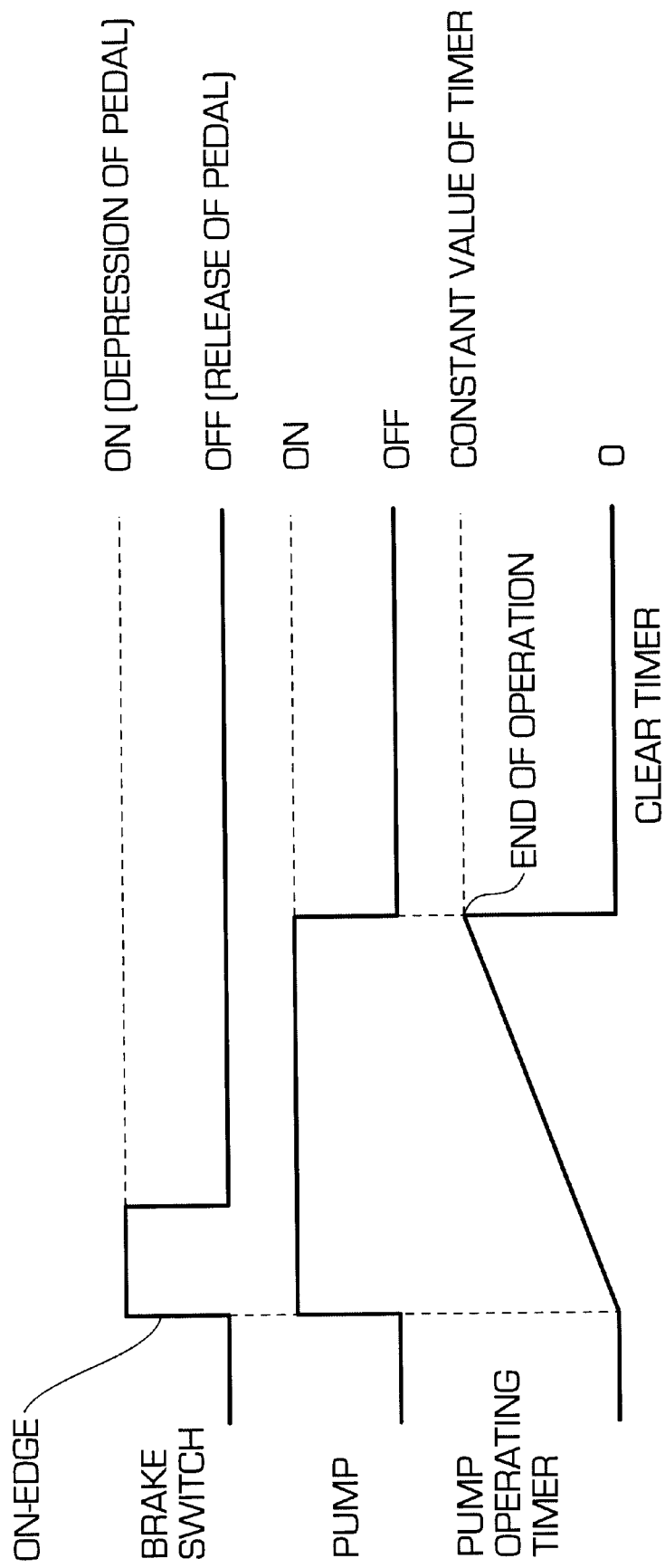
FIG. 3 is a diagram showing a portion of the operation of the first embodiment.

As shown in FIG. 3, when the brake switch 12 is switched on when the brake pedal 2 has been depressed, an ON signal of the brake switch 12 is allowed to pass through the timer 16 so that the ON signal is supplied to the pump-operation-control-signal generating means 17. The pump-operation-control-signal generating means 17 transmits a control signal to the motor 9. Thus, the motor 9, that is, the pump 8 is operated. Moreover, the timer 16 measure time required from the moment at which the brake switch 12 has been switched on.

When the brake pedal 2 has been released and thus the brake switch 12 has been switched off before time measured by the timer 16 reaches predetermined time, the operation of the pump 8 is continued. After time measured by the timer 16 has reached the predetermined time, the operation of the pump 8 is interrupted and time measured by the timer 16 is cleared.

Figure 4:
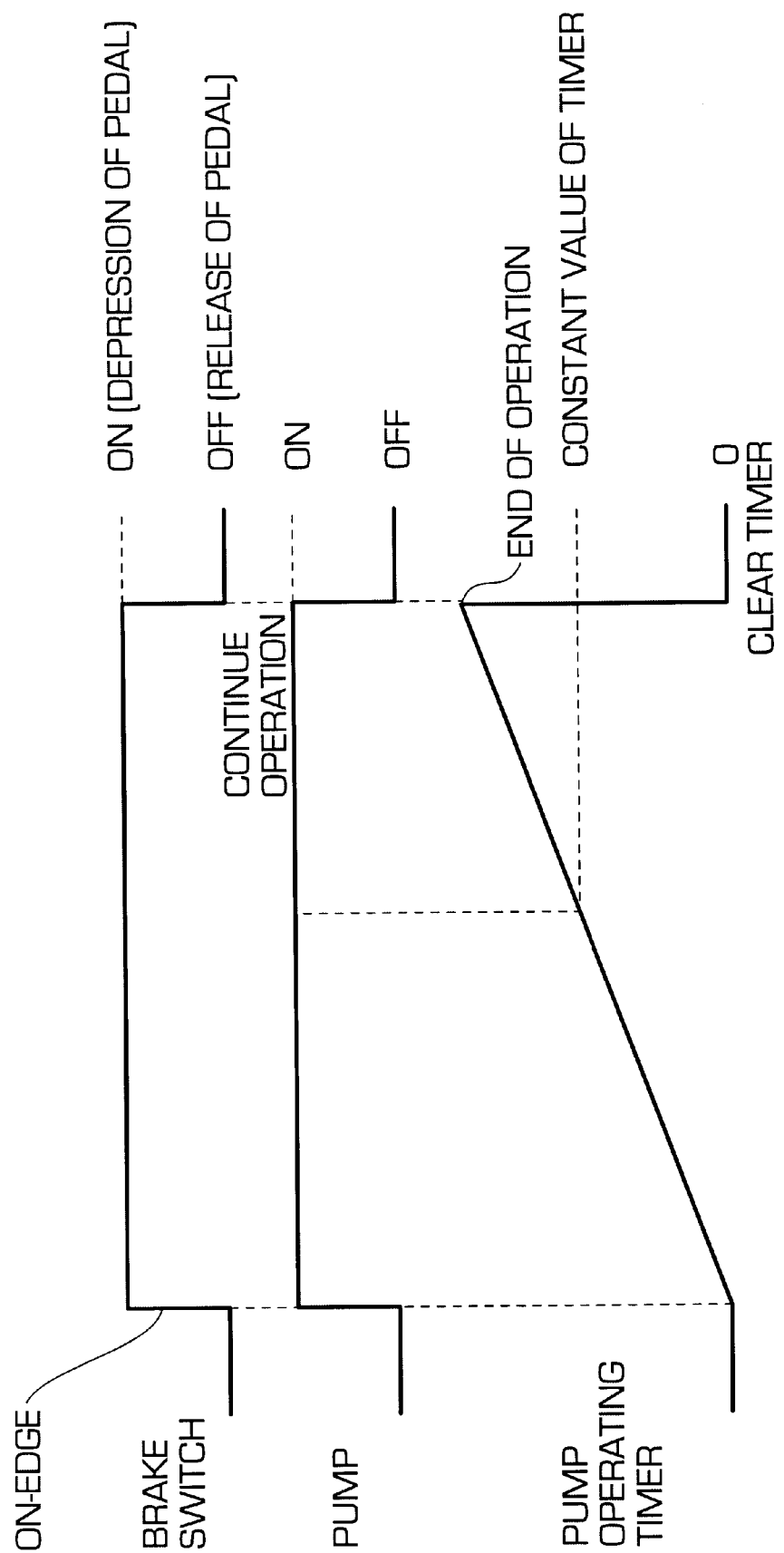
FIG. 4 is a diagram showing another portion of the operation of the first embodiment.

If the brake switch 12 is continuously switched on even after time measured by the timer 16 exceeds the predetermined time as shown in FIG. 4, the operation of the pump 8 is continued even after time measured by the timer 16 exceeds the predetermined time. When the brake switch 12 has been switched off, the operation of the pump 8 is interrupted. At this time, time measured by the timer 16 is cleared after measured time has reached the predetermined time.

When the brake switch 12 has been switched off before time measured by the timer 16 reaches the predetermined time and the brake switch 12 has again been switched on before measured time reaches the predetermined time, that is, when on-edge of the brake switch 12 has taken place (for example, when pumping brake operation has been performed), the operation of the pump 8 is continued from the moment when the brake switch 12 has first been switched on. Time measured by the timer 16 is temporarily cleared when the brake switch 12 has been switched on at a next time so that measurement of time is restarted (from zero). If the brake switch 12 is switched off before the measured time has reached the predetermined time, the operation of the pump 8 is continued similarly to the case shown in FIG. 3. When measured time has reached the predetermined time, the operation of the pump 8 is interrupted. Moreover, time measured by the timer 16 is cleared. If second depression of the brake pedal 2 is continued even after time measured from the moment at which the brake switch 12 has been switched on at the second time exceeds the predetermined time, the operation of the pump 8 is continued. When the brake switch 12 has been switched off, the operation of the pump 8 is interrupted and time measured by the timer 16 is cleared.

Figure 6:
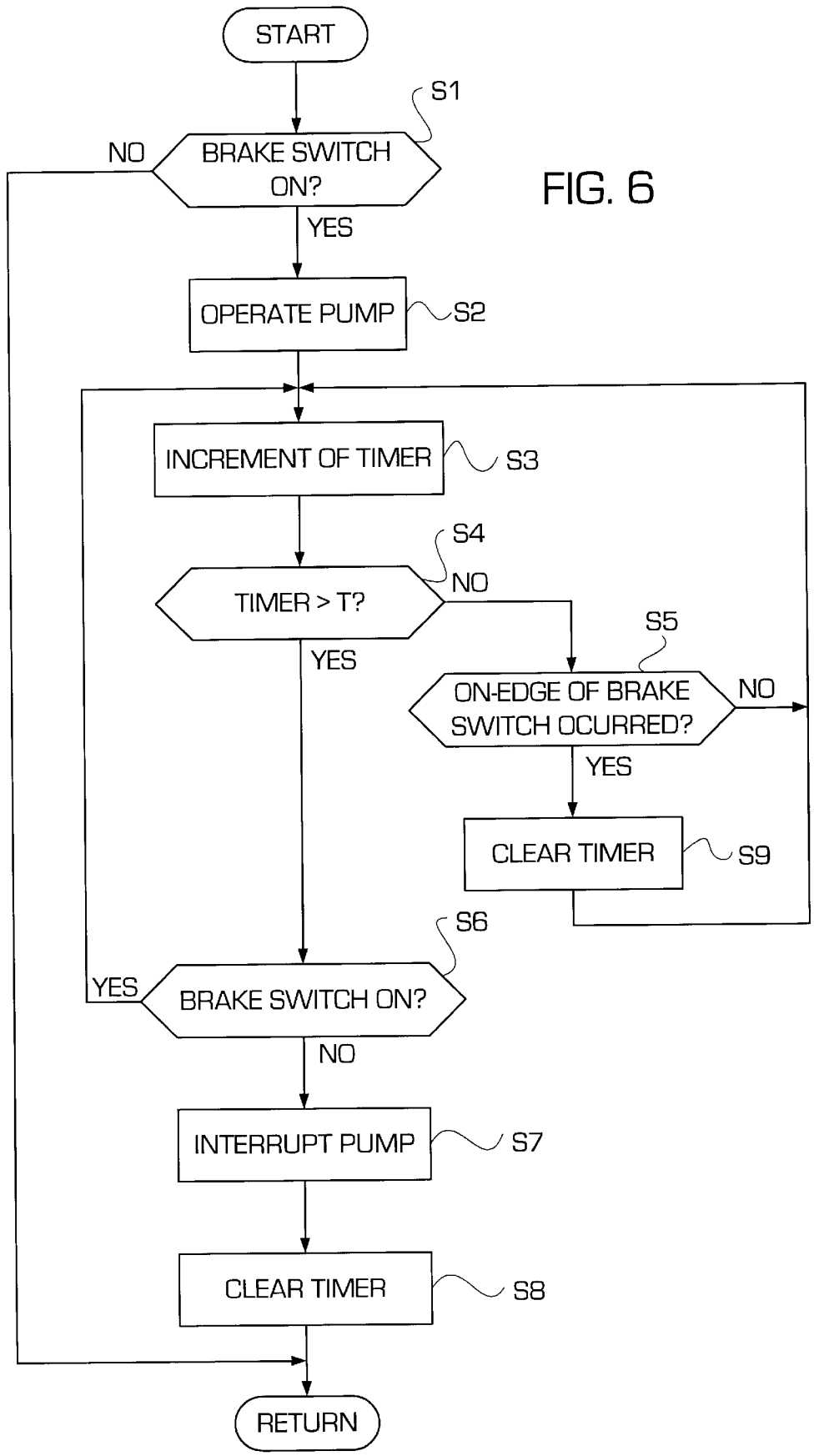
FIG. 6 is a flow chart of a pump operation control according to the first embodiment.

FIG. 6 is a flow chart of the operation control of the pump according to the first embodiment.

As shown in FIG. 6, whether or not the brake switch 12 has been switched on is determined in step S1. If a determination is made that the brake switch 12 has been switched on, the pump 8 is operated in step S2. Moreover, the timer 16 starts measuring time in step S3. In step S4 whether or not time measured by the timer 16 is longer than predetermined time T is determined. Since measured time is shorter than the predetermined time T at first, a determination is made in step S4 that measured time is not longer than the predetermined time T. As a result, whether or not on-edge of the brake switch 12 has taken place is determined in step S5. If a determination is made that no on-edge has taken place, the operation shifted to step S3 so that the operation of the pump 8 and measurement of time which is performed by the timer 16 are continued. In a period in which the measured time is not longer than the predetermined time T and no on-edge of the brake switch 12 takes place, the processes in steps 3, S4 and S5 are repeated. If a determination is made in step S4 that measured time is longer than the predetermined time T, whether or not the brake switch 12 has been switched on is determined in step S6. If a determination is made that the brake switch 12 has not been switched on, the operation of the pump 8 is interrupted in step S7. Moreover, time measured by the timer 16 is cleared in step S8, and then the operation is returned to the start. That is, the above-mentioned the operation control of the pump 8 is employed in the foregoing case shown in FIG. 3.

If a detection is made in step S6 that the brake switch 12 has been switched on, the operation is shifted to step S3 so that the operation of the pump 8 and measurement of time which is performed by the timer 16 are continued. Since time measured by the timer 16 is longer than the predetermined time T in this case, the process in step S4 is performed, and then the process in step S6 is performed. If a determination is made in step S6 that the brake switch 12 has again been switched on, the operation is shifted to step S3. In a period in which the brake switch 12 is switched on, the processes in steps 3, S4 and S6 are repeated. If a determination is made in step S6 that the brake switch 12 has not been switched on, the process in step S7 is performed to interrupt the operation of the pump 8. After the timer 16 has been cleared in step S8, the operation is returned to the start. That is, the above-mentioned flow of the operation control of the pump 8 is perfumed in the foregoing case shown in FIG. 4.

Figure 5:
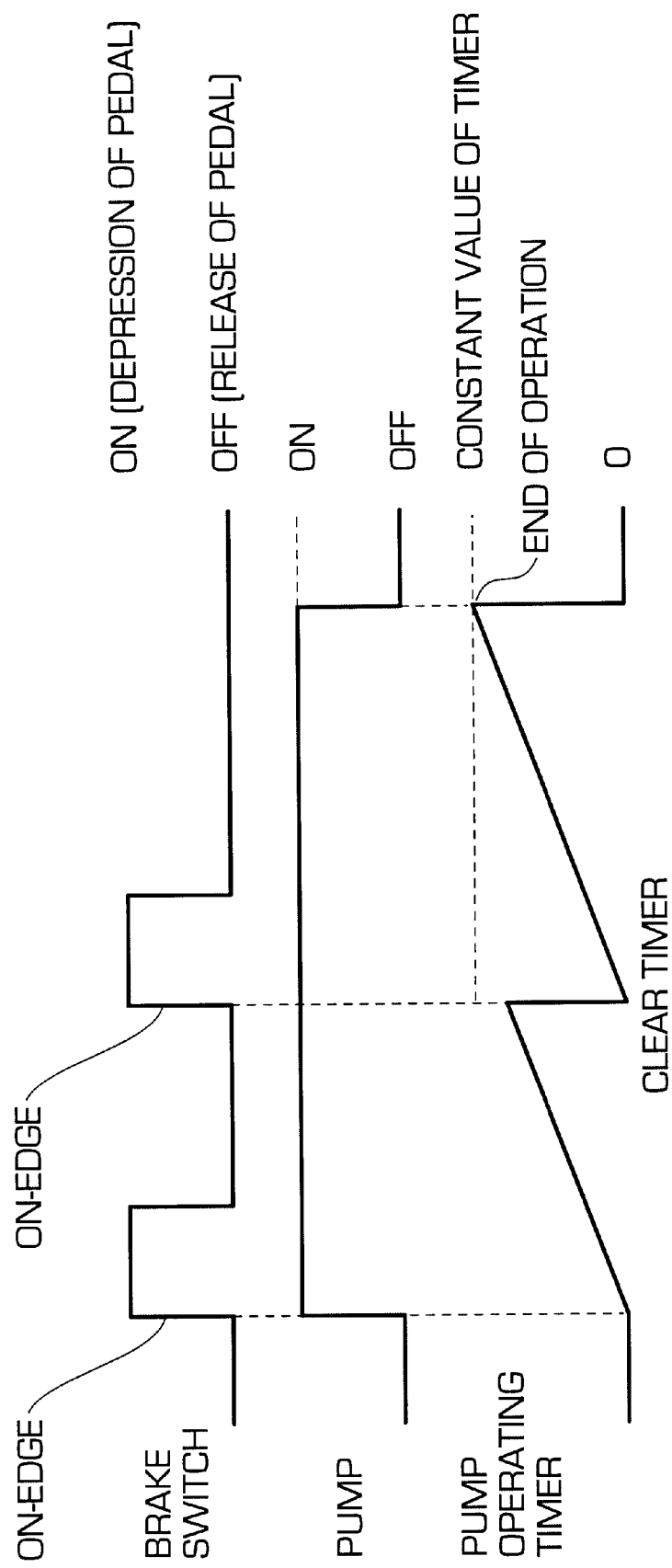
FIG. 5 is a diagram showing a residual portion of the operation of the first embodiment.

If a determination is made in step S5 that on-edge of the brake switch 12 has taken place, time measured by the timer 16 is cleared in step S9. Then, the operation is shifted to step S3 so that measurement of time which is performed by the timer 16 is restarted (from zero). Since time measured by the timer 16 is shorter than the predetermined time T, the process in step S4 is performed. Then, whether or not on-edge of the brake switch 12 has taken place is determined in step S5. If a determination is made that on-edge of the brake switch 12 has not again taken place, the operation is again shifted to step S3. In a period in which the measured time is shorter than the predetermined time T and on-edge of the brake switch 12 does not again take place, the processes in steps 3, S4 and S5 are repeated. If a determination is made in step S4 that the measured time is longer than the predetermined time T, the operation is shifted to step S6. Thus, a process similar to the case shown in FIG. 3 is performed. That is, the above-mentioned flow of the operation and control of the pump 8 is employed in the foregoing case shown in FIG. 5.

If a determination is made in step S1 that the brake switch 12 has been switched off, the process in step S1 is repeated as it is.

The pump operation control apparatus according to the first embodiment causes the pump 8 to be operated when the brake pedal 2 has been depressed. Moreover, after predetermined time has elapsed or the brake pedal 2 has been released, the operation of the pump 8 is interrupted. Therefore, a predetermined hydraulic pressure can always adequately be accumulated in the accumulator 7. Therefore, deterioration in the durability of the pump 8, the motor 9, the accumulator 7 and so forth can be prevented. Moreover, even after the vehicle has been allowed to stand for long time, insufficient hydraulic pressure level accumulated in the accumulator 7 can reliably be prevented.

The pump operation control apparatus according to the first embodiment does not incorporate the pump-operating pressure sensor and an alarm-issuing-pressure sensor. Since the foregoing apparatus incorporates only the conventional brake switch, the apparatus can be simplified and the cost can be reduced.

Figure 7:
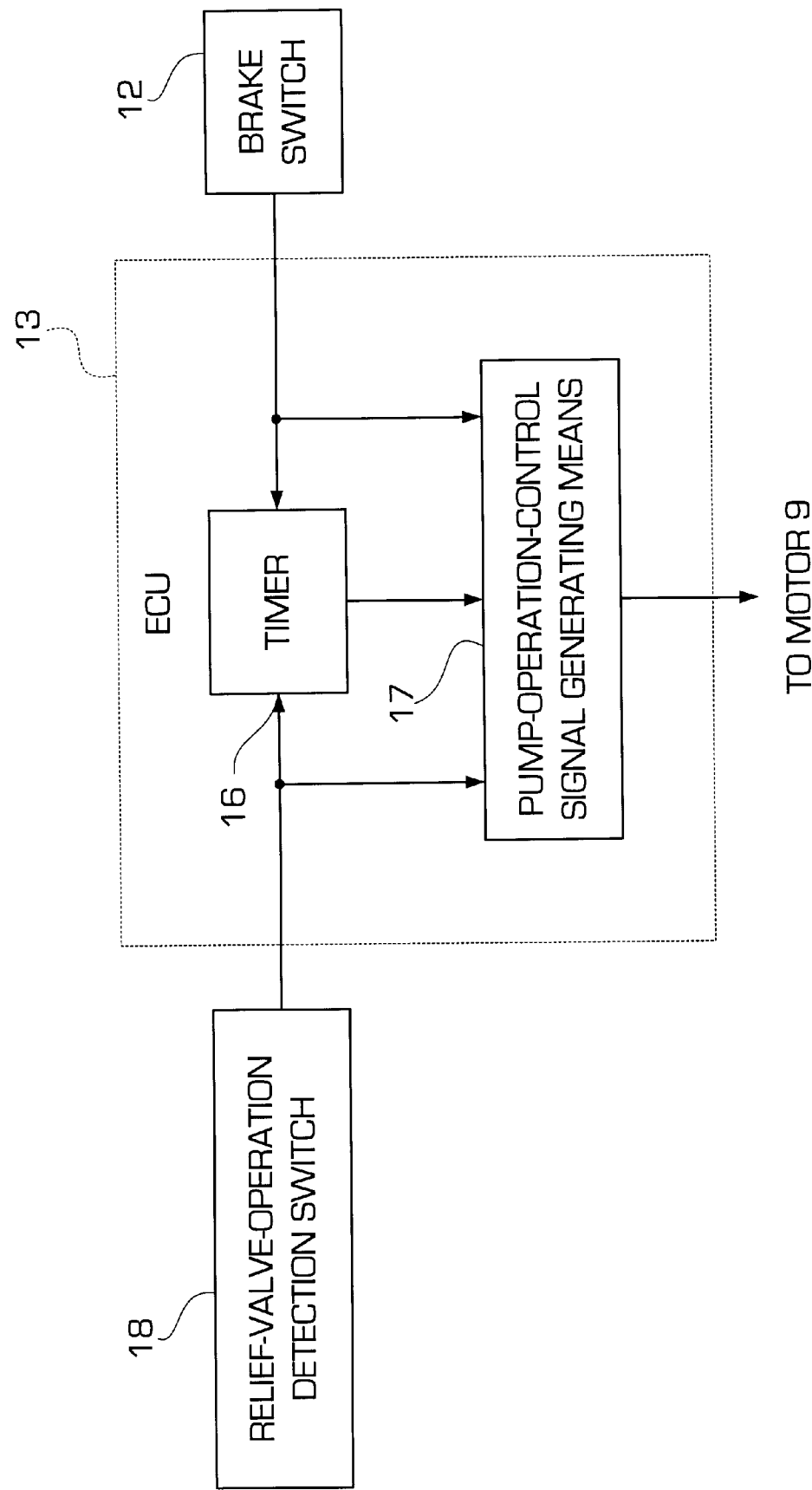
FIG. 7 is a diagram showing a second embodiment of the present invention.

FIG. 7 shows a second embodiment of the present invention similarly to FIG. 2. In the second and following embodiments, the same elements as those according to the first embodiment and the same elements among the embodiments are given the same reference numerals and the same elements are omitted from detailed description.

As show in FIG. 7, the second embodiment is provided with a relief-valve-operation detecting switch 18 for detecting the operation of the relief valve 11. An output signal from the relief-valve-operation detecting switch 18 is supplied to the timer 16 and the pump-operation-control-signal generating means 17. The relief-valve-operation detecting switch 18 may be a sensor for detecting movement of a valve of the relief valve 11 or a sensor for detecting flow of the operating fluid from the relief valve 11 to the reservoir 6. Any structure of the relief-valve-operation detecting switch 18 may be employed if the employed structure is able to detect the operation of the relief valve 11.

The pump operation control apparatus according to the second embodiment has a structure that the operation of the pump 8 is started when the brake pedal 2 has been depressed. When the operation of the relief valve 11 has been started, that is, when the relief valve 11 starts relieving the hydraulic pressure accumulated in the accumulator 7, the operation of the pump 8 is interrupted.

Figure 8:
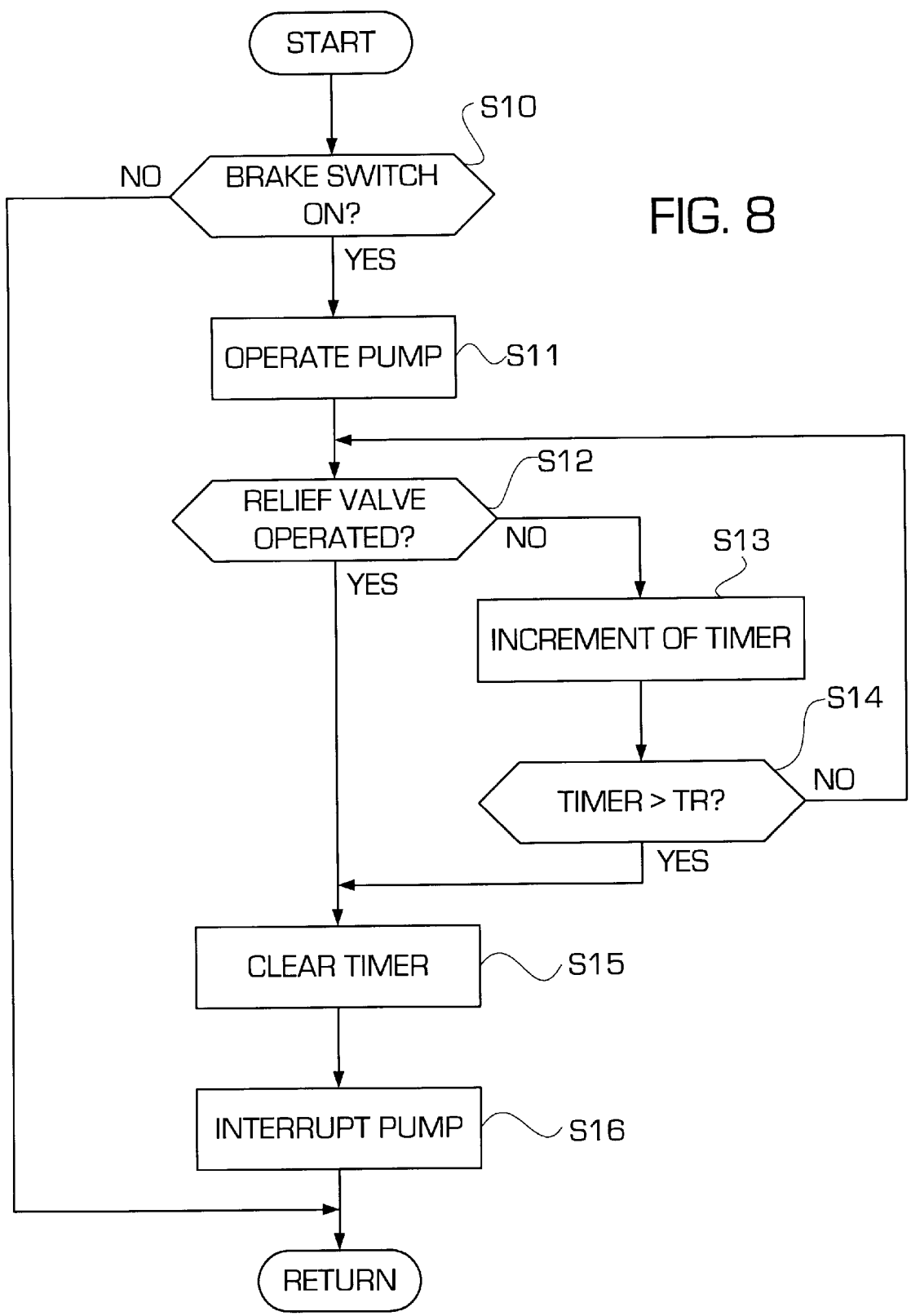
FIG. 8 is a flow chart of a pump operation control according to the second embodiment.

As shown in FIG. 8, if a determination is made in step S10 that the brake switch 12 has been switched on, the pump 8 is, in step S11, operated through the timer 16 in response to an ON signal of the brake switch 12 similarly to the first embodiment. In step S12 whether or not the relief valve 11 has been operated is determined in accordance with an output signal from the relief-valve-operation detecting switch 18. If a determination is made that the relief valve 11 has not been operated, the timer 16 starts measuring time in step S13. In step S14 whether or not time measured by the timer 16 is longer than predetermined time $T_R$ is determined. If a determination is made that the measured time is not longer than the predetermined time $T_R$, the operation is shifted to step S12. If a determination is made that the measured time is longer than the predetermined time $T_R$, the time measured by the timer 16 is cleared in step S15. In step S16 the operation of the pump 8 is interrupted. Then, the operation is returned to the start. The reason why the operation of the pump 8 is interrupted when the time measured by the timer 16 is longer than the predetermined time $T_R$ will now be described. If the relief valve 11 is not operated although a determination can be made that the hydraulic pressure has been accumulated in the accumulator 7 to a level not lower than the relieving predetermined set to the relief valve 11 because of the operation of the pump 8 for time not shorter than predetermined time, a determination must be made that a failure of the relief valve 11 or the like has occurred and abnormal accumulation in the accumulator 7 must be prevented.

If a determination has been made in step S12 that the relief valve 11 has been operated, the operation is shifted to step S15 so that the process in step S15 and following processes are performed.

The other structures and effects of the second embodiment are the same as those of the first embodiment.

As a matter of course, the processes in steps S11, S12 and S13 are performed substantially simultaneously.

Figure 9:
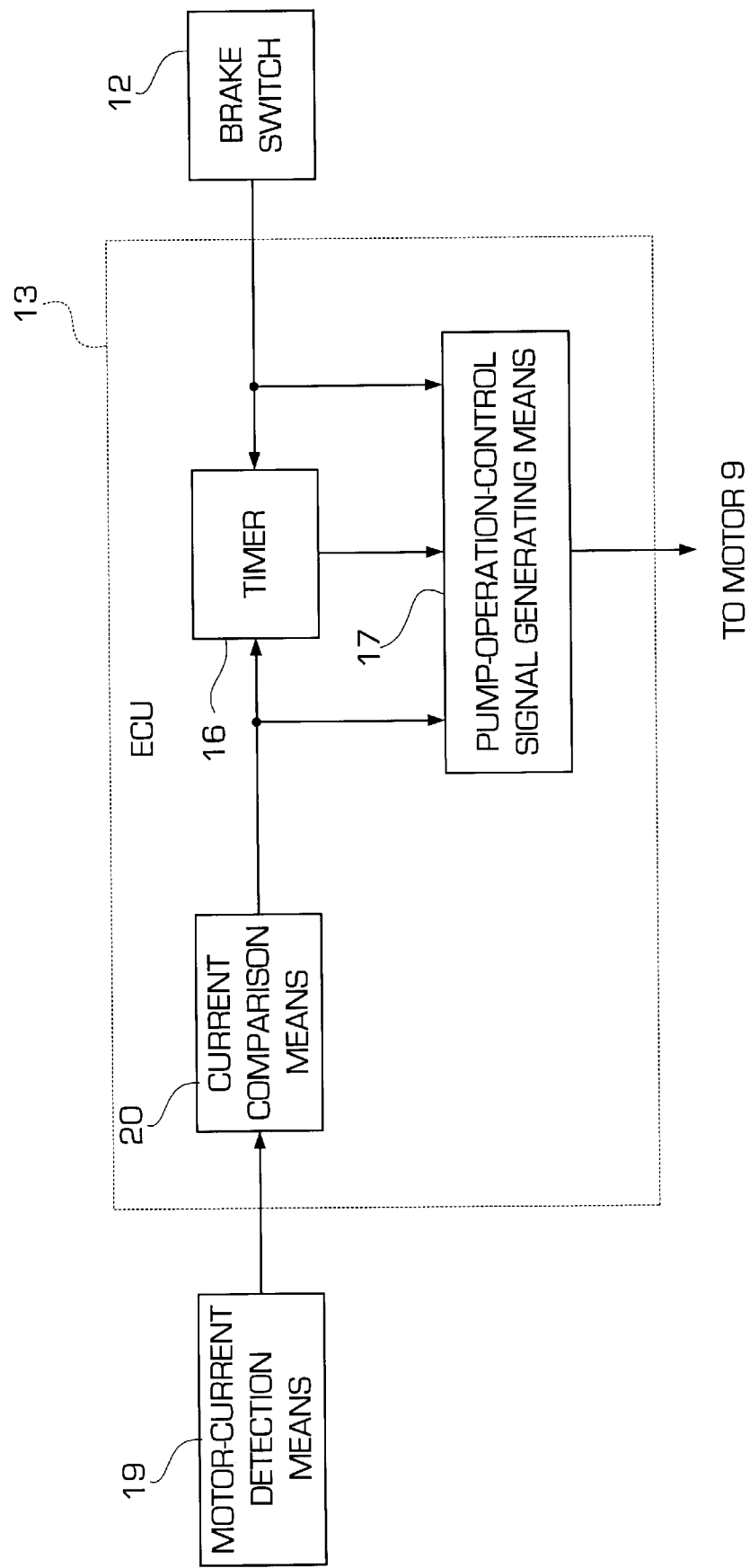
FIG. 9 is a diagram showing a third embodiment of the present invention.

FIG. 9 is a diagram showing a third embodiment of the present invention similarly to FIG. 7.

As shown in FIG. 9, the third embodiment is provided with a motor-current detecting means 19 employed in place of the relief-valve-operation detecting switch 18 according to the second embodiment and arranged to detect an electric current of the motor 9. Moreover, the third embodiment is provided with a current comparison means 20 for subjecting the electric current of the motor 9 and a predetermined current level A to a comparison and makes a determination. An output signal from the current comparison means 20 is supplied to the timer 16 and the pump-operation-control-signal generating means 17. The pump operation control apparatus according to the third embodiment has a structure that the operations of the motor 9 and the pump 8 are started when the brake pedal 2 has been depressed. An electric current which flows in the motor 9 is measured by the motor-current detecting means 19. Moreover, the measured electric current of the motor 9 is supplied to the current comparison means 20. The current comparison means 20 subjects the electric current of the motor 9 and the predetermined current level A to a comparison to make a determination. If the electric current of the motor 9 is higher than the predetermined current level A, the operation of the pump 8 is interrupted.

The motor-current detecting means 19 may be a means structured such that a shunt resistor is disposed downstream of the motor 9 so as to detect an electric current in accordance with voltage drop caused by the resistor.

Figure 10:
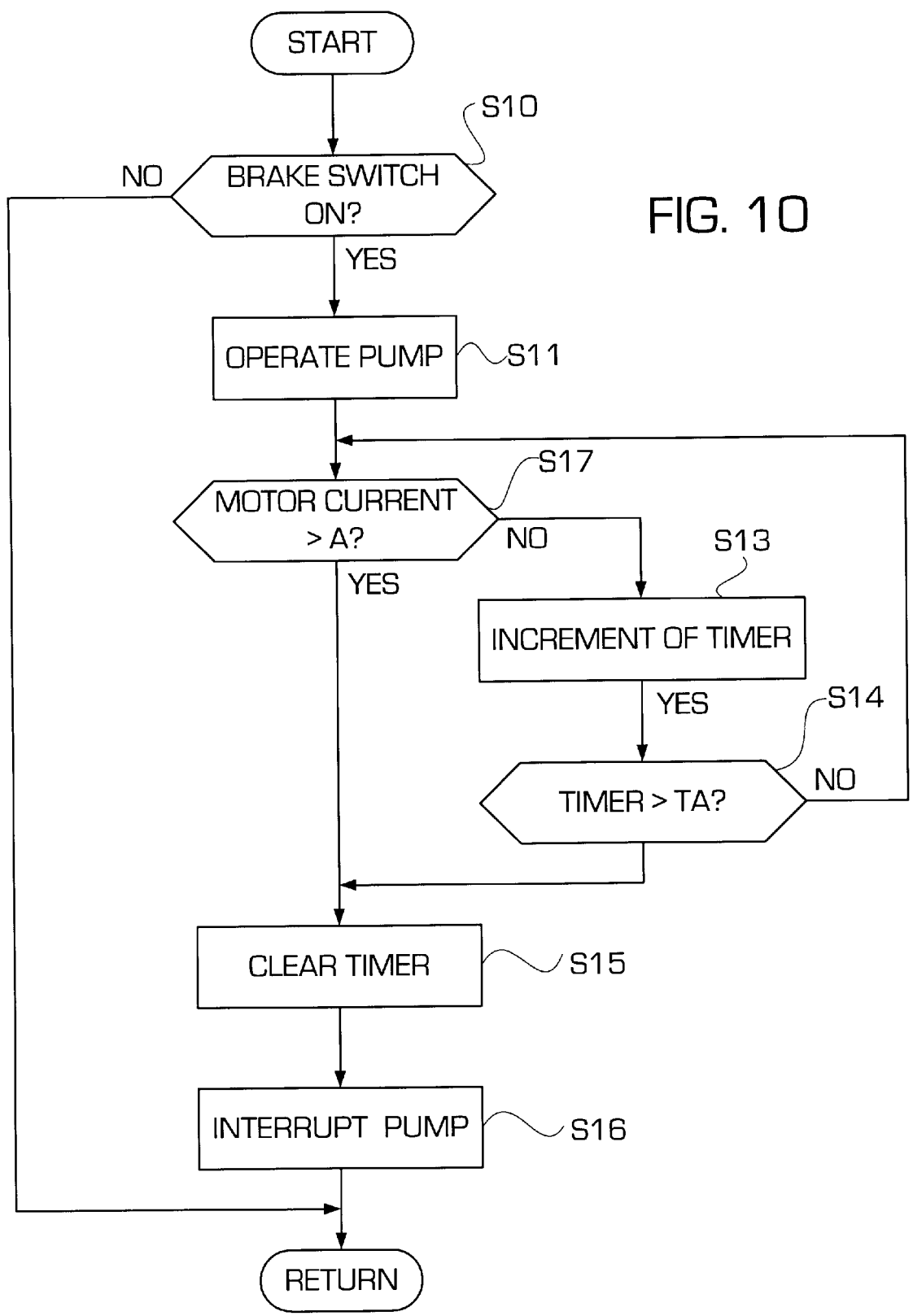
FIG. 10 is a flow chart of a pump operation control according to the third embodiment.

The flow of the pump operation control according to the third embodiment has the structure that the process for determining the operation of the relief valve in step S12 shown in FIG. 8 and according to the second embodiment is replaced by a process in step S17 for determining whether or not the electric current of the motor is larger than the predetermined current level A, as shown in FIG. 10. Moreover, the predetermined value $T_A$ corresponding to an electric current is employed in step S14 in place of the predetermined time $T_R$ corresponding to the operation of the relief valve 11. The other processes are the same as those according to the second embodiment shown in FIG. 8. If a determination is made that the electric current of the motor is higher than the predetermined current level A, the time measured by the timer 16 in step S15 is shifted to a clearing process. If a determination is made that the electric current of the motor is not larger than the predetermined current level A, the operation is shifted to step S13 in which the timer 16 performs an operation for measuring time.

The electric current of the motor is employed as a parameter for operating the pump 8. The reason for this will now be described. If the accumulated hydraulic pressure in the accumulator 7 is raised, the electric current of the motor 9 is enlarged. Therefore, if an electric current of the motor 9 is larger than the predetermined current level A, a determination can be made that hydraulic pressure is accumulated in the accumulator 7 to a level not lower than the predetermined level.

The operation of the pump 8 is interrupted when time measured by the timer 16 is longer than the predetermined value $T_A$. The reason for this will now be described. If the electric current of the motor is not larger than the predetermined current level A though the pump 8 has been operated for time not shorter than predetermined time and thus a determination can be made that hydraulic pressure has been accumulated in the accumulator 7 to a level not lower than the predetermined level, a determination must be made that a failure of the motor 9 or the like occurs to prevent abnormal accumulation in the accumulator 7.

The other structures and effects of the third embodiment are the same as those of the second embodiment.

Figure 11:
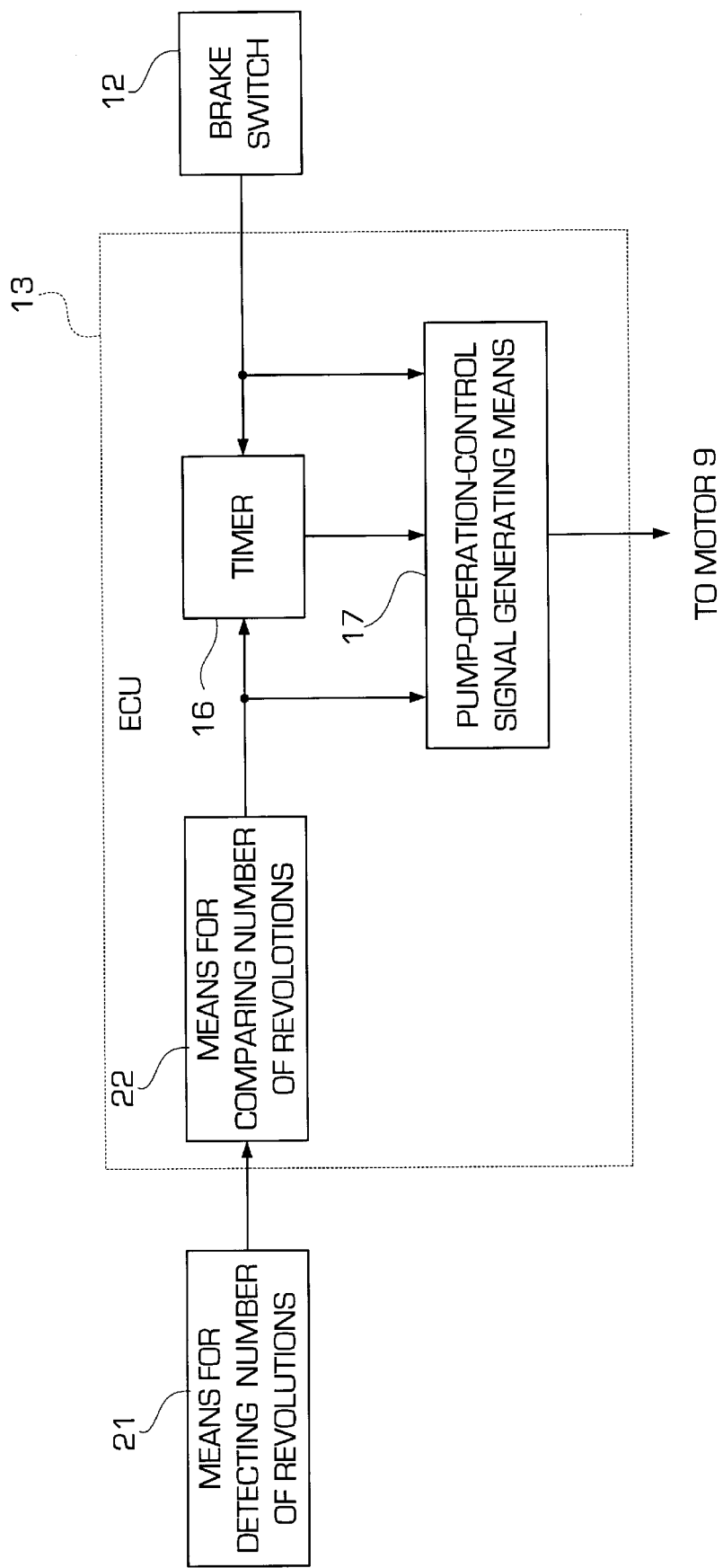
FIG. 11 is a diagram showing a fourth embodiment of the present invention.

FIG. 11 is a diagram showing a fourth embodiment of the present invention similarly to FIG. 9.

As shown in FIG. 11, the fourth embodiment has the structure that the motor-current detecting means 19 and the current comparison means 20 according to the third embodiment are replaced by a motor-revolution-number detecting means 21 for detecting the number of revolutions of the motor 9. Moreover, the fourth embodiment incorporates a revolution-number comparison means 22 for subjecting the number of revolutions of the motor 9 measured by the motor-revolution-number detecting means 21 and a predetermined number of revolutions N to a comparison to make a determination. Moreover, an output signal from the revolution-number comparison means 22 is supplied to the timer 16 and the pump-operation-control-signal generating means 17. The pump operation control apparatus according to the fourth embodiment has a structure that the operations of the motor 9 and the pump 8 are started when the brake pedal 2 has been depressed. The number of revolutions of the motor 9 is measured by the motor-revolution-number detecting means 21. Moreover, the measured number of revolutions of the motor 9 is communicated to the revolution-number comparison means 22. The revolution-number comparison means 22 subjects the foregoing number of revolutions of the motor 9 and the predetermined number of revolutions N to a comparison to make a comparison. If the number of revolutions of the motor 9 is larger than the predetermined number of revolutions N, the operation of the pump 8 is interrupted.

Figure 12:
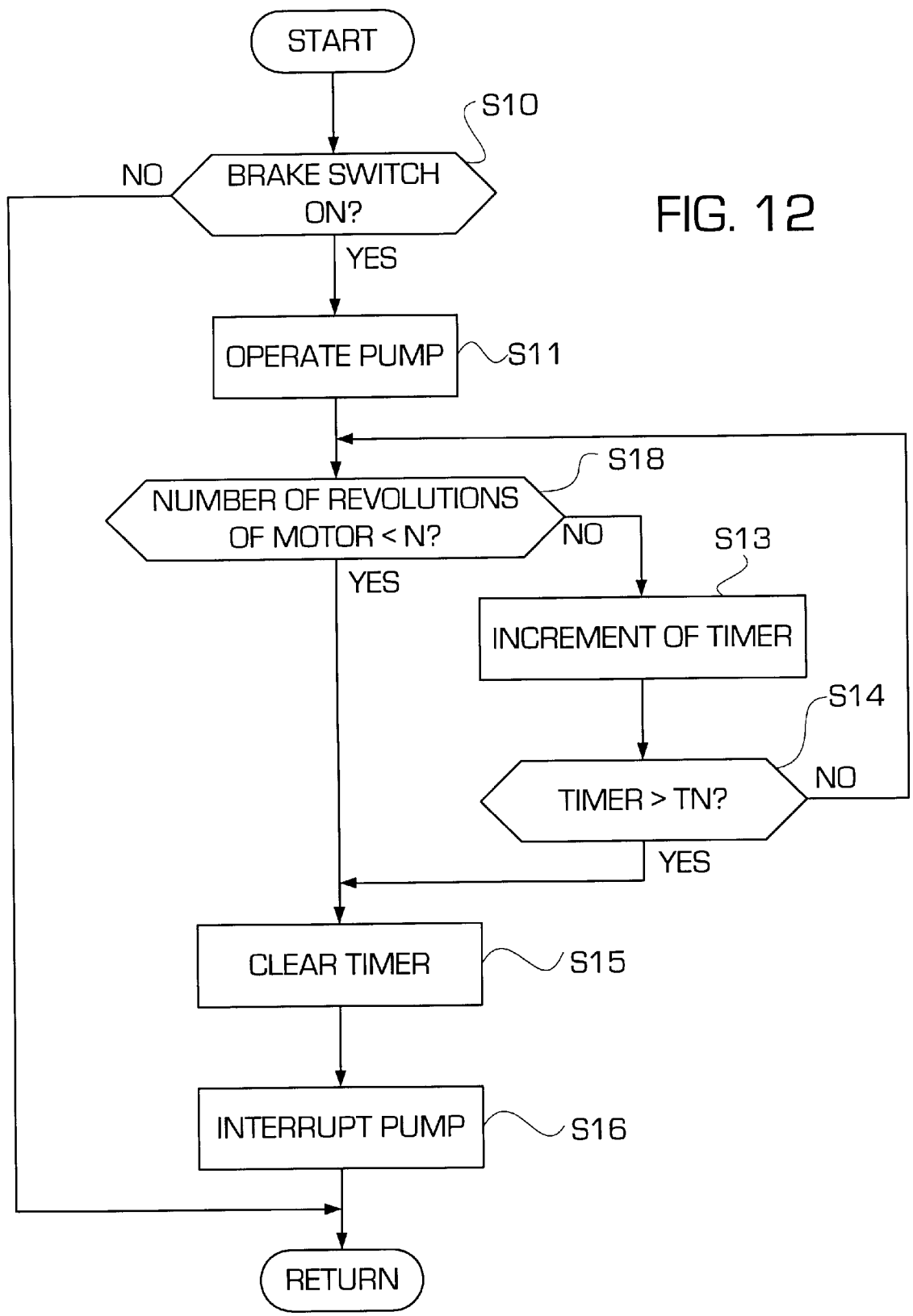
FIG. 12 is a flow chart of a pump operation control according to the fourth embodiment.

The flow of the pump operation control process according to the fourth embodiment has a structure that the process according to the third embodiment shown in FIG. 10 in which a determination is made whether or not the electric current of the motor in step S17 is larger than the predetermined current level A is omitted, as shown in FIG. 12. In place of the foregoing determination process, step S18 is provided in which a determination is made whether or not the number of revolutions of the motor 9 is smaller than the predetermined number of revolutions N. Moreover, predetermined value $T_N$ corresponding to the number of revolutions of the motor 9 is set in step S14 in place of the predetermined value $T_A$ corresponding to an electric current of the motor 9. The other processes in the flow are the same as those according to the third embodiment shown in FIG. 10. If a determination is made that the number of revolutions of the motor 9 is smaller than the predetermined number of revolutions N, time measured by the timer 16 in step S15 is shifted to a process for clearing time. If a determination is made that the number of revolutions of the motor 9 is not smaller than the predetermined number of revolutions N, the operation is shifted to step S13 so that the timer 16 measures time.

The number of revolutions of the motor is employed as a parameter for operating the pump 8. The reason for this will now be described. If the accumulated hydraulic pressure in the accumulator 7 is raised, the number of revolutions of the motor 9 is reduced. Therefore, if the number of revolutions of the motor 9 is smaller than the predetermined number of revolutions N, a determination can be made that hydraulic pressure is accumulated in the accumulator 7 to a level not lower than the predetermined level.

The operation of the pump 8 is interrupted when time measured by the timer 16 is longer than the predetermined value $T_N$. The reason for this will now be described. If the number of revolutions of the motor 9 is not smaller than the predetermined number of revolutions N though the pump 8 has been operated for time not shorter than predetermined time and thus a determination can be made that hydraulic pressure has been accumulated in the accumulator 7 to a level not lower than the predetermined level, a determination must be made that a failure of the motor 9 or the like occurs to prevent abnormal accumulation in the accumulator 7.

The other structures and effects of the fourth embodiment are the same as those of the third embodiment.

Figure 13:
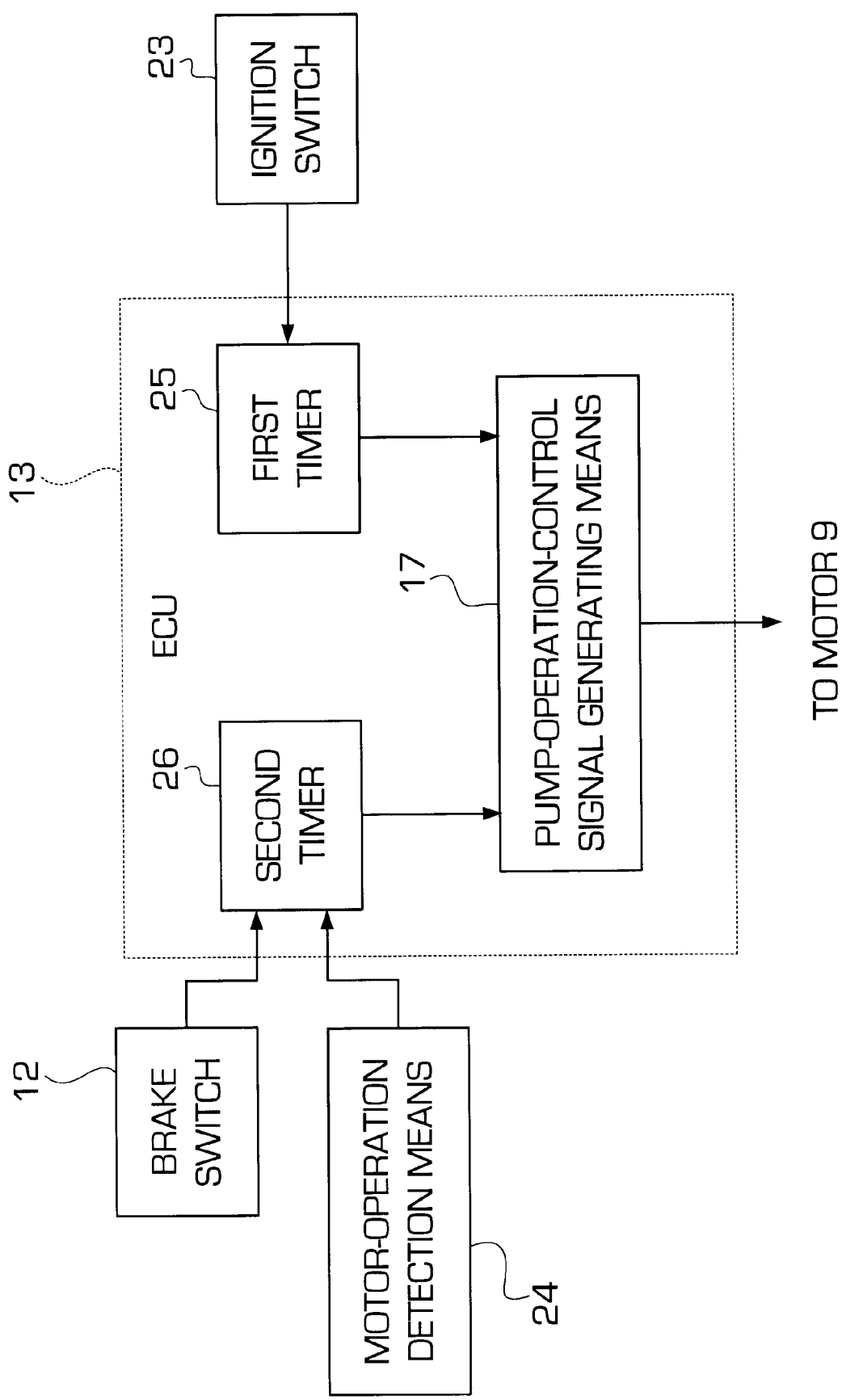
FIG. 13 is a diagram showing a fifth embodiment of the present invention.

FIG. 13 shows a fifth embodiment of the present invention, similar to FIG. 2.

The above-mentioned first to fourth embodiments have the structure that the operation of the pump 8 is started at the moment at which the brake pedal 2 is depressed, that is, when the brake switch 12 is switched on. In the fifth embodiment, the operation of the pump 8 is performed when an ignition switch 23 is switched on. In this case, the pump 8 is operated for predetermined time T previously set to the timer 16 similarly to the first embodiment.

Therefore, the fifth embodiment, as shown in FIG. 13, incorporates the brake switch 12; the ignition switch 23; a motor-operation detecting means 24 for detecting the operation of the motor 9; a first timer 25 for measuring time when an ON signal of the ignition switch 23 has been supplied; and a second timer 26 for measuring time when an ON signal of the brake switch 12 has been supplied and measuring time when an output signal from the motor-operation detecting means 24 has been supplied. In response to output signals from the first and second timers 25 and 26, the operation of the motor 9 is controlled. Similarly to the predetermined time T set to the timer 16 according to the first embodiment, the pump 8 is operated for predetermined time T2 previously set to the second timer 26 when the ignition switch 23 is switched on. Moreover, the operation of the pump is performed at predetermined time intervals T1 previously set to the first timer 25. The predetermined time interval T1 set to the first timer 25 is made to be longer than the predetermined time T2 set to the second timer 26. Therefore, the pump operation control according to the fifth embodiment is the same as the operation control of the pump 8 which is performed in accordance with time member the timer 16 shown in FIG. 3.

Figure 14:
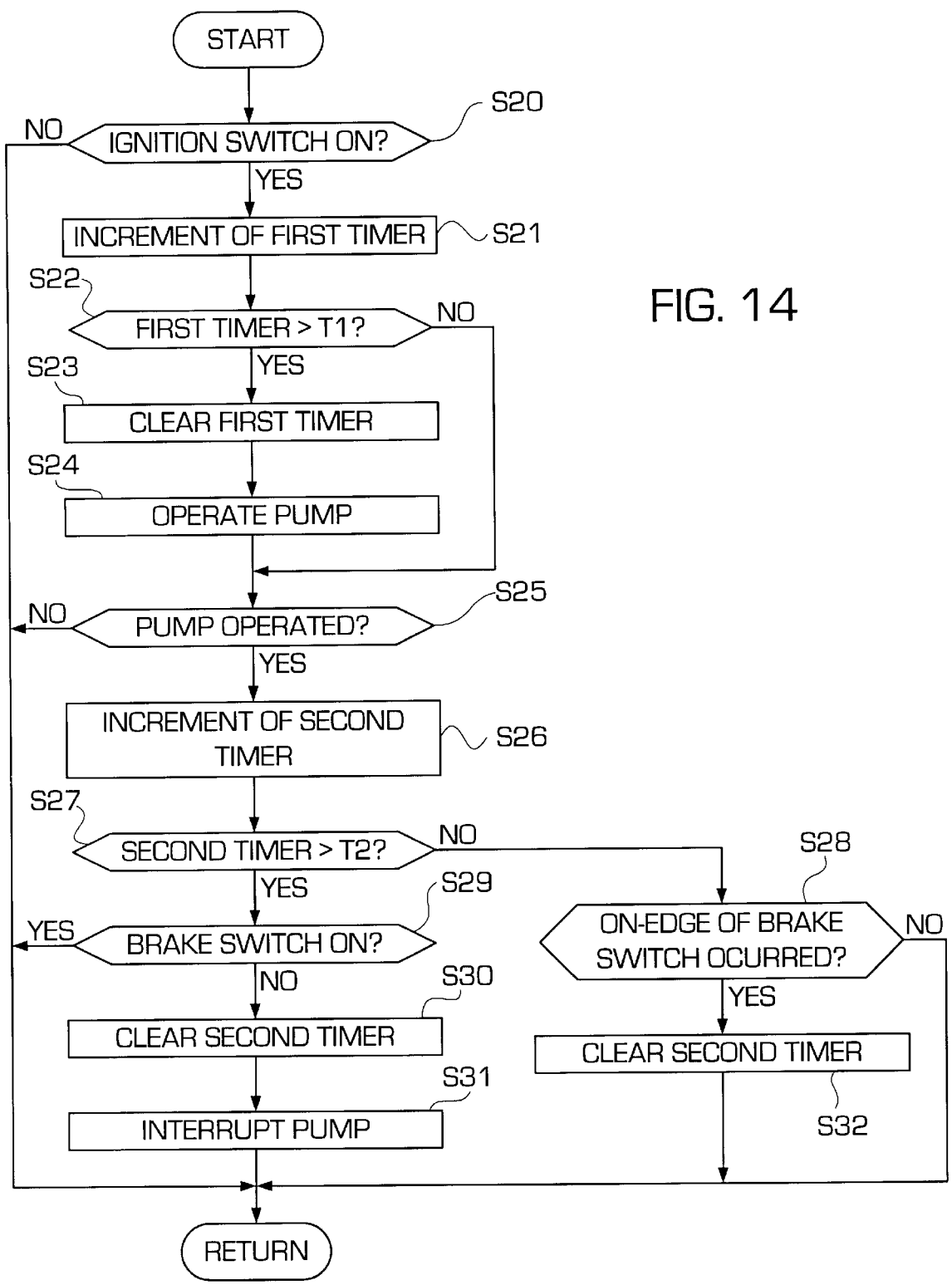
FIG. 14 is a flow chart of a pump operation control according to the fifth embodiment.

The flow of the pump operation control according to the fifth embodiment is structured as shown in FIG. 14 such that whether or not the ignition switch 23 has been switched on is determined in step S20. If a determination is made that the ignition switch 23 has been switched on, the first timer 25, step S21, measures time in response to an ON signal of the ignition switch 23. In step S22 whether or not time measured by the first timer 25 is longer than predetermined time interval T1 is determined in step S22. If a determination is made that the measured time is longer than the predetermined time interval T1, time measured by the first timer 25 is cleared in step S23. Moreover, the pump 8 is operated in step S24. In step S25 whether or not the pump 8 has been operated is determined. If a determination is made that the pump 8 has been operated, the second timer 26, in step S26, measures time in response to an output signal from the motor-operation detecting means 24.

In step S27 whether or not the time measured by the second timer 26 is longer than the predetermined time T2 is determined. Since the measured time is shorter than the predetermined time T2 at first, a determination is made in step S27 that the measured time is not longer than the predetermined time T2. As a result, whether or not on-edge of the brake switch 12 has taken place is determined in step S28. If a determination is made that no on-edge has taken place, the operation is returned to the start as it is. Then, the ignition switch 23 is switched on. In a period in which the time measured by the second timer 26 is not longer than the predetermined time T2, the pump 8 is operated and no on-edge of the brake switch 12 takes place, the processes from steps S20 to S28 are repeated.

If a determination is made in step S27 that the time measured by the second timer 26 is made to be longer than the predetermined time T2, whether or not the brake switch 12 has been switched on is determined in step S29. If a determination is made that the brake switch 12 has not been switched, time measured by the second timer 26 is cleared in step S30. Moreover, the operation of the pump 8 is interrupted in step S31. Then, the operation is returned to the start. That is, the flow of the operation control of the pump 8 according to the fifth embodiment is substantially the same as that according to the first embodiment shown in FIG. 4.

If a determination is made in step S29 that the brake switch 12 has been switched on, the operation is returned to the start. Then, the processes in step S20 and following steps are repeated. At this time, the ignition switch 23 is switched on, the pump 8 is operated and time measured by the second timer 26 is longer than the predetermined time T. Therefore, processes in steps S20 to S27 are performed, and then the process in step S29 is again performed. If a determination is again made in step S29 that the brake switch 12 has been switched on, the operation is again returned to the start. In a period in which the brake switch 12 is switched on, the processes in steps S20 to S27 and S29 are repeated. If a determination is made in step S29 that the brake switch 12 has not been switched on, processes in steps S30 and S31 are performed. The second timer 26 is cleared, and the operation of the pump 8 is interrupted. Then, the operation is returned to the start. That is, the flow of the operation control of the pump 8 is substantially the same as that according to the first embodiment shown in FIG. 4.

If a determination is made in step S28 that on-edge of the brake switch 12 has taken place, time measured by the second timer 26 is cleared in step S31. Then, the operation is returned to the start. Then, the processes in step S20 and following steps are again performed. If a determination is made in step S28 that no on-edge of the brake switch 12 has taken place, the operation is again returned to the start. In a period in which time measured by the second timer 26 is shorter than the predetermined time T2 and no on-edge of the brake switch 12 does not again take place, the processes in step S20 and following steps are repeated. If a determination is made in step S27 that the measured time is longer than the predetermined time T2, the operation proceeds to step S29 so that the processes similar to the above-mentioned case are performed. That is, the flow of the operation control of the pump 8 is substantially the same as that according to the first embodiment shown in FIG. 5.

If a determination is made in step S25 that the pump 8 has not been operated, the operation is returned to the start. Thus, the processes in step S20 and following steps are again repeated. If a determination is made in step S22 that the time measured by the first timer is not longer than the predetermined time interval T1, the operation proceeds to step S25. Thus, the processes in step S25 and following processes are repeated. If a determination is made in step S20 that the ignition switch 23 has not been switched on, the process in step S20 is repeated.

The pump operation control apparatus according to the fifth embodiment enables the pump 8 to be operated by simply switching on the ignition switch 23 for the-purpose of driving the vehicle regardless of the depression of the brake pedal 2. Therefore, accumulation in the accumulator 7 can furthermore reliably be performed. Even if the level of the hydraulic pressure accumulated in the accumulator 7 is reduced because, for example, the vehicle has been allowed to stand for long time, a predetermined pressure level in the accumulator 7 can reliably be maintained by only switching the ignition switch 23 on.

The other structures and effects of the fifth embodiment are the same as those of the first embodiment.

Figure 15:
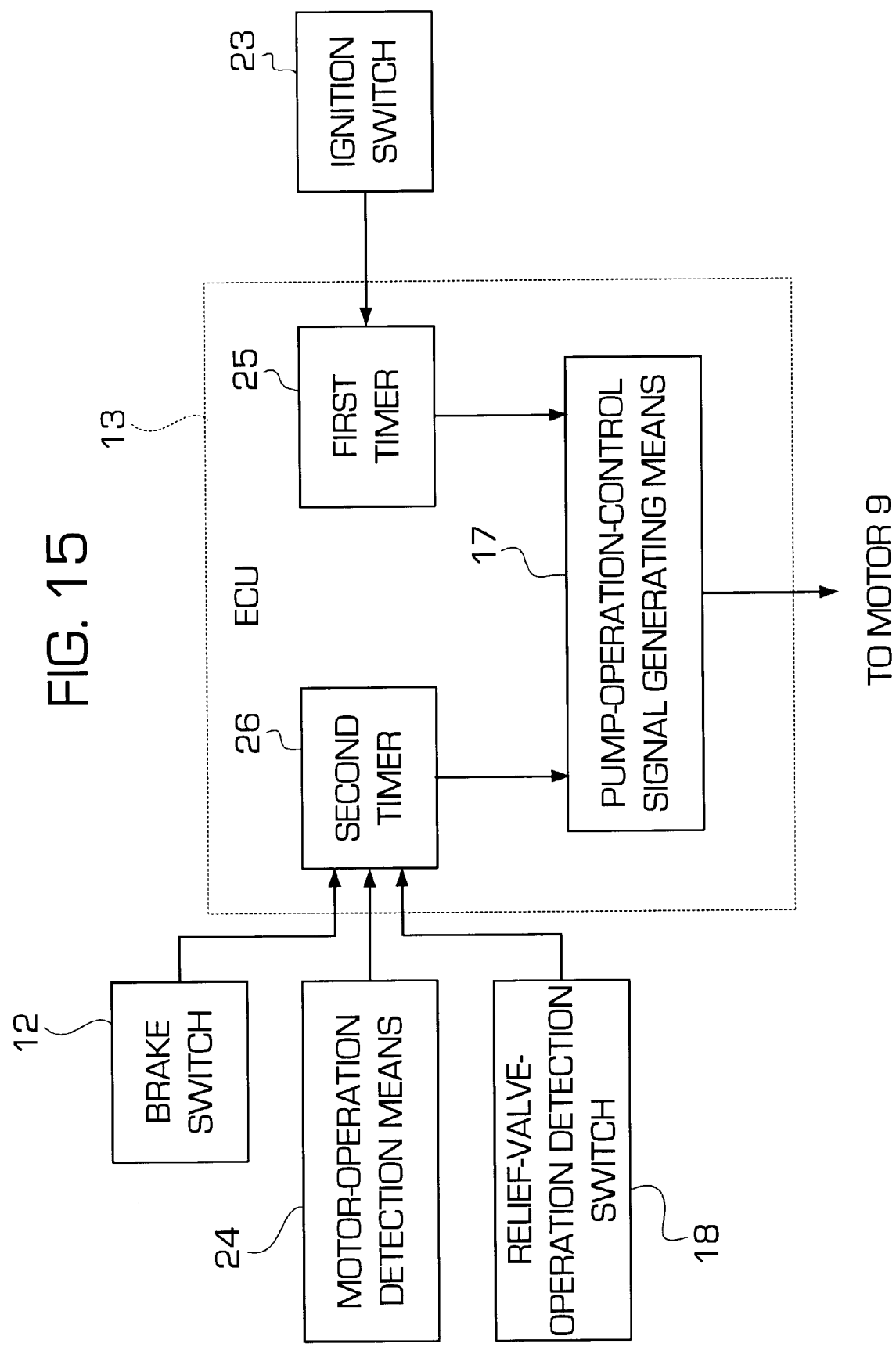
FIG. 15 is a diagram showing a sixth embodiment of the present invention.

FIG. 15 shows a sixth embodiment of the present invention similarly to FIG. 13.

As shown in FIG. 15, a pump operation control apparatus according to the sixth embodiment has a structure that the relief-valve-operation detecting switch 18 for detecting the operation of the relief valve 11 similarly to the second embodiment shown in FIG. 7 is added to the structure according to the fifth embodiment shown in FIG. 13. An output signal from the relief-valve-operation detecting switch 18 is supplied to the second timer 26 and the pump-operation-control-signal generating means 17.

Similarly to the fifth embodiment, the pump operation control apparatus according to the sixth embodiment has a structure that the pump 8 is operated at predetermined time interval T1 when the ignition switch 23 has been switched on. When the operation of the relief-valve 11 has been started, the operation of the pump 8 is interrupted.

Figure 16:
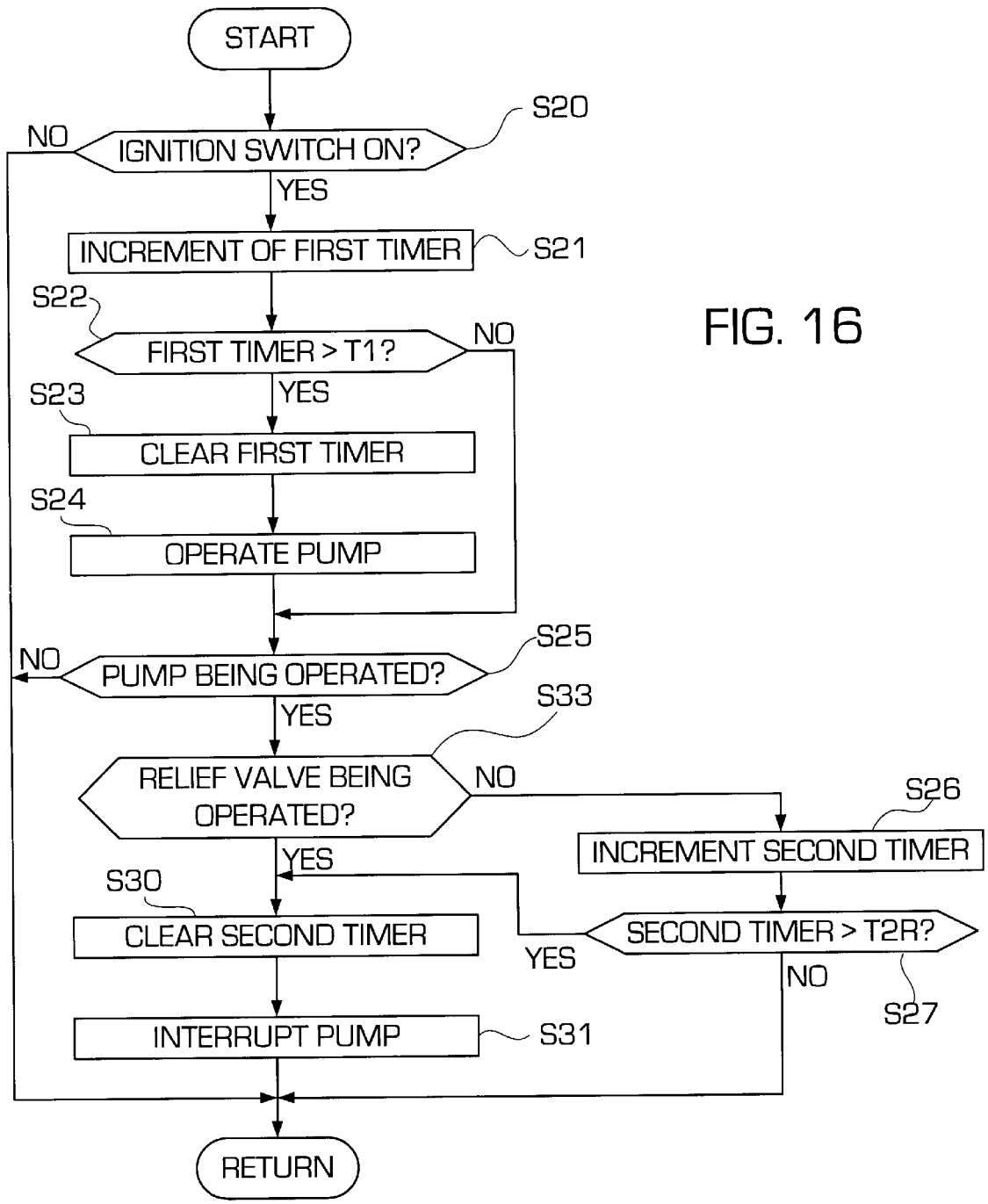
FIG. 16 is a flow chart of a pump operation control according to the sixth embodiment.

As shown in FIG. 16, a flow to steps S20 to S25 of the pump operation control are the same as the flow according to the fifth embodiment shown in FIG. 14. Processes in steps S28, S32 and S29 according to the fifth embodiment and following step S25 are omitted. In step S25 whether or not the operation of the pump 8 has been operated is determined. If a determination is made that the pump 8 has been operated, the operation proceeds to step S33 so that whether or not the operation of the relief valve 11 has been performed is determined.

If a determination is made in step S33 that the relief valve 11 has not been operated, the second timer 26 starts measuring time in step S26. In step S27 whether or not time measured by the second timer 26 is longer than predetermined time $T2_R$ is determined. If a determination is made that the measured time is not longer than the predetermined time T2R, the operation is returned to the start as it is. Then, the processes in step S20 and following steps are again performed. If a determination is made that time measured by the second timer 26 is longer than the predetermined time $T2_R$, time measured by the second timer 26 is cleared in step S30. In step S31 the operation of the pump 8 is interrupted, and then the operation is returned to the start. Thus, the processes in step S20 and following steps are again performed.

The other structures and effects of the sixth embodiment are the same as those of the fifth embodiment.

Figure 17:
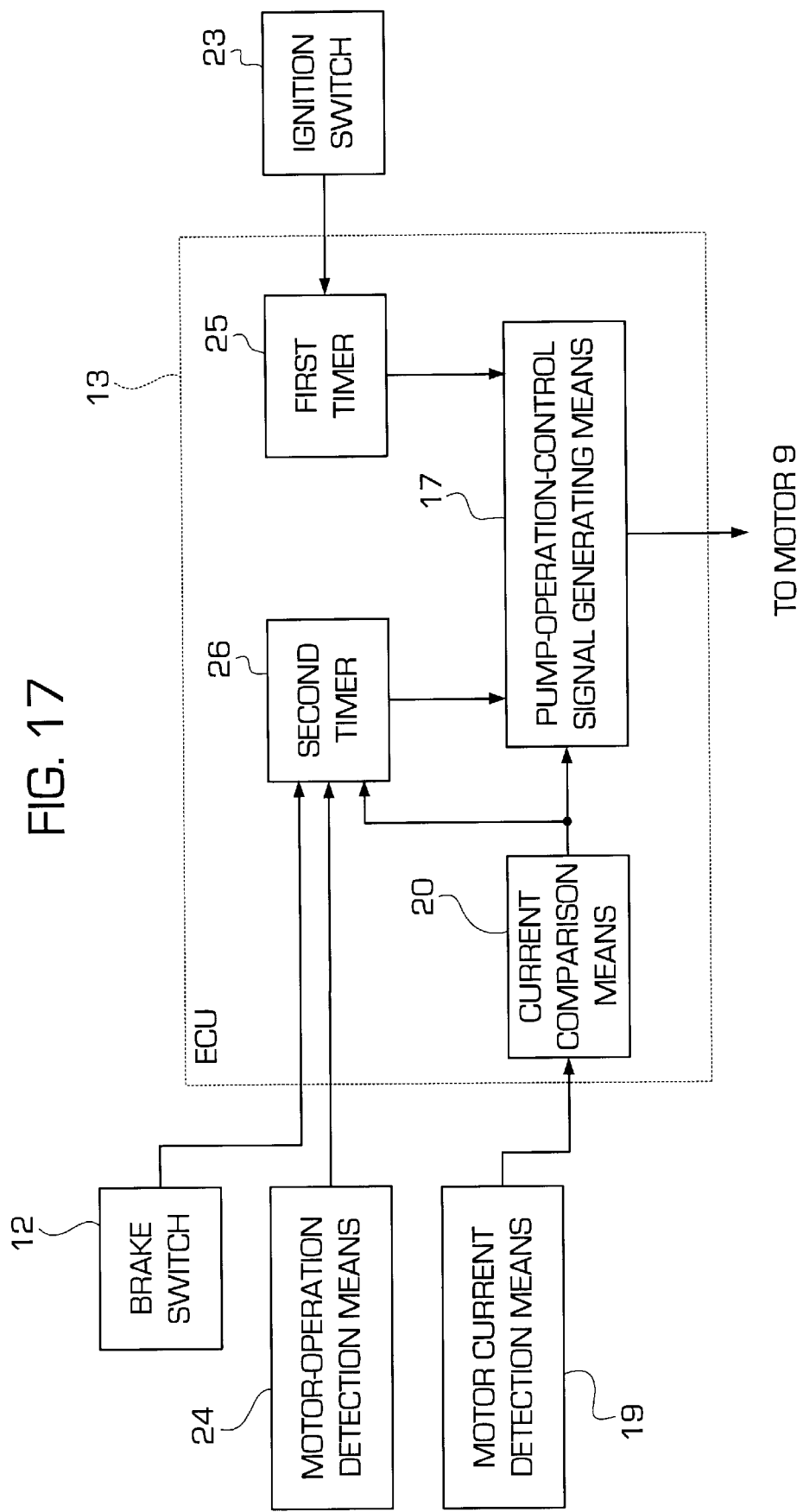
FIG. 17 is a diagram showing a seventh embodiment of the present invention.

FIG. 17 shows a seventh embodiment of the present invention similarly to FIG. 15.

As shown in FIG. 17, the seventh embodiment has a structure that the relief-valve-operation detecting switch 18 according to the sixth embodiment is omitted. In place of the relief-valve-operation detecting switch 18, the motor-current detecting means 19 for detecting an electric current of the motor 9 and a current comparison means 20 for subjecting the electric current of the motor 9 measured by the motor-current detecting means 19 and predetermined current level A to a comparison are provided similarly to the third embodiment shown in FIG. 9. Moreover, an output signal from the current comparison means 20 is supplied to the second timer 26 and the pump-operation-control-signal generating means 17.

The pump operation control apparatus according to the seventh embodiment has a structure that an electric current which flows in the motor 9 during the operation of the pump 8 is measured by the motor-current detecting means 19. Moreover, the measured electric current is supplied to the current comparison means 20. The current comparison means 20 subjects the electric current in the motor 9 and the predetermined current level A to a comparison so as to be determined. If the electric current in the motor 9 is larger than the predetermined current level A, the operation of the pump 8 is interrupted.

Figure 18:
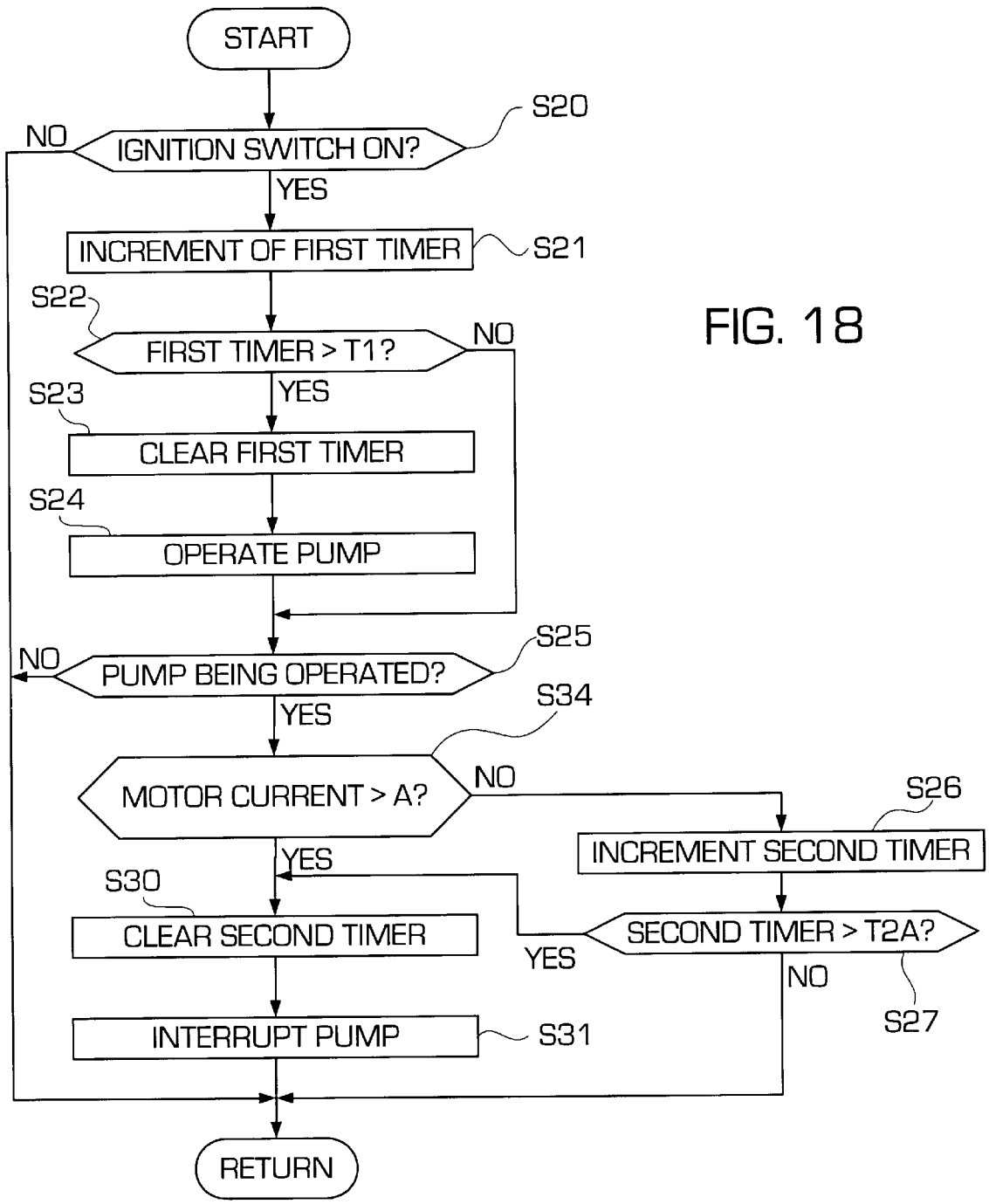
FIG. 18 is a flow chart of a pump operation control according to the seventh embodiment.

A flow of the pump operation control according to the seventh embodiment has a structure that the process in step S33 according to the sixth embodiment shown in FIG. 16 for determining the operation of the relief valve is omitted. As an alternative to this, step S34 is provided in which whether or not an electric current in the motor 9 is larger than the predetermined current level A is determined as shown in FIG. 18. Moreover, predetermined value $T2_A$ corresponding to an electric current is set in place of the predetermined time $T2_R$ corresponding to the operation of the relief valve 11 in step S27. The other processes in the flow are the same as those according to the sixth embodiment shown in FIG. 16. When a determination is made that the electric current in the motor 9 is larger than the predetermined current level A, the operation proceeds to step S30 in which time measured by the second timer 26 is cleared. If a determination is made that the electric current in the motor 9 is not larger than the predetermined current level A, the operation proceeds to step S26 in which the second timer 26 measures time.

The other structures and effects of the seventh embodiment are the same as those of the third and sixth embodiments.

Figure 19:
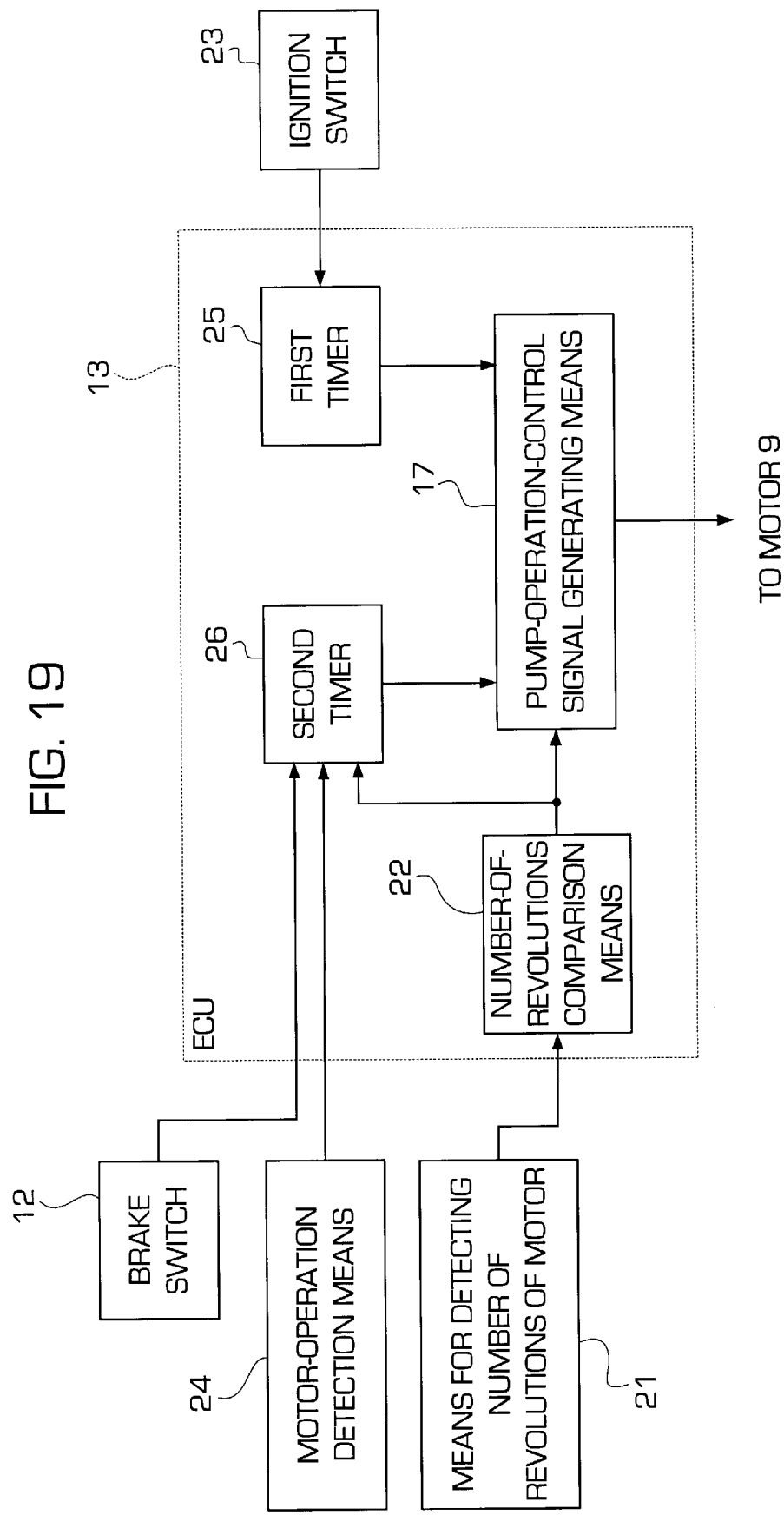
FIG. 19 is a diagram showing an eighth embodiment of the present invention.

FIG. 19 shows an eighth embodiment of the present invention similarly to FIG. 15.

As shown in FIG. 19, the eighth embodiment has a structure that the relief-valve-operation-detecting switch 18 according to the sixth embodiment is omitted. As an alternative to this, the motor-revolution-number detecting means 21 for detecting the number of revolutions of the motor 9 and the revolution-number comparison means 22 for subjecting the number of revolutions of the motor 9 measured by the motor-revolution-number detecting means 21 and predetermined number of revolutions N to a comparison to make a determination similarly to the fourth embodiment shown in FIG. 11. Moreover, an output signal from the revolution-number comparison means 22 is supplied to the second timer 26 and the pump-operation-control-signal generating means 17.

The pump operation control apparatus according to the eighth embodiment has a structure that the number of revolutions of the motor 9 realized during the operation of the pump 8 is measured by the motor-revolution-number detecting means 21. Moreover, the measured number of revolutions of the motor 9 is supplied to the revolution-number comparison means 22. The revolution-number comparison means 22 subjects the number of revolutions of the motor 9 and the predetermined number of revolutions N to a comparison to make a determination. If the number of revolutions of the motor 9 is smaller than the predetermined number of revolutions N, the operation of the pump 8 is interrupted.

Figure 20:
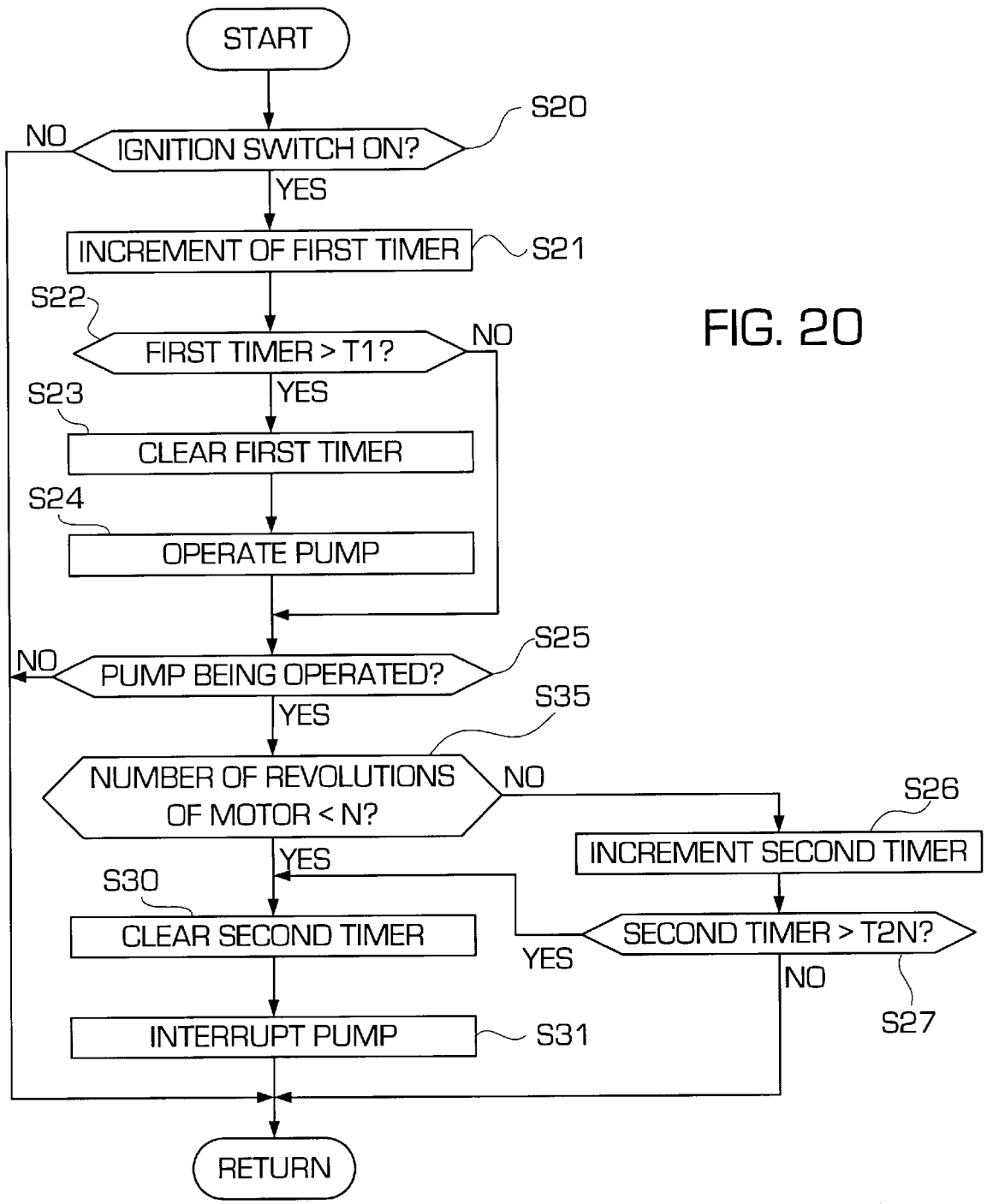
FIG. 20 is a flow chart of a pump operation control according to the eighth embodiment.

The flow of the pump operation control according to the eighth embodiment has a structure that the process in step S33 for determining the operation of the relief valve according to the sixth embodiment shown in FIG. 16 is omitted. As an alternative to this, step S35 is provided as shown in FIG. 20 for determining whether or not the number of revolutions of the motor 9 is larger than the predetermined number of revolutions N. Moreover, the predetermined time $T2_R$ corresponding to the operation of the relief valve 11 in step S27 is omitted. In place of this, predetermined value $T2_N$ corresponding to the number of revolutions is provided. The other processes in the flow are the same as those of the sixth embodiment shown in FIG. 16. If a determination is made that the number of revolutions of the motor 9 is smaller than the predetermined number of revolutions N, the operation is shifted to step S30 in which time measured by the second timer 26 is cleared. If a determination is made that the number of revolutions of the motor 9 is not larger than the predetermined number of revolutions N, the operation is shifted to step S26 so that the second timer 26 starts measuring time.

The other structures and effects of the eighth embodiment are the same as those of the third and sixth embodiments.

Figure 21:
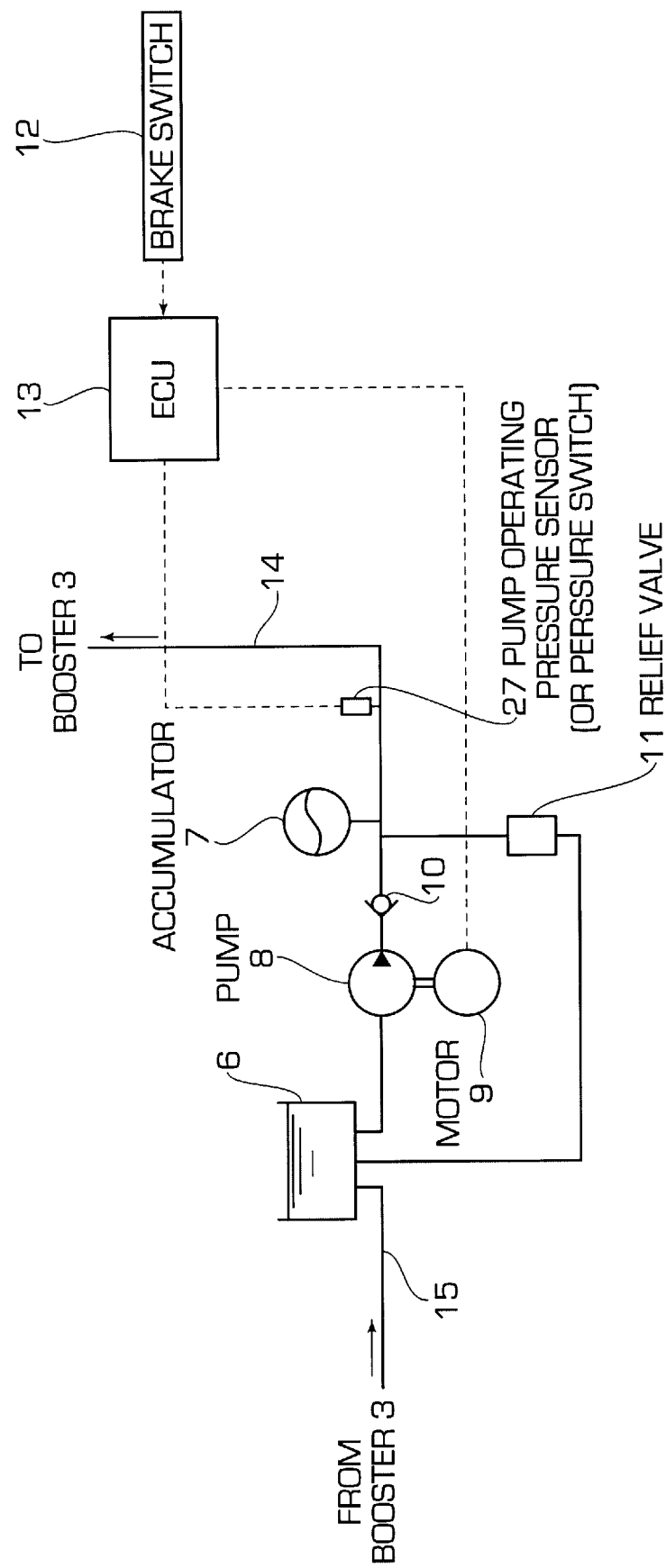
FIG. 21 is a diagram showing a hydraulic brake boosting system according to a ninth embodiment of the present invention similarly to a portion of FIG. 1.

FIG. 21 is a diagram partially showing a ninth embodiment of the present invention.

Figure 22:
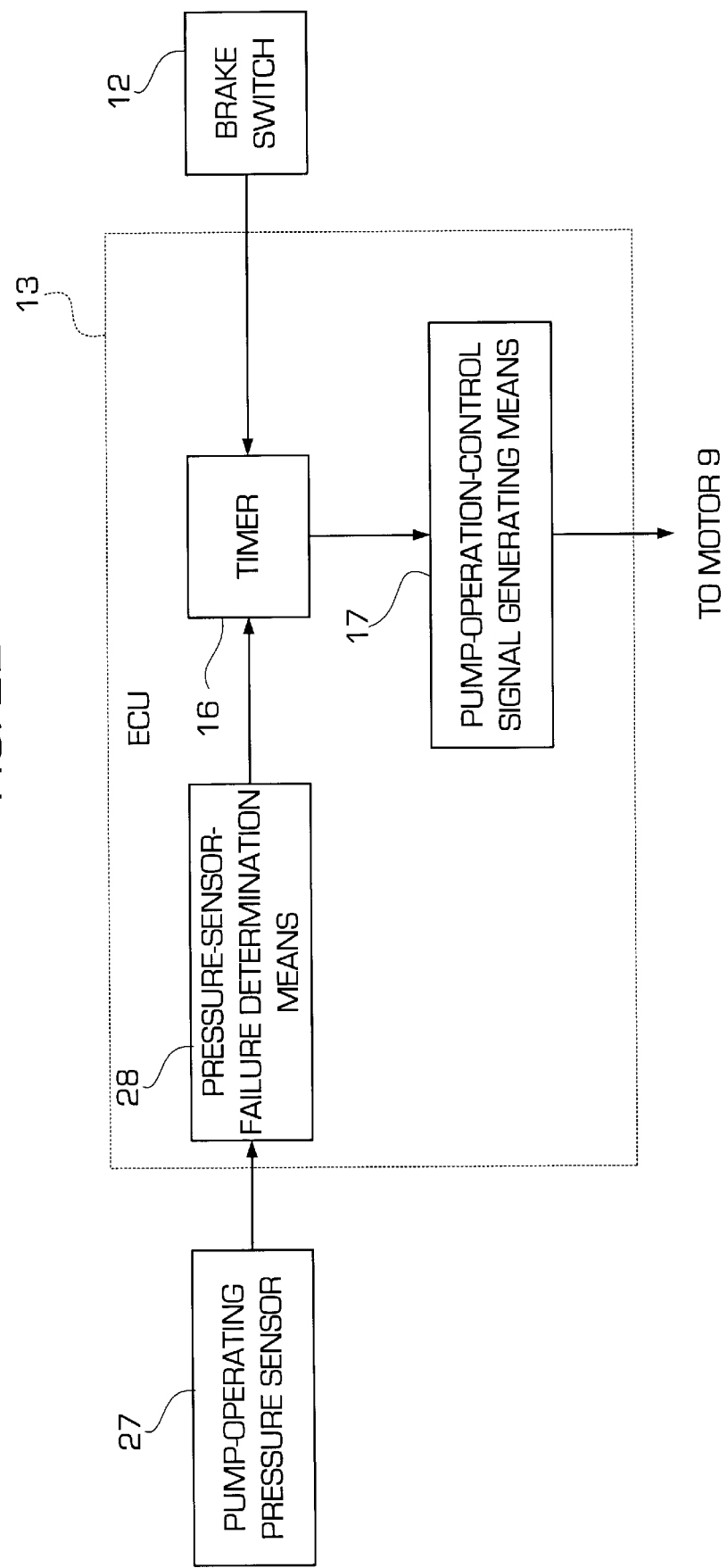
FIG. 22 is a diagram showing a ninth embodiment of the present invention.

As shown in FIG. 21, the ninth embodiment has a structure that a pump-operating pressure sensor 27 similarly to that of a conventional pump operation control apparatus is provided for the pump operation control apparatus according to the first embodiment shown in FIG. 1. As shown in FIG. 22, the ECU 13 is provided with a pressure-sensor-failure determining means 28 for transmitting a signal for setting the timer 16 to be a state in which the operation of the timer 16 is permitted if a determination is made in response to a detection signal supplied from the pump-operating pressure sensor 27 that the pump-operating pressure sensor 27 is in an abnormal state. The pump-operating pressure sensor 27 detects reduction in the accumulated hydraulic pressure in the accumulator 7 to a level at which the operation of the pump 8 is required so as to transmit a detection signal to the pressure-sensor-failure determining means 28.

The other structures of the pump operation control apparatus according to the ninth embodiment are the same as those according to the first embodiment.

The pump operation control apparatus according to the ninth embodiment and having the above-mentioned structure has an arrangement that the pressure-sensor-failure determining means 28 does not set the timer 16 to the state in which the timer 16 can be operated if the pump-operating pressure sensor 27 is in a normal state. Thus, the timer 16 is not operated. Therefore, the operation control of the pump 8 is performed in response to the detection signal supplied from the pump-operating pressure sensor 27. The operation control of the pump 8 in response to an ON signal of the brake switch 12 is not performed as is performed in the first embodiment. If the pump-operating pressure sensor 27 is in an abnormal state, the pressure-sensor-failure determining means 28 detects an abnormal state of the sensor 27 in accordance with the detection signal supplied from the pump-operating pressure sensor 27 so that the pressure-sensor-failure determining means 28 brings the timer 16 to the state in which the timer 16 can be operated. As a result, the operation of the pump 8 is started in response to an ON signal of the brake switch 12 similarly to the first embodiment. Since the operation control of the pump 8 is the same as that according to the first embodiment, the operation control is omitted from the description.

The pump operation control apparatus according to the ninth embodiment enables the pump operation control apparatus according to the first embodiment to be employed as a backup unit which is operated when the pump-operating pressure sensor 27 is in an abnormal state. Therefore, even if a failure of the pump-operating pressure sensor 27 occurs, the operation control of the pump 8 can reliably be performed. As a result, a predetermined pressure can furthermore reliably be accumulated in the accumulator 7.

Although the ninth embodiment has the structure that the pump operation control apparatus according to the first embodiment is employed as the backup unit for the pump-operating pressure sensor 27, combination of the pump-operating pressure sensor 27 with the pump operation control apparatus according to any one of the second to eighth embodiments may be employed to employ the combination as a backup unit for the pump-operating pressure sensor 27.

Figure 23:
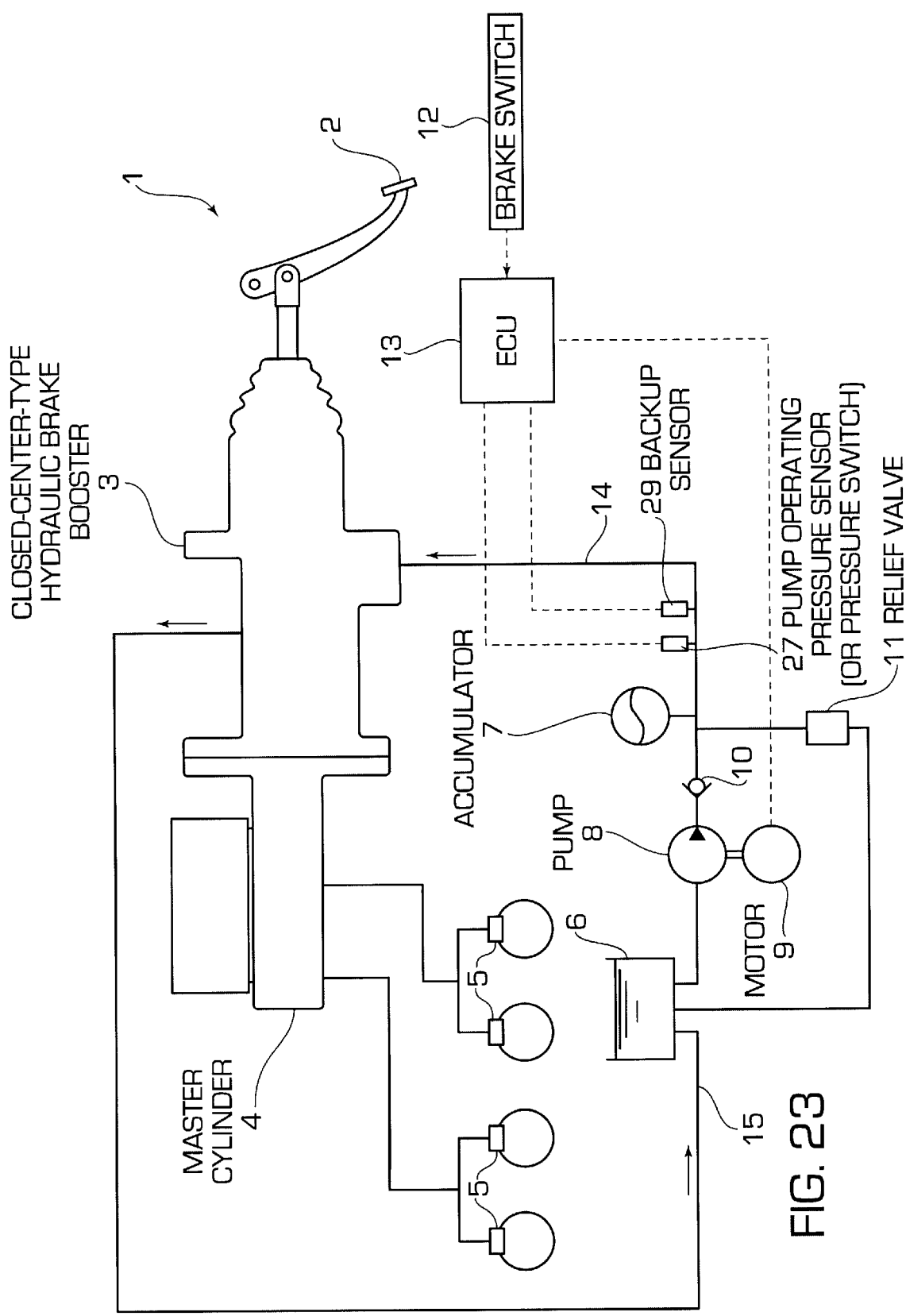
FIG. 23 is a diagram showing a hydraulic brake boosting system according to a tenth embodiment of the present invention similarly to FIG. 1.

FIG. 23 is a diagram showing a tenth embodiment of the present invention.

As shown in FIG. 23, a pump operation control apparatus according to the tenth embodiment is provided with the pump-operating pressure sensor 27 for detecting accumulation in the accumulator 7 for operating and controlling the pump 8 similarly to the conventional pump operation control apparatus. Moreover, the pump operation control apparatus according to the tenth embodiment is provided with a backup sensor 29 for detecting accumulation in the accumulator 7 for operating and controlling the pump 8. The structures of the hydraulic brake boosting system 1 according to the tenth embodiment except for the ECU 13 are the same as those according to the embodiment shown in FIG. 1.

Figure 24:
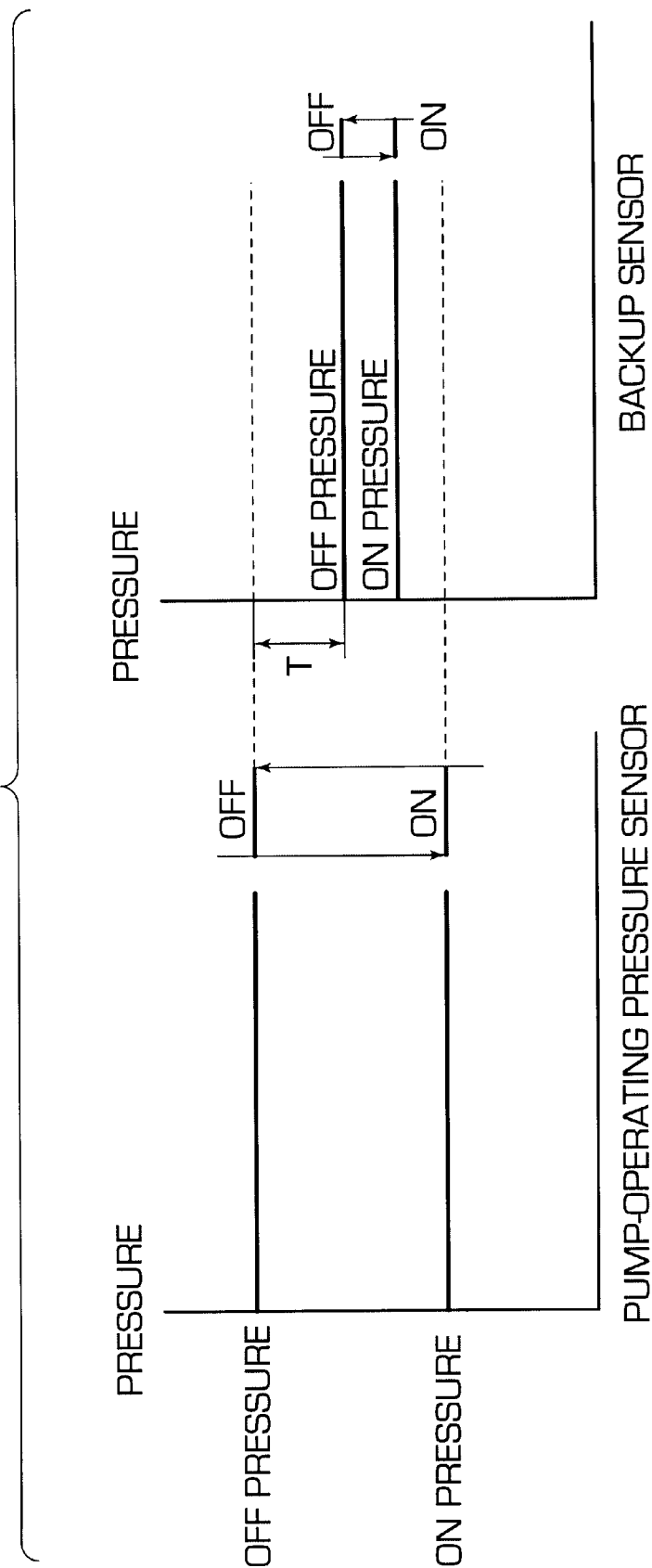
FIG. 24 is a diagram showing the principle of the operation of the tenth embodiment.

As shown in FIG. 24, ON-pressure for the backup sensor 29 (which is the hydraulic pressure accumulated in the accumulator 7 at which the sensor is turned on and thus the pump 8 is operated) is made to be higher than an ON-pressure for the pump-operating pressure sensor 27. Moreover, OFF-pressure of the backup sensor 29 (which is the hydraulic pressure accumulated in the accumulator 7 at which the sensor is turned off and the operation of the pump 8 is interrupted) is made to be lower than OFF-pressure for the pump-operating pressure sensor 27. The backup sensor 29 may be employed as an alarm-issuing sensor for issuing an alarm a fact that the hydraulic pressure accumulated in the accumulator 7 has been reduced.

Figure 25:
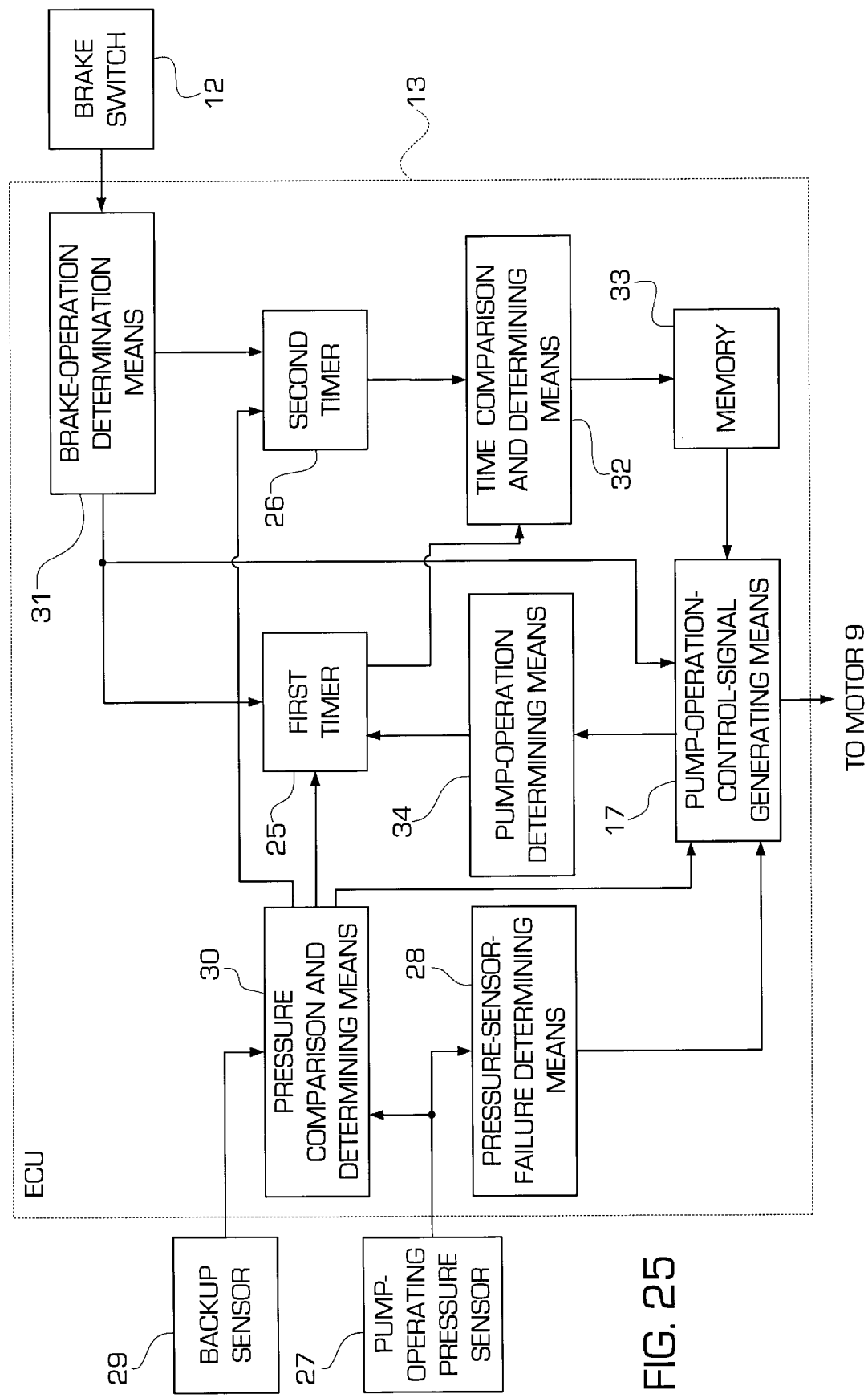
FIG. 25 is a diagram showing a tenth embodiment of the present invention.

As shown in FIG. 25, the ECU 13 includes the first timer 25 for measuring time required from a moment at which the OFF-pressure for the backup sensor 29 is realized to a moment at which the OFF-pressure for the pump-operating pressure sensor 27 is realized; and the second timer 26 for measuring time required from the moment at which the OFF-pressure for the backup sensor is realized in a state where the pump 8 is operated if a failure of the pump-operating pressure sensor 27 occurs. Moreover, the ECU 13 includes the pressure-sensor-failure determining means 28 for determining an abnormal state of the pump-operating pressure sensor 27, the pump-operation-control-signal generating means 17 for transmitting a pump-operation-control signal to the motor 9; and a pressure comparison and determination means 30 for subjecting pressure detected by the pump-operating pressure sensor 27 and that detected by the backup sensor 29 to comparisons with corresponding ON-pressure and OFF-pressure for the sensors 27 and 29. Moreover, the ECU 13 includes a brake-operation determining means 31 for determining whether or not the brake is being operated in response to the output signal from the brake switch 12; a time comparison and determination means 32 for subjecting time measured by the first timer 25 and that member the second timer 26 to a comparison with time T learned and stored in a memory 33 so as to produce an output; and a pump-operation determining means 34 for determining whether or not the pump 8 is being operated.

The pump operation control apparatus according to the tenth embodiment has a structure that time T (shown in FIG. 24) required from a moment at which the backup sensor 29 is turned off to a moment at which the pump-operating pressure sensor 27 is turned off is measured by the first timer 25 in a state in which the pump 8 is being normally operated. The time comparison and determination means 32 subjects the measured time T and time T measured previously to a comparison. If time T measured newly is larger than the previous time T, the time T measured newly is rewritten so as to be stored in the memory 33. The above-mentioned measurement of time is performed whenever time elapses from the moment at which the backup sensor 29 is turned off to the moment at which the pump-operating pressure sensor 27 is turned off. Measured time T is learned and stored in the memory 33. If a braking operation is performed during the operation for learning the time T, learning of the measured time T is interrupted because the time is elongated by a quantity corresponding to the barking operation.

The operation control of the pump 8 is performed in such a manner that when the pump-operating pressure sensor 27 is in a normal state, the operation of the pump 8 is started with the ON-pressure of the pump-operating pressure sensor 27. The operation of the pump 8 is interrupted with the OFF-pressure of the pump-operating pressure sensor 27. When the pump-operating pressure sensor 27 is in an abnormal state, the operation control of the pump 8 is performed by the backup sensor 29. In this case, the operation of the pump 8 is started with the ON-pressure of the backup sensor 29. The pump 8 is operated for time elongated from the moment at which the OFF-pressure for the backup sensor 29 has been realized by time T corresponding to the learning and storing operation. Then, the operation of the pump 8 is interrupted.

If a braking operation is performed during the operation of the pump 8, time for which the pump 8 is operated by the backup sensor 29 is elongated by predetermined time.

Figure 26:
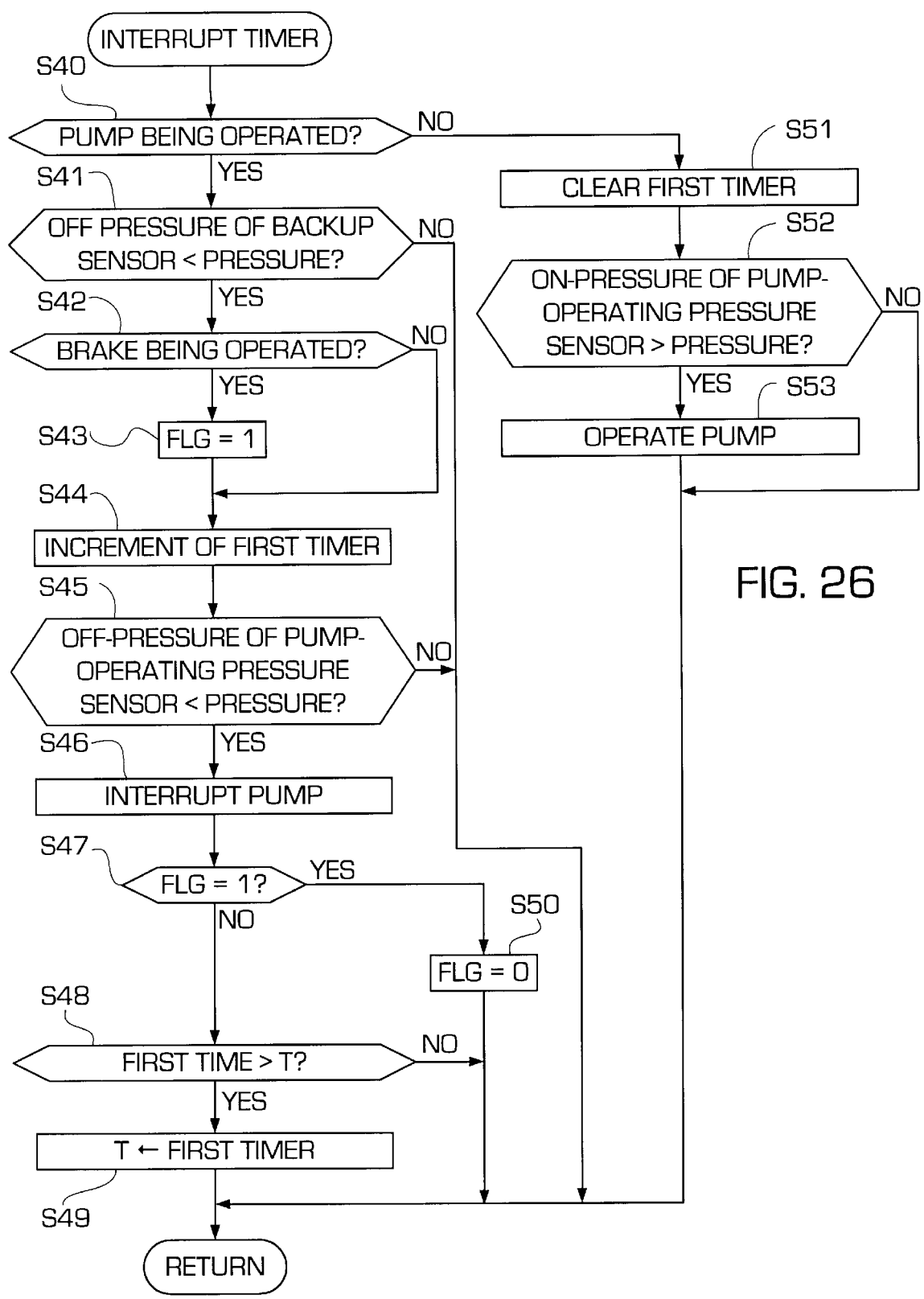
FIG. 26 is a flow chart of an operation for learning and storing time according to the tenth embodiment.

FIG. 26 is a flow chart showing the operation for learning and storing time T.

As shown in FIG. 26, whether or not the pump 8 is being operated is determined in step S40. If a determination is made that the pump 8 is being operated, a determination is made in step S41 whether or not the hydraulic pressure accumulated in the accumulator 7 is higher than the OFF-pressure for the backup sensor 29. If a determination is made that the accumulated hydraulic pressure is higher than the OFF-pressure for the backup sensor 29, whether or not a braking operation is being performed is determined in step S42. If a determination is made that a braking operation is being performed, a flag (FLG) is set to be 1 in step S43. In step S44 the first timer 25 starts measuring time. In step S45 whether or not hydraulic pressure accumulated in the accumulator 7 is higher than the OFF-pressure for the pump-operating pressure sensor 27 is determined. If a determination is made that the accumulated hydraulic pressure is higher than the OFF-pressure for the pump-operating pressure sensor 27, the operation of the pump 8 is interrupted in step S46. Instep S47 whether or not the FLG is 1 is determined. Since the FLG is 1 in this case, the operation proceeds to step S50 so that the FLG is made to be 0. Then, the operation is returned to the process in step S40. As described above, the first timer 25 measures time from the moment at which the OFF-pressure for the backup sensor 29 is realized to the moment at which the OFF-pressure for the pump-operating pressure sensor 27 is realized. If a braking operation is being performed at this time, the first timer 25 furthermore measures time. Therefore, the operation for learning and storing the time T is not performed.

If a determination is made in step S42 that the braking operation is not being performed, the operation proceeds to step S44 so that processes in steps S44 to S47 are performed. Since the braking operation is not being performed and thus the FLG is made to be 0, a determination is made in step S47 that the FLG is not 1. In step S48 whether or not time measured by the first timer 25 is longer than the time T learned and stored in the memory 33 is determined. If a determination is made that the measured time is longer than the time T, time measured by the first timer 25 is rewritten in the memory 33 as new time T in step S49. Then, the operation is returned to step S40. If a determination is made in step S48 that the measured time is not longer than the time T, the operation is returned to step S40 as it is. Thus, the time T from the moment at which the OFF-pressure for the backup sensor 29 has been realized to the moment at which the OFF-pressure for the pump-operating pressure sensor 27 has been realized is learned and stored when the braking operation is not performed.

If a determination is made in step S40 that the pump 8 is not being operated, time measured by the first timer 25 is cleared in step S51. In step S52 a determination is made whether or not the hydraulic pressure accumulated in the accumulator 7 is lower than the ON-pressure for the pump-operating pressure sensor 27. If a determination is made that the accumulated hydraulic pressure is lower than the ON-pressure, the pump 8 is operated in step S53. Then, the operation is returned to step S40. Then, processes in step S40 and following steps are repeated. If a determination is made that the accumulated hydraulic pressure is not lower than the ON-pressure, the operation proceeds to step S40 as it is.

Figure 27:
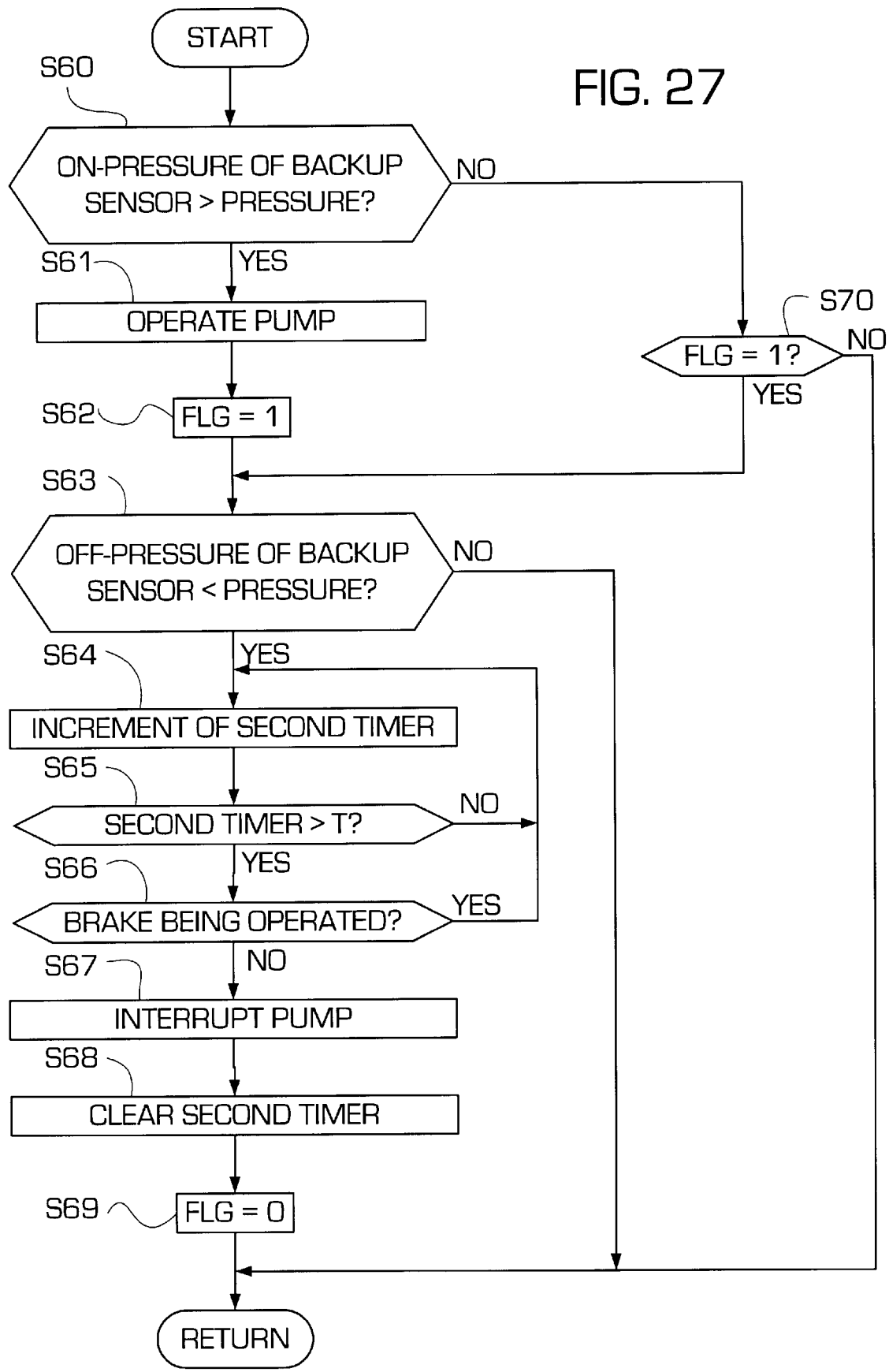
FIG. 27 is a flow chart of a pump operation control according to the tenth embodiment of the present invention.

FIG. 27 is a flow chart showing an operation for elongating time for which the pump 8 is operated by the backup sensor 29 in a case where a failure of the pump-operating pressure sensor 27 has occurred.

If the pressure-sensor-failure determining means 28 determines that a failure of the pump-operating pressure sensor 27 has occurred, whether or not the hydraulic pressure accumulated in the accumulator 7 is lower than the ON-pressure for the backup sensor is determined in step S60. If a determination is made that the accumulated hydraulic pressure is lower than the ON-pressure, the pump 8 is operated in step S61 and the FLG is made to be 1. In step S63 whether or not the accumulated hydraulic pressure is higher than the OFF-pressure for the backup sensor 29 is determined. If a determination is made that the accumulated hydraulic pressure is higher than the OFF-pressure, the second timer 26 starts measuring time in step S64. In step S65 whether or not time measured by the second timer 26 is longer than the time T learned and stored in the memory 33 is determined. If a determination is made that the measured time is longer than the time T, whether or not the braking operation is being performed is determined in step S66. If a determination is made that the braking operation is not being performed, the operation of the pump 8 is interrupted in step S67. Moreover, time measured by the second timer 26 is cleared in step S68. Moreover, the FLG is made to be 0 in step S69. Then, the operation is returned to step S60. Since the operation of the pump 8 is interrupted in step S67, the operation of the pump 8 by the backup sensor 29 is elongated by the learned and stored time T from the moment at which the OFF-pressure for the backup sensor 29 has been realized.

If a determination is made in step S65 that the time measured by the second timer 26 is not longer than the time T, and if a determination is made that the braking operation is being performed in step S66, the operation is shifted to step S64 so that measurement of time which is performed by the second timer 26 is continued. If a braking operation is performed during the operation of the pump 8 by the backup sensor 29 in accordance with the determination that the braking operation is being performed in step S66, the time member the second timer 26 is elongated.

If a determination is made in step S63 that the hydraulic pressure accumulated in the accumulator 7 is not higher than the OFF-pressure for the backup sensor 29, the operation is returned to step S60 as it is. If a determination is made in step S60 that the hydraulic pressure accumulated in the accumulator 7 is not lower than the OFF-pressure for the backup sensor 29, whether or not the FLG is 1 is determined in step S70. If a determination is made that the FLG is not 1, the operation is returned to step S60 as it is. If a determination is made that the FLG is 1, the operation is shifted to step S63.

The pump operation control apparatus according to the tenth embodiment has the structure that the backup sensor 29 operates the pump 8 when a failure of the pump-operating pressure sensor 27 occurs. In this case, even if the hydraulic pressure accumulated in the accumulator 7 is made to be the OFF-pressure for the backup sensor 29, the pump 8 is furthermore operated for the learned and stored time T. Therefore, even if a failure of the pump-operating pressure sensor 27 occurs, accumulation in the accumulator 7 can sufficiently be performed. The other operations and effects of the tenth embodiment are the same as those of the above-mentioned embodiments.

Figure 28:
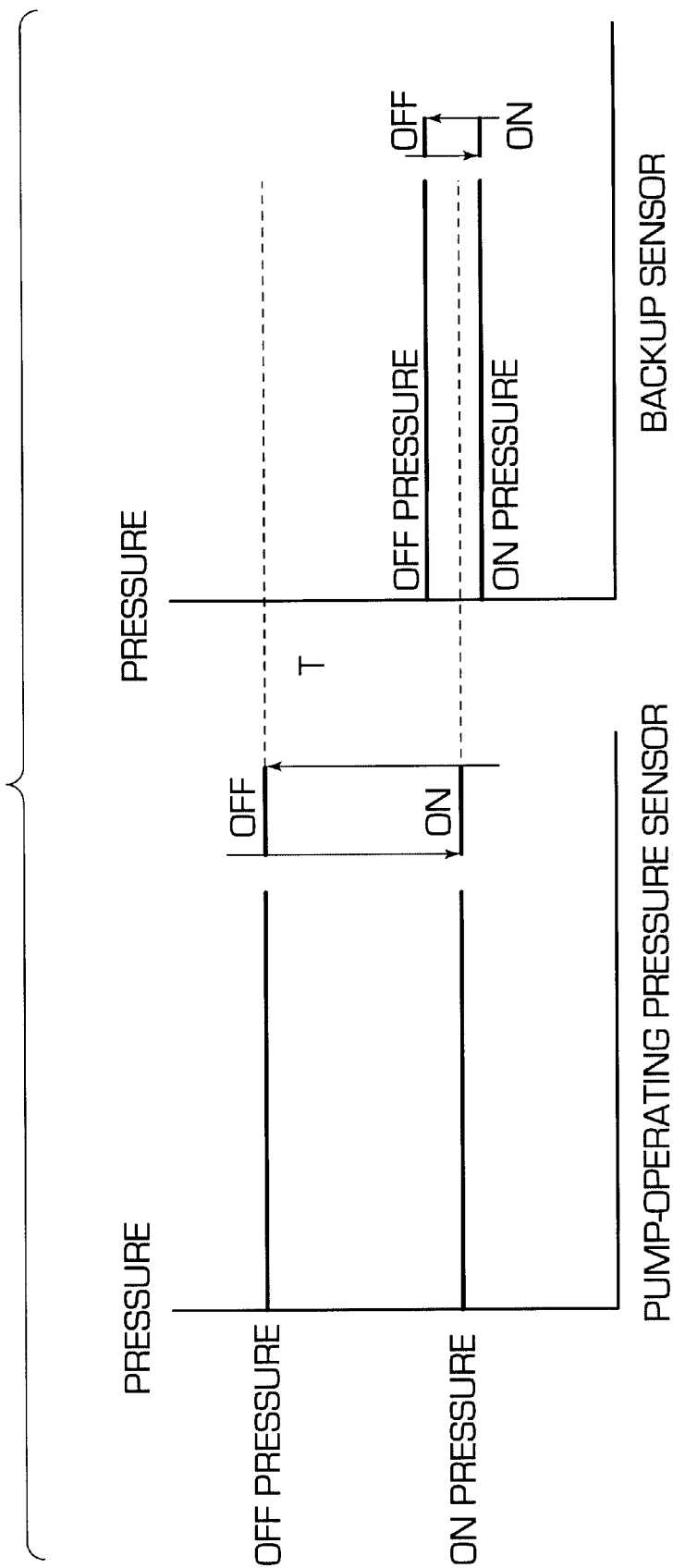
FIG. 28 is a diagram showing a modification of the tenth embodiment similarly to FIG. 24.
Figure 29:
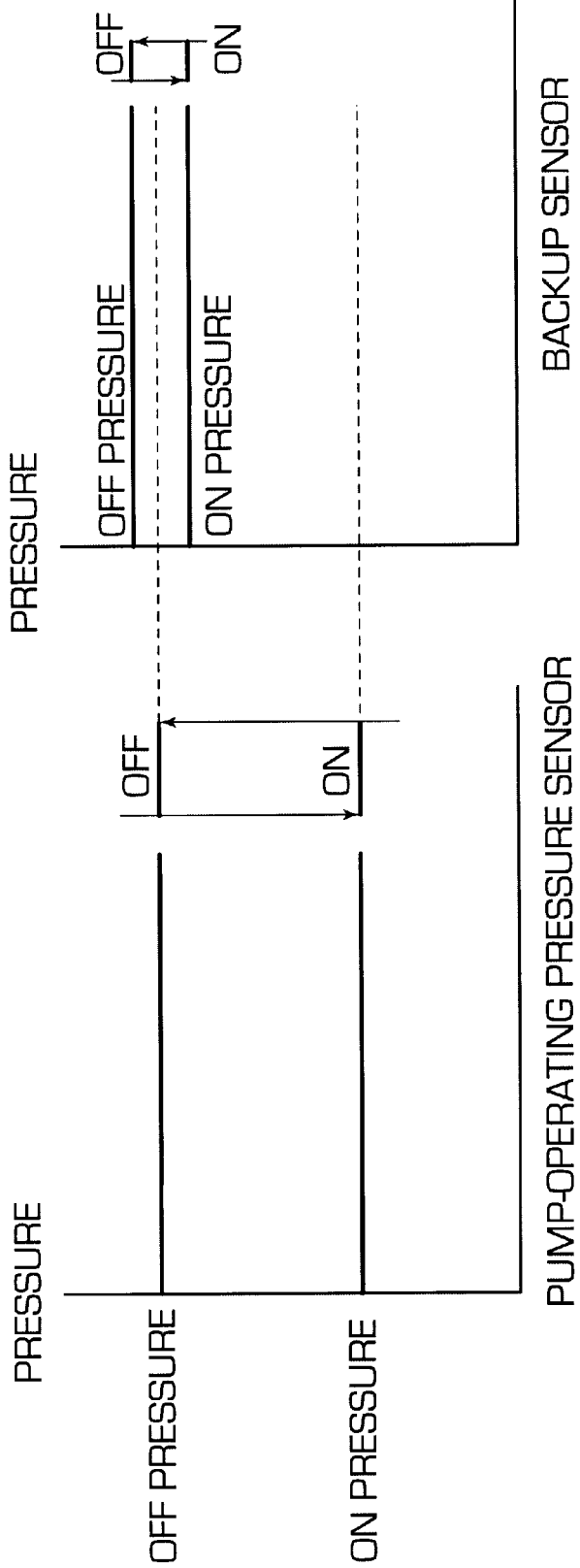
FIG. 29 is a diagram showing another modification of the tenth embodiment similarly to FIG. 24.

In the tenth embodiment, the ON-pressure for the backup sensor 29 is made to be higher than the ON-pressure for the pump-operating pressure sensor 27. Moreover, the OFF-pressure for the backup sensor 29 is made to be lower than the OFF-pressure for the pump-operating pressure sensor 27. As shown in FIG. 28, the ON-pressure for the backup sensor 29 may be lower than the ON-pressure for the pump-operating pressure sensor 27. As shown in FIG. 29, the OFF-pressure for the backup sensor 29 may be higher than the OFF-pressure for the pump-operating pressure sensor 27. When the OFF-pressure for the backup sensor 29 is set as shown in FIG. 29, the operation for learning the time T from the moment at which the OFF-pressure for the backup sensor 29 is realized to the moment at which the OFF-pressure for the pump-operating pressure sensor 27 is realized is not required.

Figure 30:
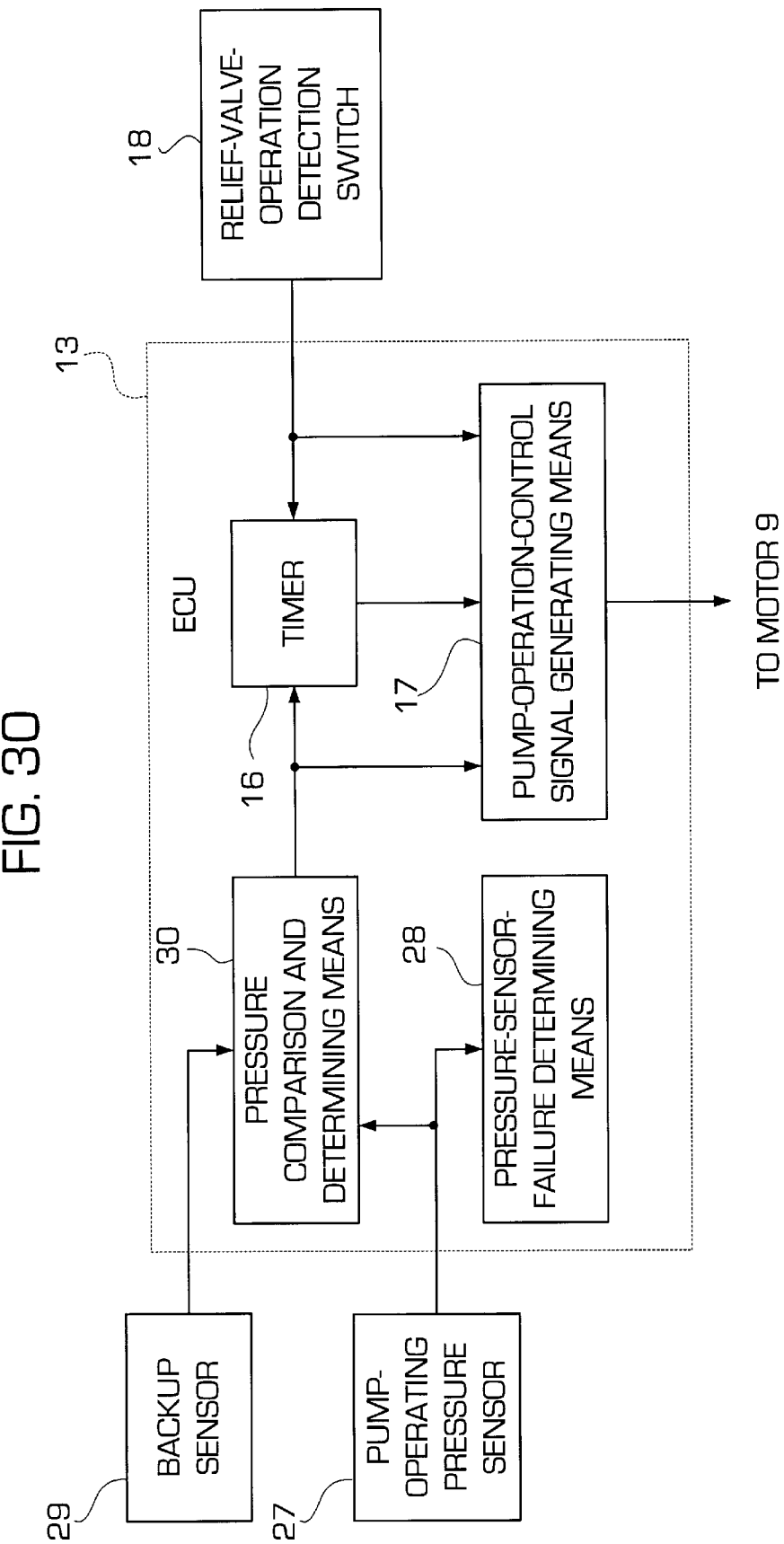
FIG. 30 is a diagram showing an eleventh embodiment of the present invention.

FIG. 30 is a partial diagram showing a pump operation control apparatus according to an eleventh embodiment of the present invention.

The pump operation control apparatus according to the eleventh embodiment has a structure that the pump 8 is operated when the hydraulic pressure accumulated in the accumulator 7 has been made to be lower than the ON-pressure for the backup sensor 29 if a failure of the pump-operating pressure sensor occurs. Moreover, the operation of the pump 8 is interrupted when the operation of the relief valve 11 has been started. That is, the start of the operation of the pump 8 is set similarly to that according to the tenth embodiment. The interruption of the operation of the pump 8 is set similarly to the second and sixth embodiments.

Similar to the second, sixth and tenth embodiments, the eleventh embodiment incorporates the relief-valve-operation detecting switch 18, the pump-operating pressure sensor 27 and the backup sensor 29. Moreover, the ECU 13 is provided with the timer 16, the pump-operation-control-signal generating means 17, the pressure-sensor-failure determining means 28 and the pressure comparison and determination means 30.

Figure 31:
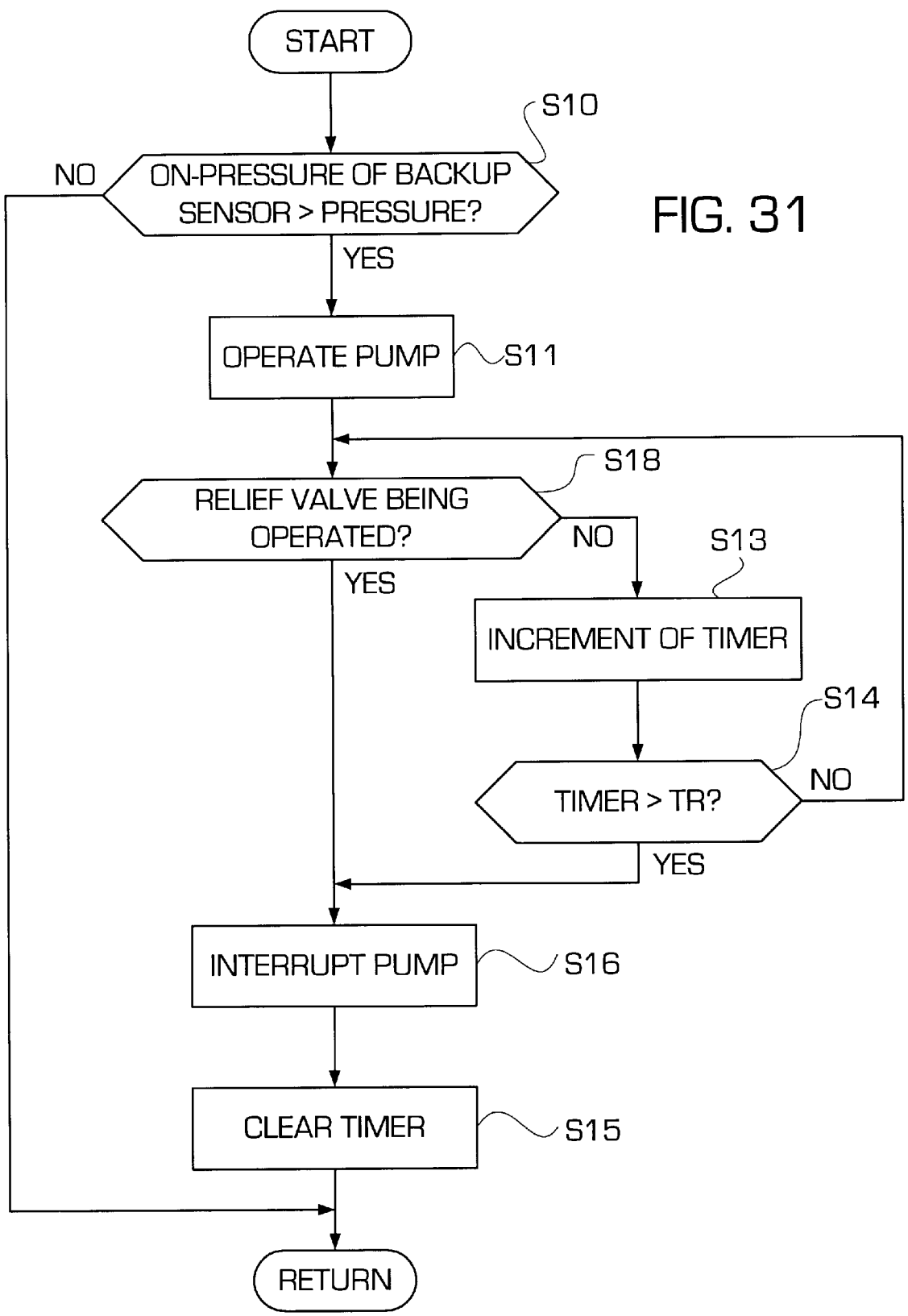
FIG. 31 is a flow chart of a pump operation control according to the eleventh embodiment.

A flow for the operation control of the pump 8 according to the eleventh embodiment has a structure as shown in FIG. 31 that the process in step S10 in the flow according to the second embodiment shown in FIG. 8 for determining whether or not the brake switch 12 has been switched on is omitted. As an alternative to this, step S60 in the flow according to the tenth embodiment shown in FIG. 27 is provided in which whether or not the hydraulic pressure accumulated in the accumulator 7 is lower than the OFF-pressure for the backup sensor 29 is determined. Since the foregoing flow is the same as that according to the second and tenth embodiments, the above-mentioned flow is omitted from description.

Note that the sequential order of steps 15 and 16 in the flows shown in FIGS. 8 and 31 are inverted. Although the steps 15 and 16 are expressed to be performed at different time, they are performed simultaneously (applied to the following twelfth and thirteenth embodiments).

The operations and effects of the eleventh embodiment are the same as those of the second and tenth embodiments.

Figure 32:
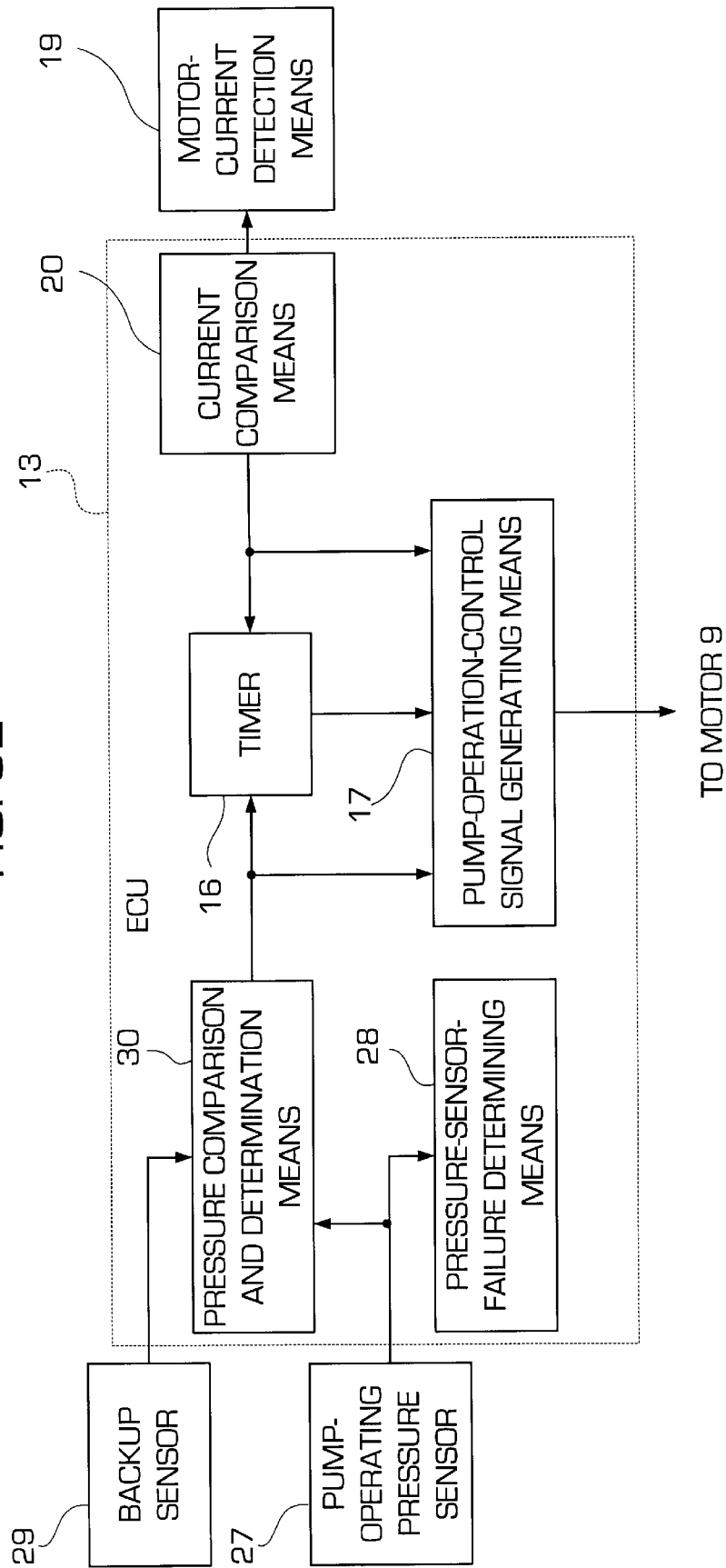
FIG. 32 is a diagram showing a twelfth embodiment of the present invention.

FIG. 32 is a partial diagram showing a pump operation control apparatus according to a twelfth embodiment of the present invention.

The pump operation control apparatus according to the twelfth embodiment has a structure that the pump 8 is operated when the hydraulic pressure accumulated in the accumulator 7 has been made to be lower than the ON-pressure for the backup sensor 29 in a case where a failure of the pump-operating pressure sensor has occurred. Moreover, the operation of the pump 8 is interrupted when an electric current in the motor 9 is larger than a predetermined value. That is, start of the operation of the pump 8 is set similarly to that according to the tenth embodiment. The interruption of the operation of the pump 8 is set similarly to that at the third and seventh embodiments.

Therefore, the twelfth embodiment incorporates the motor-current detecting means 19, the current comparison means 20, the pump-operating pressure sensor 27 and the backup sensor 29, similarly to the third, seventh and tenth embodiments. Moreover, the ECU 13 incorporates the timer 16, the pump-operation-control-signal generating means 17, the pressure-sensor-failure determining means 28 and the pressure comparison and determination means 30.

Figure 33:
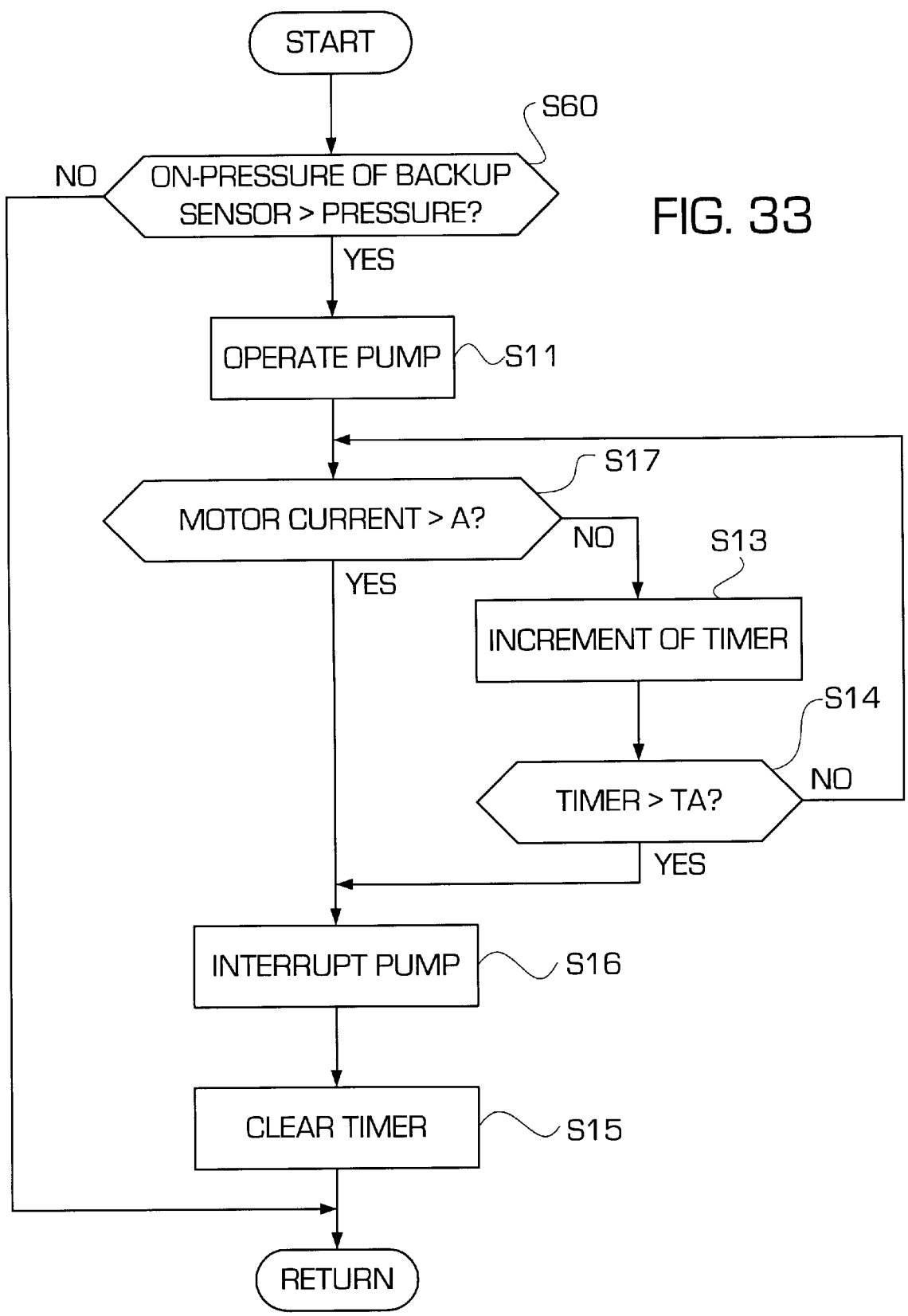
FIG. 33 is a flow chart of a pump operation control according to the twelfth embodiment.

A flow of the operation control of the pump 8 according to the twelfth embodiment has a structure as shown in FIG. 33 that the process in step S10 according to the third embodiment shown in FIG. 10 in which whether or not the brake switch 12 has been switched on is determined is omitted. As an alternative to this, step S60 in the flow according to the tenth embodiment shown in FIG. 27 is provided in which whether or not the hydraulic pressure accumulated in the accumulator 7 is lower than the OFF-pressure for the backup sensor 29 is determined. Since the foregoing flow is the same as that according to the third and tenth embodiments, the above-mentioned flow is omitted from description.

The operations and effects of the twelfth embodiment are the same as those of the third and tenth embodiments.

Figure 34:
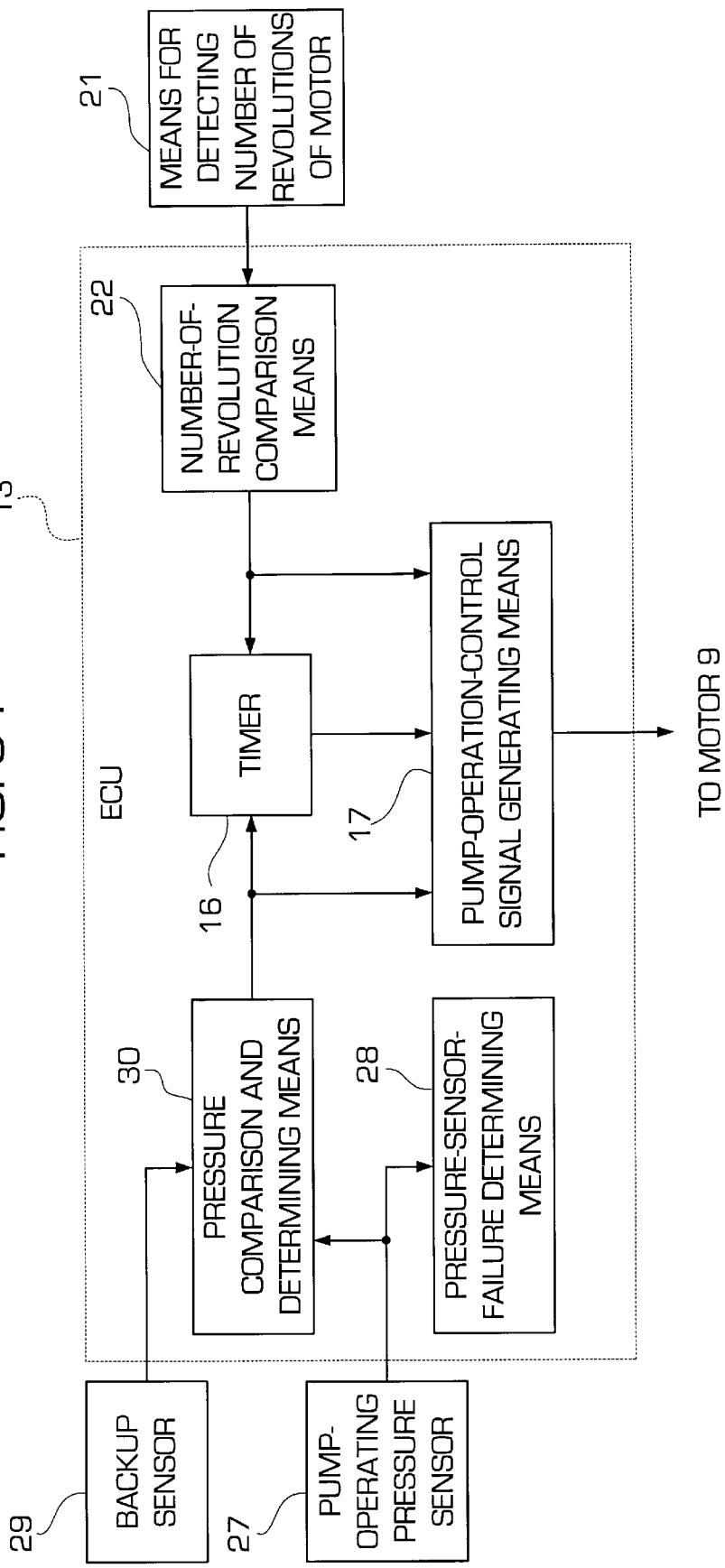
FIG. 34 is a diagram showing a thirteenth embodiment of the present invention.

FIG. 34 is a partial diagram of a pump operation control apparatus according to a thirteenth embodiment of the present invention.

The pump operation control apparatus according to the thirteenth embodiment has a structure that the pump 8 is operated when the hydraulic pressure accumulated in the accumulator 7 has been made to be lower than the ON-pressure for the backup sensor 29 in a case of a failure of the pump-operating pressure sensor. The operation of the pump 8 is interrupted when the number of revolutions of the motor 9 is made to be lager than a predetermined number of revolutions. That is, start of the operation of the pump 8 is set similarly to the tenth embodiment, while interruption of the pump 8 is set similarly to the fourth and eighth embodiments.

Therefore, as shown in FIG. 34, the thirteenth embodiment incorporates the motor-revolution-number detecting means 21, the pump-operating pressure sensor 27 and the backup sensor 29 similarly to the fourth, eighth and tenth embodiments. Moreover, the ECU 13 incorporates the timer 16, the pump-operation-control-signal generating means 17, the revolution-number comparison means 22, the pressure-sensor-failure determining means 28 and the pressure comparison and determination means 30.

Figure 35:
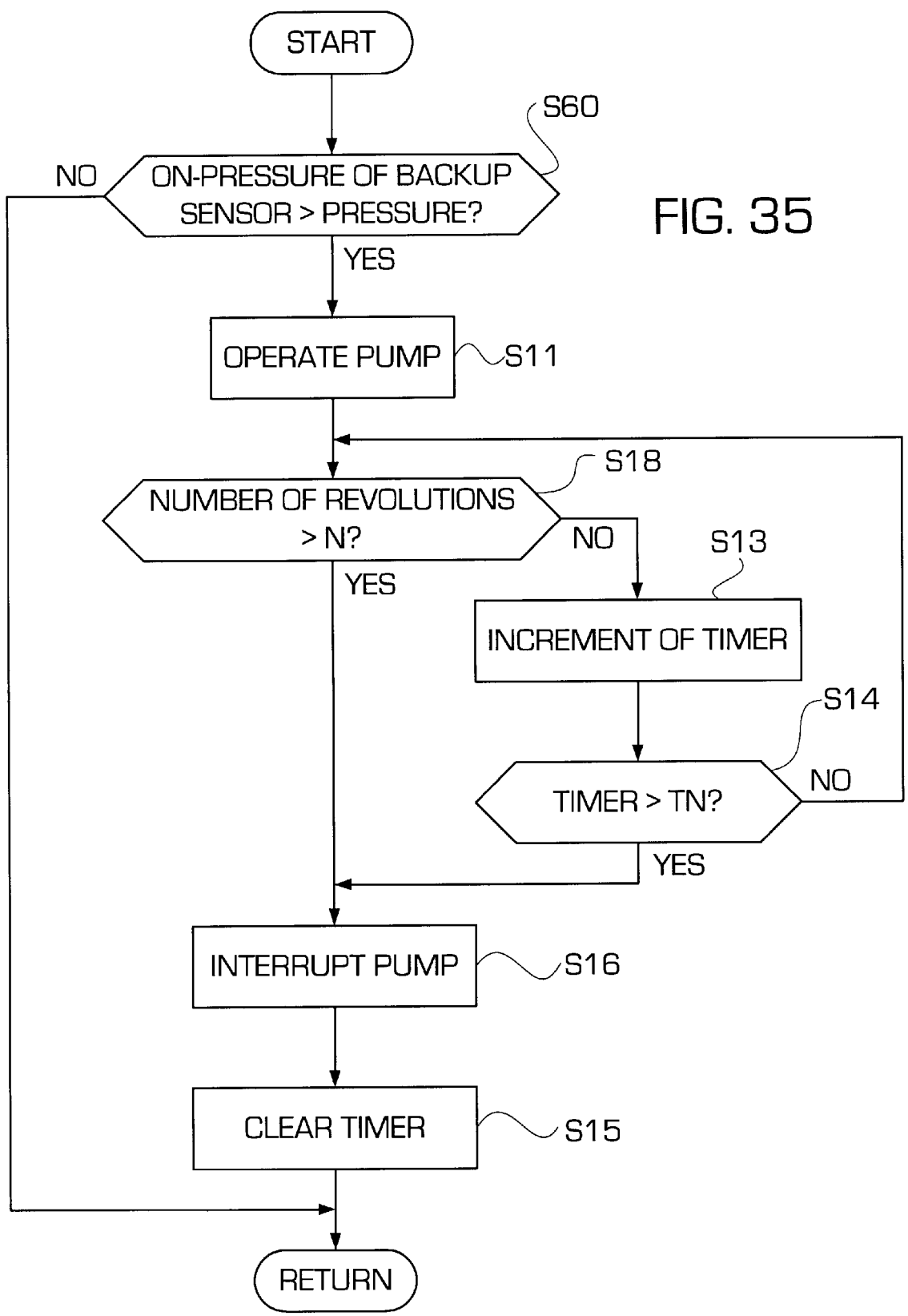
FIG. 35 is a flow chart of a pump operation control according to the thirteenth embodiment.

A flow of the operation control of the pump 8 according to the thirteenth embodiment has a structure as shown in FIG. 35 that the process in step S10 according to the fourth embodiment shown in FIG. 12 in which whether or not the brake switch 12 has been switched off is determined is omitted. As an alternative to this, step S60 in the flow according to the tenth embodiment shown in FIG. 27 is provided in which whether or not the hydraulic pressure accumulated in the accumulator 7 is lower than the OFF-pressure for the backup sensor 29 is determined. Since the foregoing flow is the same as that according to the fourth and tenth embodiments, the above-mentioned flow is omitted from description.

The operations and effects of the thirteenth embodiment are the same as those of the fourth and tenth embodiments.

Figure 36:
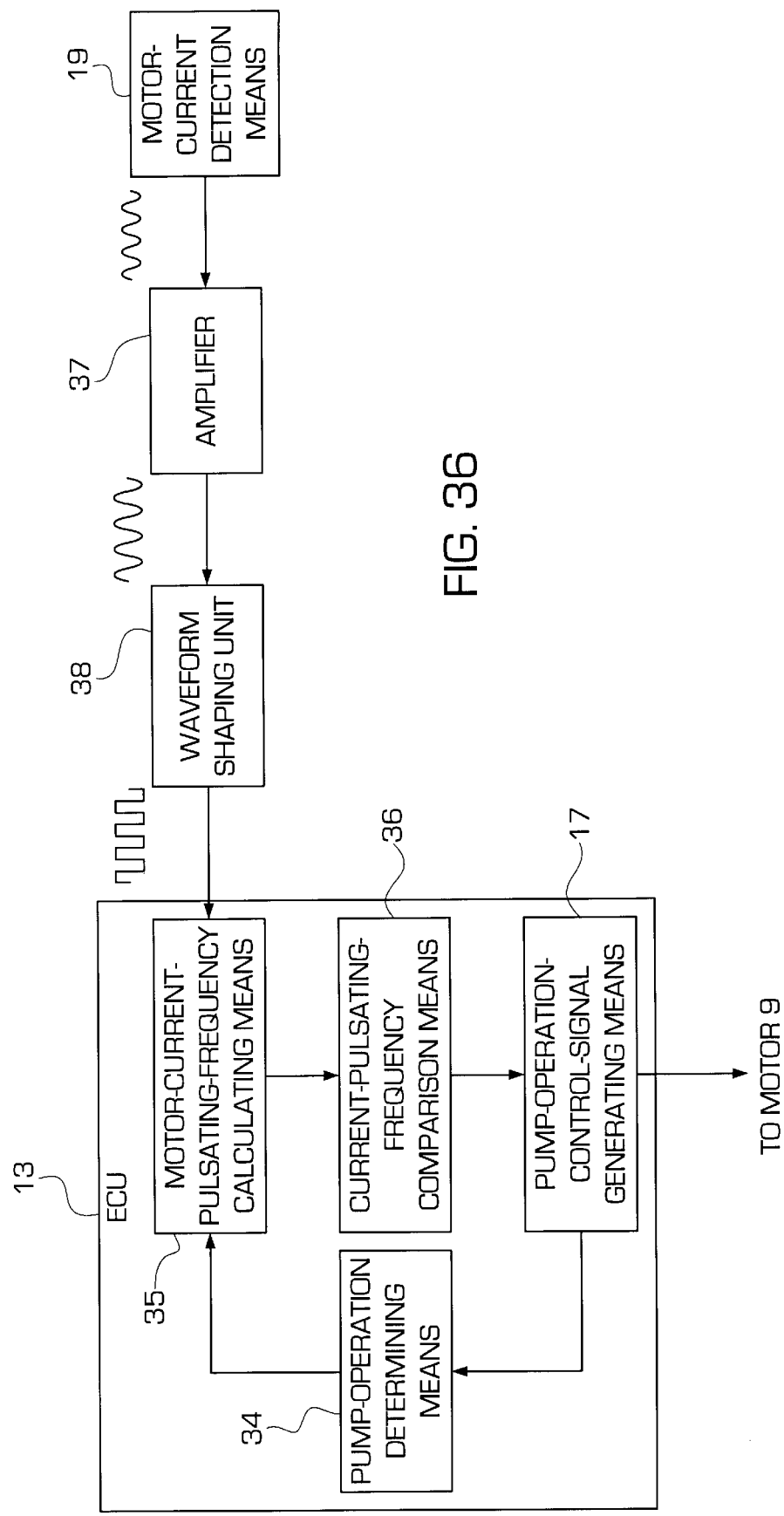
FIG. 36 is a diagram showing a fourteenth embodiment of the present invention.

FIG. 36 is a block circuit diagram showing a pump operation control apparatus according to a fourteenth embodiment of the present invention.

The pump operation control apparatus according to the fourteenth embodiment generally encounters pulsation of an electric current in the motor 9 when the pump operation is performed. If the pulsating frequency is lower than a predetermined level, the operation of the pump 9 is interrupted. Therefore, the above-mentioned ammeter 19 for the motor 9 is provided as shown in FIG. 36. Moreover, the ECU 13 is provided with the pump-operation-control-signal generating means 17 and the pump-operation determining means 34. In addition, the ECU 13 incorporates a means 35 for calculating a pulsating frequency of en electric current in the motor 9 such that the pulsating frequency is calculated in response to a motor-current-detection signal supplied from the motor-current detecting means 19; and a current-pulsating-frequency comparison means 36 for subjecting the calculated pulsating frequency and predetermined reference value α to a comparison to produce an output to the pump-operation-control-signal generating means 17 if the pulsating frequency is smaller than the predetermine reference value α. Note that a detection signal of the electric current in the motor supplied from the motor-current detecting means 19 is amplified by an amplifier 37, and shaped into a rectangular wave by a wave shaping unit 38 so as to be supplied to the means 35 for calculating the pulsating frequency of en electric current in the motor 9.

The reason why the operation of the pump 8 is interrupted with the pulsation generated when the pump is operated will now be described. Since the pulsating frequency relates to the number of revolutions of the motor, that is, the pulsating frequency is raised in proportion to the number of revolutions of the motor, the control to interrupt the operation of the pump 8 can be performed similarly to the pump operation control apparatus according to the fourth and eighth embodiments in which the operation of the pump 8 is interrupted when the number of revolutions of the motor is made to be smaller than the predetermined number of revolutions N.

Figure 37:
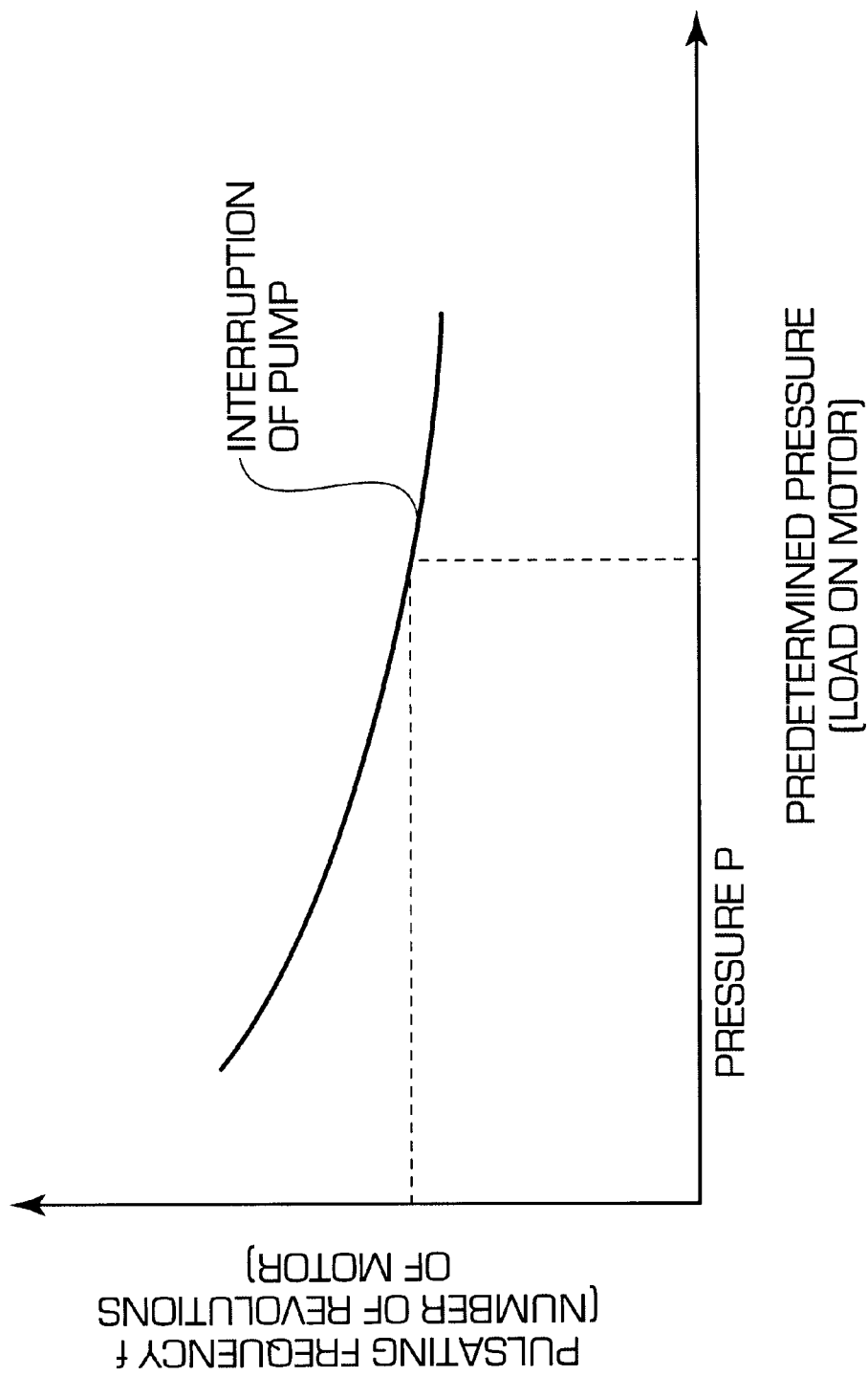
FIG. 37 is a diagram showing the principle of the operation of the fourteenth embodiment.

As shown in FIG. 37, the reference value α which is subjected to a comparison with the pulsating frequency is set to be a pulsating frequency which is realized when hydraulic pressure accumulated in the accumulator 7 is a necessary and sufficient level for performing a braking operation.

Figure 38:
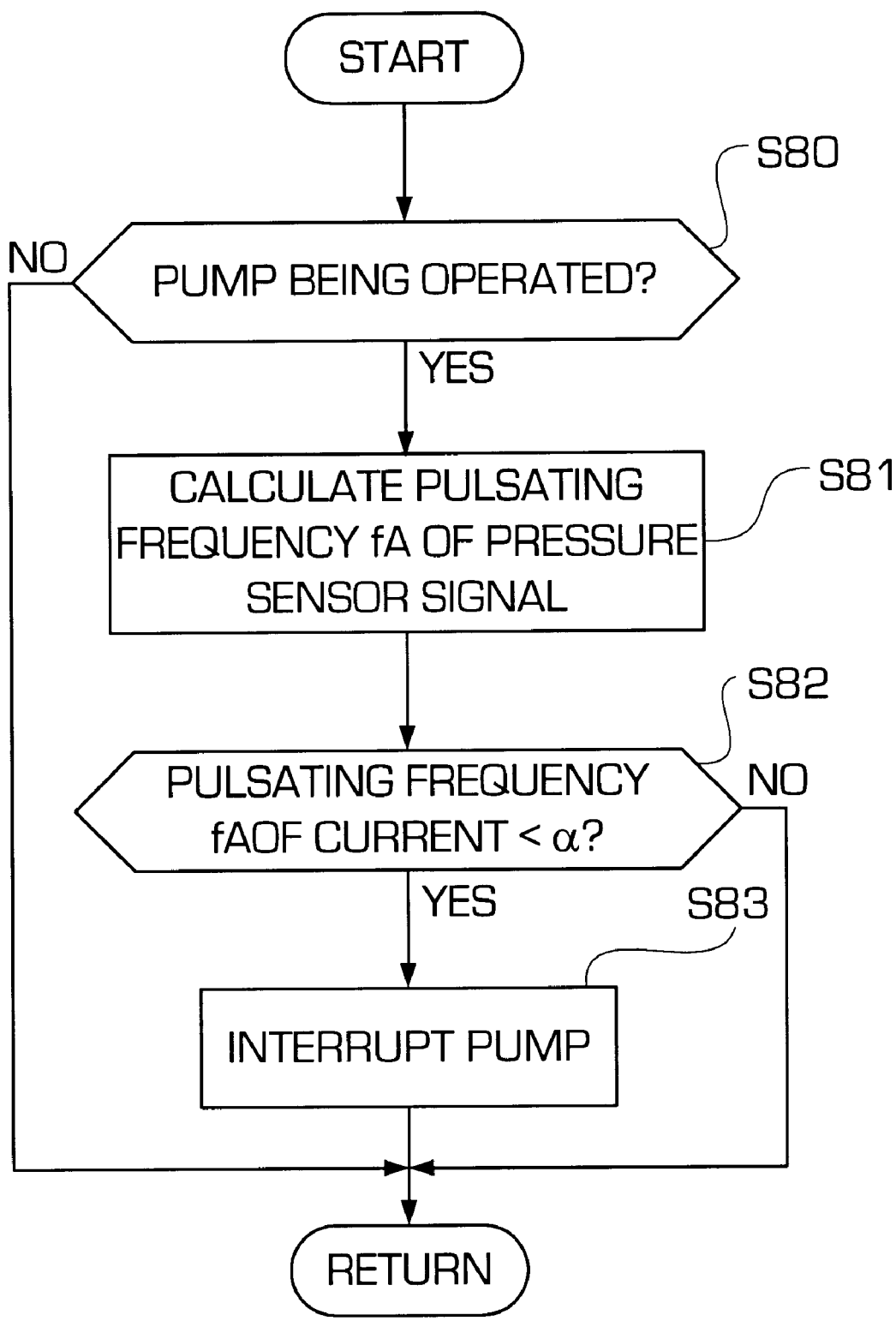
FIG. 38 is a flow chart showing a pump operation control according to the fourteenth embodiment.

FIG. 38 is a flow chart of the control for interrupting the operation of the pump according to the fourteenth embodiment. Referring to FIG. 38, whether or not the pump 8 is being operated is determined in step S80. If a determination is made that the pump 8 is being operated, pulsating frequency $f_A$ of an electric current in the motor is calculated in step S81. In step S82 whether or not the pulsating frequency $f_A$ of an electric current in the motor is smaller than the reference value α is determined. If a determination is made that the pulsating frequency $f_A$ of an electric current in the motor is smaller than the reference value α, a determination is made that a predetermined hydraulic pressure has been accumulated in the accumulator 7. Thus, the operation of the pump 8 is interrupted in step S83.

If a determination is made in step S82 that the pulsating frequency $f_A$ of the electric current in the motor is not smaller than the reference value α and if a determination is made in step S80 that the pump 8 is not being operated, the operation is returned to the start as it is. Then, the processes in step S80 and following steps are repeated.

As described above, the pump operation control apparatus according to the fourteenth ebb enables the accumulation in the accumulator 7 to reliably be performed with the pulsating frequency in the electric current in the motor 9 which is generated when the pump is operated. Thus, insufficient hydraulic pressure level in the accumulator 7 and excessive accumulation level in the same can be prevented.

In the fourteenth embodiment, start of the operation of the pump 8 may be performed in response to the ON signal from the brake switch 12 or the ignition switch 23. Any pump operating method may be employed if the method is able to start operating the pump.

Combination with the pump-operating pressure sensor 27 may be employed. When the pump-operating pressure sensor 27 is in a normal state, the control to interrupt the operation of the pump 8 is performed by the pump-operating pressure sensor 27 similarly to the above-mentioned embodiment. When the pump-operating pressure sensor 27 is in an abnormal state or a failure of the same occurs because the change in the characteristic of the pump-operating pressure sensor 27 caused from deterioration, the operation of the pump 8 is interrupted with the pulsating frequency of the electric current in the motor. Thus, the pump operation control apparatus according to the fourteenth embodiment may be also used as a backup unit when a failure of the pump-operating pressure sensor 27 occurs.

The other structures are the same as those of the hydraulic brake boosting system 1 shown in FIG. 1.

Figure 39:
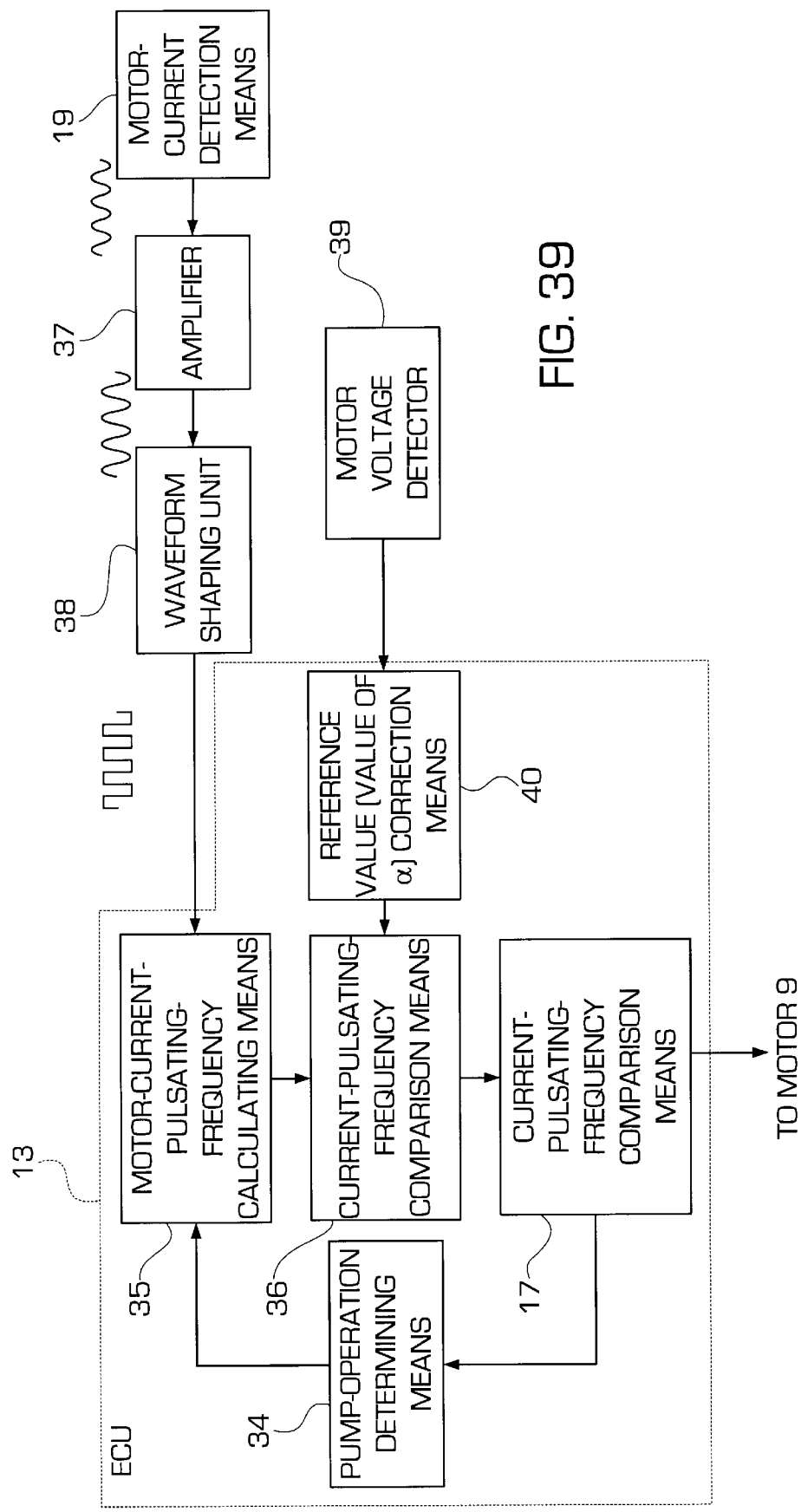
FIG. 39 is a diagram showing a fifteenth embodiment of the present invention.

FIG. 39 is a block diagram showing a pump operation control apparatus according to a fifteenth embodiment of the present invention similarly to FIG. 36.

The pump operation control apparatus according to the fourteenth embodiment has the structure that the reference value a which is subjected to a comparison with the pulsating frequency of the electric current in the motor is a constant value. When the pulsating frequency of the electric current in the motor is changed by dint of the voltage of the motor 9, that is, when the voltage of the motor 9 is raised, also the pulsating frequency of the electric current in the motor is enlarged. Therefore, if the voltage of the motor 9 is changed, relatively rough control is sometimes performed. Therefore, the pump operation control apparatus according to the fifteenth embodiment has a structure that the reference value α is changed in accordance with the voltage of the motor 9. Thus, the control to interrupt the operation of the pump 8 is corrected.

In addition to the structure of the pump operation control apparatus according to the fourteenth embodiment, the pump operation control apparatus according to the fifteenth embodiment, as shown in FIG. 39, incorporate a motor-voltage detecting means 39 for detecting the voltage of the motor 9; and a reference-value (α) correction means 40 for changing the reference value α in accordance with the voltage of the motor. The other structures of the fifteenth embodiment are the same as those of the fourteenth embodiment.

Figure 40:
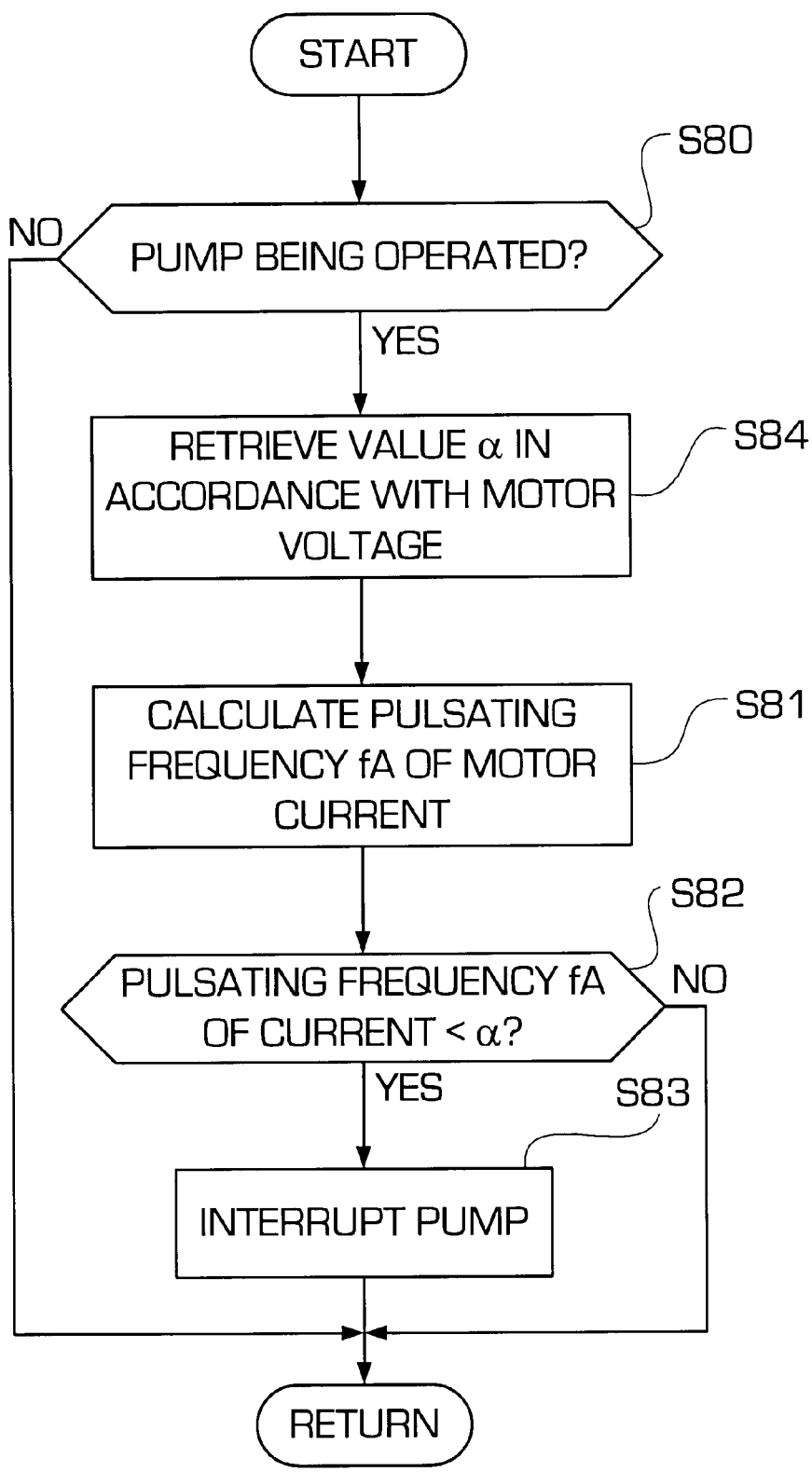
FIG. 40 is a flow chart of a pump operation control according to the fifteenth embodiment.

As shown in FIG. 40, a flow for controlling the operation of the pump according to the fifteenth embodiment has a structure that step 84 in which a process for retrieving the reference value α in accordance with the voltage of the motor is performed is interposed between the process in step S80 and that in step S81 in the flow according to the fourteenth embodiment. The other structures are the same as those in the flow according to the fourteenth embodiment. The process in step S84 may be interposed between steps S81 and S82.

The pump operation control apparatus according to the fifteenth embodiment has the structure that the reference value α is changed in accordance with the voltage of the motor 9. Therefore, further adequate control to interrupt the operation of the pump can be performed.

The other operations and effects of the fifteenth embodiment are the same as those of the fourteenth embodiment.

Figure 41:
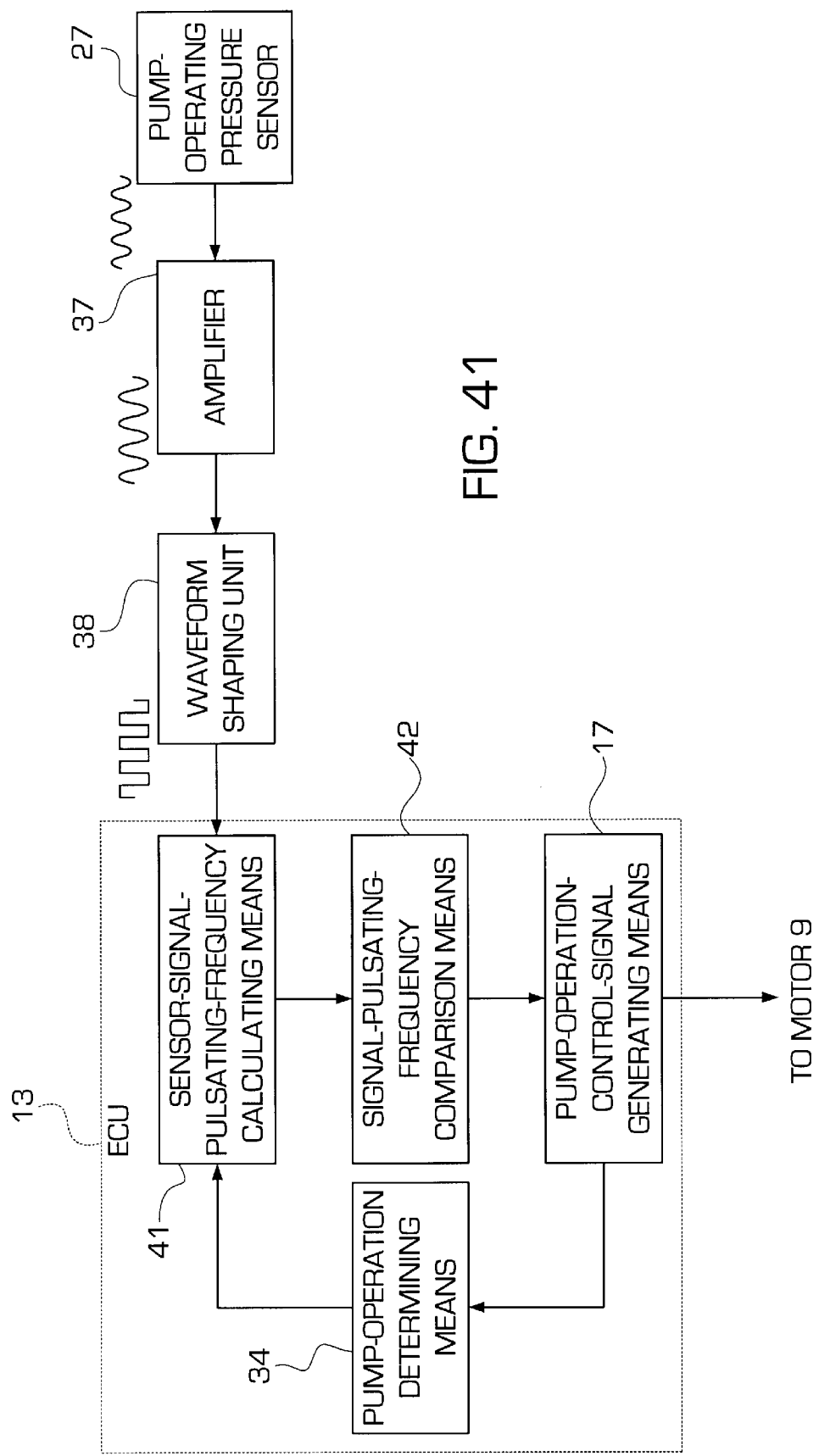
FIG. 41 is a diagram showing a sixteenth embodiment of the present invention.

FIG. 41 is a block circuit diagram of a pump operation control apparatus according to a sixteenth embodiment of the present invention similarly to FIG. 36.

The pulsation which is generated when the pump is operated is also generated in the pressure discharged from the pump (that is, the hydraulic pressure accumulated in the accumulator 7). Therefore, the pump operation control apparatus according to the sixteenth embodiment has a structure tat a pulsating frequency of the hydraulic pressure accumulated in the accumulator 7 is employed in place of the pulsating frequency of the electric current in the motor according to the fourteenth embodiment to control interruption of the operation of the pump 8. As an alternative to the motor-current detecting means 19, the means 35 for calculating pulsating frequency of en electric current in the motor 9 and the current-pulsating-frequency comparison means 36, the sixteenth embodiment incorporate the pump-operating pressure sensor 27, a sensor-signal-pulsating-frequency calculating means 41 and a signal-pulsating-frequency comparison means 42. As a reference value which is subjected to a comparison with the sensor-signal-pulsating-frequency, reference value β is employed.

The other structures of the pump operation control apparatus according to the sixteenth embodiment are the same as those according to the fourteenth embodiment.

Figure 42:
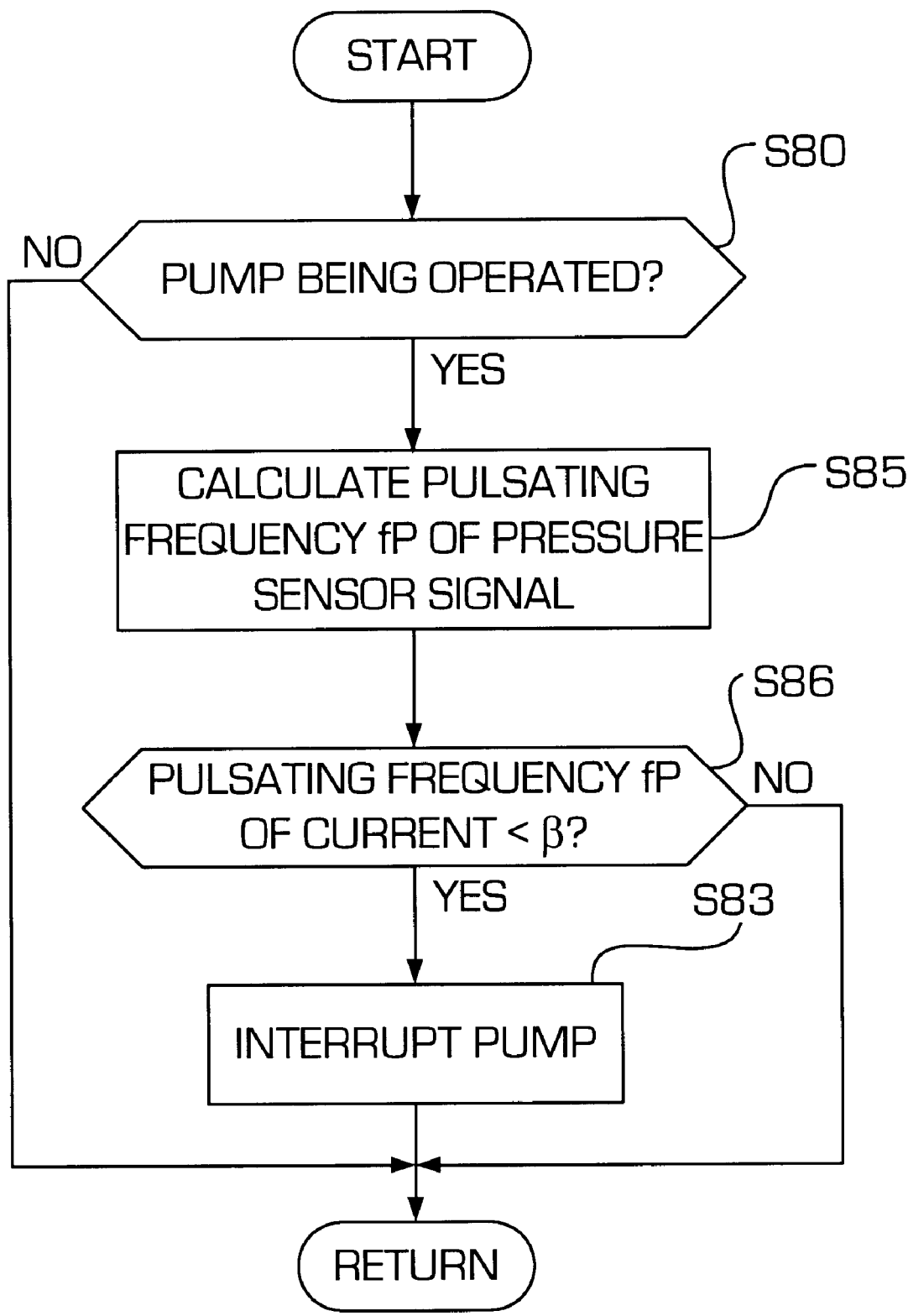
FIG. 42 is a flow chart of a pump operation control according to the sixteenth embodiment.

As shown in FIG. 42, a flow for controlling interruption of the operation of the pump according to the sixteenth embodiment has a structure obtained by changing the flow according to the fourteenth embodiment shown in FIG. 38 such that the electric current in the motor and $f_A$ in step 81 are replaced by a pressure-sensor signal and $f_P$ in step 85. Moreover, the electric current, $f_A$ and α in step 82 are replaced by a signal, $f_P$ and β in step 86. The other structures are the same as those in the flow according to the fourteenth embodiment. Also the operations and effects of the sixteenth embodiment are the same as those of the fourteenth embodiment.

Figure 43:
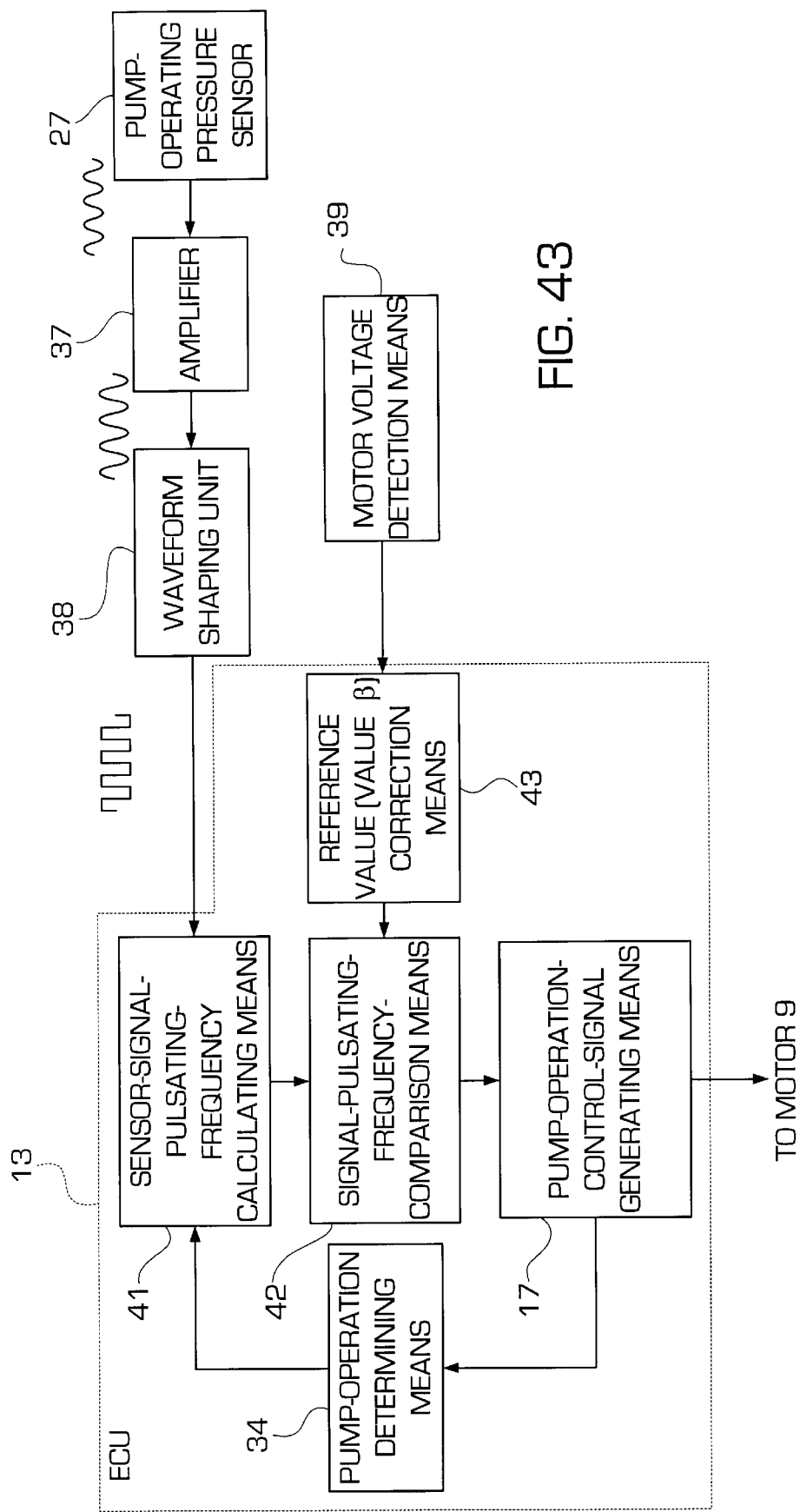
FIG. 43 is a diagram showing a seventeenth embodiment of the present invention.

FIG. 43 is a block circuit diagram showing a pump operation control apparatus according to a seventeenth embodiment of the present invention similarly to FIG. 39.

Similarly to the fifteenth embodiment, the pump operation control apparatus according to the seventeenth embodiment has a structure that the reference value β according to the sixteenth embodiment is changed in accordance with the voltage of the motor 9. Therefore, the motor-voltage detecting means 39 and a reference-value (β) correction means 40 for storing reference value β previously set in accordance with the voltage of the motor and changing the reference value β in accordance with the voltage of the motor are provided for the pump operation control apparatus according to the sixteenth embodiment.

The other structures of the seventeenth embodiment are the same as those of the fifteenth embodiment.

Figure 44:
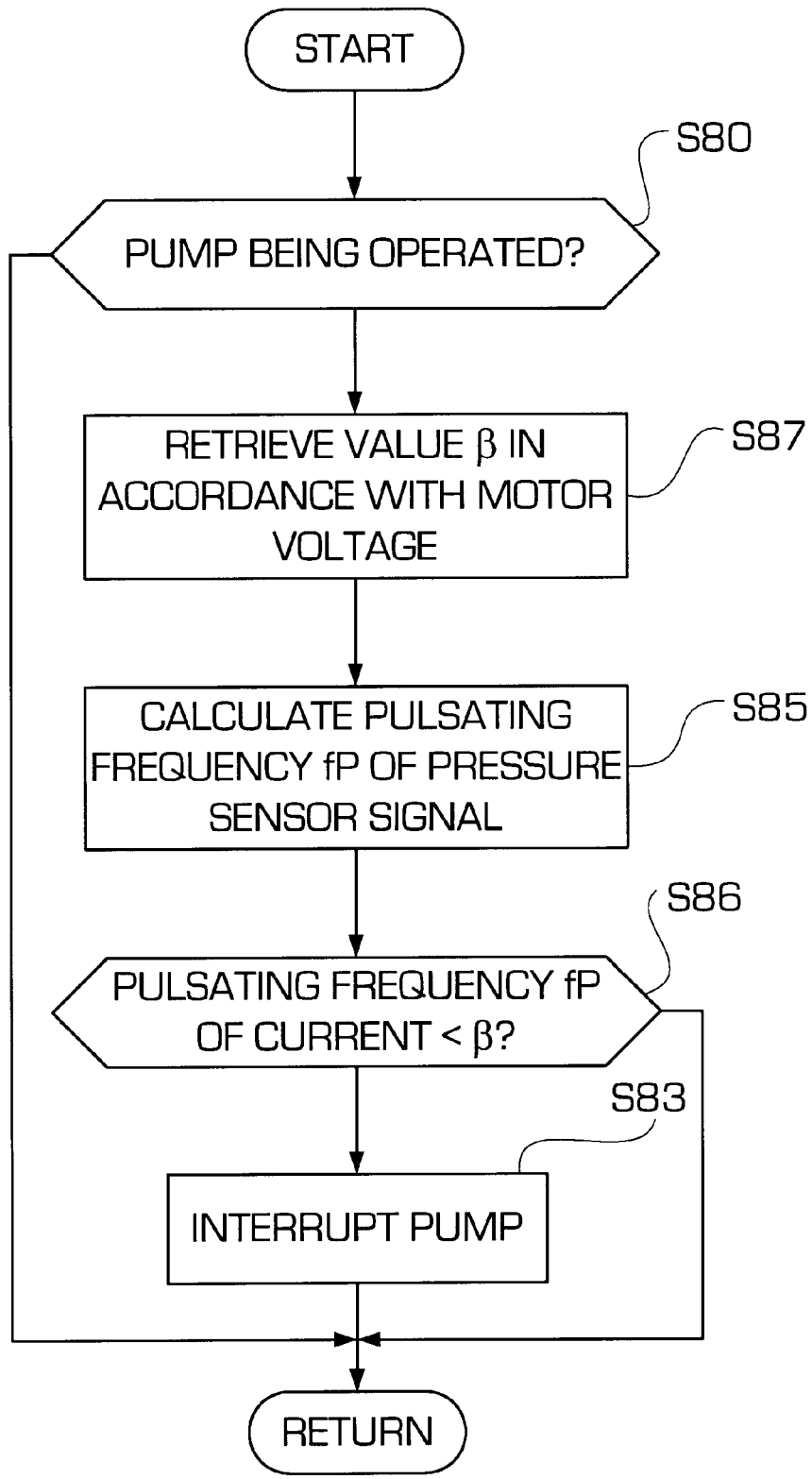
FIG. 44 is a flow chart of a pump operation control according to the seventeenth embodiment.

As shown in FIG. 44, a flow according to the seventeenth embodiment and arranged to control the operation of the pump has a structure that step 87 in which the reference value β is retrieved in accordance with the voltage of the motor is interposed between the process in step S80 and the process in step 86 in the flow according to the sixteenth embodiment. The other structures are the same as those in the flow according to the sixteenth embodiment. The process in step 87 may be interposed between step S85 and step 86.

The operations and effects of the seventeenth embodiment are the same as those of the fifteenth embodiment.

As described above, the pump operation control apparatus according to the present invention does not require a pump-operating pressure sensor to always reliably accumulate hydraulic pressure in the accumulator. Therefore, braking can furthermore reliably be performed.

Since the pump-operating pressure sensor is not required, insufficient accumulation and excessive accumulation in the accumulator which are caused from change in the characteristic because of deterioration in the sensor can be prevented. Therefore, deterioration in the durability of the pump, the motor, the accumulator and the like can be prevented. Even if the vehicle is allowed to stand for long time, insufficiently low level of the hydraulic pressure accumulated in the accumulator can reliably be prevented.

Since elements of the conventional apparatus can be used, the pump operation control apparatus can be manufactured with a low cost and the structure of the apparatus can be simplified.

Even if the pump-operating pressure sensor is employed as is employed in the conventional apparatus, the pump operation control apparatus according to the present invention is able to serve as a backup unit which is operated when a failure of the pump-operating pressure sensor occurs. Therefore, accumulation in the accumulator can furthermore reliably be performed.

What is claimed is:

1. A pump operation control apparatus for a hydraulic brake boosting system wherein hydraulic pressure in an accumulator accumulated by a pump is allowed to boost the operation of a brake operating member to generate braking force, said apparatus comprising:

a timer for measuring time elapsed from operation of a brake in accordance with an operation signal generated by a brake operating member to transmit an output signal when measured time has reached predetermined time; and a pump-operation-signal generating means for transmitting an operation signal of the pump in response to the operation signal generated by the brake operating member and transmitting an interruption signal of the pump in response to the output signal from said timer;

wherein the operation of the pump is controlled such that the operation of the pump is started in response to the operation signal generated by the brake operating member and that the operation of the pump is interrupted after the predetermined time has elapsed from the operation of the brake operating member.

2. A pump operation control apparatus according to claim 1, wherein when input of the operation signal generated by said brake operating member has been continued in a case where the predetermined time has elapsed from the operation of the brake operating member, said pump-operation-signal generating means transmits the operation signal of the pump regardless of the predetermined time until input of the operation signal generated by the brake operating member is interrupted, and transmits a signal for interrupting the operation of the pump when input of the operation signal generated by the brake operating member has been interrupted.

3. A pump operation control apparatus according to claim 1, wherein said timer is arranged such that when the operation signal generated by said brake operating member has been again supplied before the predetermined time has elapsed after the operation of the brake operating member, said timer temporarily clears the measured time, and again measures time from a point of time when the operation signal has been supplied.

4. A pump operation control apparatus according to claim 1, wherein the predetermined time is set in such a manner as to be changed in accordance with the deceleration of a vehicle which is obtained when antiskid control is performed.

5. A pump operation control apparatus according to claim 1, further comprising a relief valve for relieving hydraulic pressure accumulated in said accumulator when hydraulic pressure has been accumulated in said accumulator to a level not lower than relief pressure, wherein the predetermined time is determined in such a manner as to be sufficiently long for said relief valve to be operated.

6. A pump operation control apparatus for a hydraulic brake boosting system wherein hydraulic pressure in an accumulator accumulated by a pump is allowed to boost the operation of a brake operating member to generate braking force and incorporating a relief valve for relieving hydraulic pressure accumulated in said accumulator when hydraulic pressure has been accumulated in said accumulator to a level not lower than relief pressure, said apparatus comprising:

relief-valve-operation detecting means for detecting the operation of said relief valve to transmit an output signal; and pump-operation-signal generating means for transmitting an interruption signal of the pump in response to the output signal from said relief-valve-operation detecting means;

wherein the operation of the pump is controlled such that the operation of the pump is interrupted when said relief valve has been operated.

7. A pump operation control apparatus for a hydraulic brake boosting system wherein hydraulic pressure in an accumulator accumulated by a pump which is operated by a motor is allowed to boost the operation of a brake operating member so as to generate braking force and incorporating a relief valve for relieving hydraulic pressure accumulated in said accumulator when hydraulic pressure has been accumulated in said accumulator to a level not lower than relief pressure, said apparatus comprising:

motor-current detecting means for detecting an electric current which flows in the motor to produce an output;

current comparison means for producing an output when the motor current detected by said-motor-current detecting means is higher than a predetermined level; and pump-operation-signal generating means for transmitting an interruption signal of the pump in response to the output signal from said current comparison means;

wherein the operation of the pump is controlled such that when the motor current is higher than the predetermined level, the operation of the pump is interrupted.

8. A pump operation control apparatus for a hydraulic brake boosting system wherein hydraulic pressure in an accumulator accumulated by a pump which is operated by a motor is used to boost the operation of a brake operating member so as to generate braking force, said apparatus comprising:

motor-revolution-number detecting means for detecting the number of revolutions of the motor to produce an output;

revolution-number comparison means for producing an output when the number of revolutions detected by said motor-revolution-number detecting means is smaller than a predetermined value; and pump-operation-signal generating means for transmitting an interruption signal of the pump in response to the output signal from said revolution-number comparison means;

wherein the operation of the pump is controlled such that when the number of revolutions of the motor is smaller than the predetermined value, the operation of the pump is interrupted.

9. A pump operation control apparatus for a hydraulic brake boosting system wherein hydraulic pressure in an accumulator accumulated by a pump is allowed to boost the operation of a brake operating member so as to generate braking force, said apparatus comprising:

pulsating-frequency calculating means for calculating a pulsating frequency of pulses generated when the pump is operated;

pulsating-frequency comparison means for producing an output when the pulsating frequency calculated by said pulsating-frequency calculating means is lower than a predetermined value; and pump-operation-signal generating means for transmitting an interruption signal of the pump in response to the output signal from said pulsating-frequency comparison means;

wherein the operation of the pump is controlled such that when the pulsating frequency is lower than the predetermined value, the operation of the pump is interrupted.

10. A pump operation control apparatus according to claim 9, wherein the pulsating frequency is a pulsating frequency of a motor current which is generated in the motor for operating the pump or a pressure pulsating frequency generated in the hydraulic pressure accumulated in said accumulator.

11. A pump operation control apparatus according to claim 10, further comprising a predetermined-value correction means for changing the predetermined value in accordance with the voltage of the motor.

12. A pump operation control apparatus according to any one of claims 6 to 9, wherein said pump-operation-signal generating means transmits an operation signal of the pump in response to an operation signal generated by the brake operating member.

13. A pump operation control apparatus according to any one of claims 6 to 11, further comprising a timer for measuring time when an ON signal has been supplied from an ignition switch and transmitting a signal at predetermined time intervals, wherein said pump-operation-signal generating means transmits an operation signal of the pump in response to the output signal from said timer.

14. A pump operation control apparatus as claimed in any one of claims 1 and 6 to 9, further comprising a pump-operating-pressure sensor for detecting pressure accumulated in said accumulator and pressure-sensor-failure detecting means for detecting a failure of said pump-operating-pressure sensor, wherein when said pump-operating-pressure sensor is in a normal state, the operation of the pump is controlled in response to an output signal from said pump-operating-pressure sensor, and when said pump-operating-pressure sensor is broken down, the operation of the pump is controlled by said pump operation control apparatus in response to an output signal from said pressure-sensor-failure detecting means.

15. A pump operation control apparatus for a hydraulic brake boosting system wherein hydraulic pressure in an accumulator accumulated by a pump is allowed to boost the operation of a brake operating member to generate braking force and the operation of the pump is controlled in response to a pump-operation control signal transmitted from a pump-operation-signal generating means in response to an output signal from a pump-operating-pressure sensor for detecting accumulation of hydraulic pressure in the accumulator, said apparatus comprising:

pressure-sensor-failure detecting means for detecting a failure of the pump-operating-pressure sensor;

a backup sensor for detecting accumulation of hydraulic pressure in the accumulator and arranged to be turned off at OFF pressure which is lower than OFF pressure for said pump-operating pressure sensor;

a timer for measuring time required from a moment at which the OFF pressure of said backup sensor is realized to a moment at which the OFF pressure of said pump-operating pressure sensor is realized when said pump-operating pressure sensor is operated normally; and storage means for learning and storing the time measured by said timer;

wherein said pump-operation-signal generating means transmits an operation-control signal for the pump in response to the output signal from said pump-operating pressure sensor when said pump-operating pressure sensor is in a normal state, and when a failure of said pump-operating pressure sensor has occurred, said pump-operation-signal generating means transmits an operation signal of the pump in response to an ON signal of said backup sensor and transmits an interruption signal of the pump for time elongated from an OFF signal of said backup sensor and corresponding to time learned and stored in said storage means.

16. A pump operation control apparatus according to claim 15, wherein when a braking operation has been performed during learning and storage of time performed by said timer and said storage means, said operation for learning and storing the time is interrupted.

17. A pump operation control apparatus according to claim 15 or 16, wherein when a braking operation has been performed during the operation of the pump, the learned and stored time is elongated.

18. A pump operation control apparatus for a hydraulic brake boosting system wherein hydraulic pressure in an accumulator accumulated by a pump which is operated by a motor is used to boost the operation of a brake operating member to generate braking force and that the operation of the pump is controlled in response to a pump-operation-control signal transmitted from a pump-operation-signal generating means in response to an output signal from a pump-operating pressure sensor for detecting accumulation of hydraulic pressure in the accumulator and incorporating a relief valve for relieving hydraulic pressure accumulated in said accumulator when hydraulic pressure has been accumulated in said accumulator to a level not lower than relief pressure, said apparatus comprising:

pressure-sensor-failure detecting means for detecting a failure of the pump-operating-pressure sensor;

a backup sensor for detecting accumulation of hydraulic pressure in the accumulator to produce an output; and relief-valve detecting means for detecting the operation of the relief valve and producing an output;

wherein when said pump-operating pressure sensor is in a normal state, said pump-operation-signal generating means transmits an operation control signal for the pump in response to an output signal from said pump-operating pressure sensor, and when a failure of said pump-operating pressure sensor has occurred, said pump-operation-signal generating means transmits an operation signal of the pump in response to an ON signal of said backup sensor and transmits an interruption signal of the pump to interrupt the operation of the pump when said relief valve has been operated.

19. A pump operation control apparatus for a hydraulic brake boosting system wherein hydraulic pressure in an accumulator accumulated by a pump which is operated by a motor is allowed to boost the operation of a brake operating member to generate braking force and that the operation of the pump is controlled in response to a pump-operation-control signal transmitted from a pump-operation-signal generating means in response to an output signal from a pump-operating pressure sensor for detecting accumulation of hydraulic pressure in the accumulator, said apparatus comprising:

pressure-sensor-failure detecting means for detecting a failure of the pump-operating-pressure sensor;

a backup sensor for detecting accumulation of hydraulic pressure in the accumulator and producing an output;

motor-current detecting means for detecting an electric current which flows in the motor to produce an output and current comparison means for producing an output when the motor current detected by said motor-current detecting means is higher than a predetermined level;

wherein said pump-operation-signal generating means transmits an operation control signal for the pump in response to an output signal from said pump-operating pressure sensor when said pump-operating pressure sensor is in a normal state, and when a failure of said pump-operating pressure sensor has occurred, said pump-operation-signal generating means transmits an operation signal of the pump in response to an ON signal of said backup sensor and transmits an interruption signal of the pump to interrupt the operation of the pump when the motor current has been raised to a level not lower than the predetermined value.

20. A pump operation control apparatus for a hydraulic brake boosting system wherein hydraulic pressure in an accumulator accumulated by a pump which is operated by a motor is allowed to boost the operation of a brake operating member to generate braking force and that the operation of the pump is controlled in response to a pump-operation-control signal transmitted from a pump-operation-signal generating means in response to an output signal from a pump-operating pressure sensor for detecting accumulation of hydraulic pressure in the accumulator, said apparatus comprising:

pressure-sensor-failure detecting means for detecting a failure of the pump-operating-pressure sensor;

a backup sensor for detecting accumulation of hydraulic pressure in the accumulator and producing an output;

motor-revolution-number detecting means for detecting the number of revolutions of the motor to produce an output; and revolution-number comparison means for producing an output when the number of revolutions detected by said motor-revolution-number detecting means is smaller than a predetermined value;

wherein said pump-operation-signal generating means transmits an operation control signal for the pump in response to an output signal from said pump-operating pressure sensor when said pump-operating pressure sensor is in a normal state, and when a failure of said pump-operating pressure sensor has occurred, said pump-operation-signal generating means transmits an operation signal of the pump in response to an ON signal of said backup sensor and transmits an interruption signal of the pump to interrupt the operation of the pump when the number of revolutions of the motor is smaller than the predetermined value.

* * * * *